(12) United States Patent
Shields

(10) Patent No.: US 11,819,100 B2
(45) Date of Patent: Nov. 21, 2023

(54) WALLET ASSEMBLY AND METHOD OF USE

(71) Applicant: TODO BIO, S.A., San Carlos (PA)

(72) Inventor: Michael Peter Shields, San Carlos (PA)

(73) Assignee: TODO BIO, S.A., San Carlos (PA)

(*) Notice: Subject to any disclaimer, the term of this patent is extended or adjusted under 35 U.S.C. 154(b) by 0 days.

(21) Appl. No.: 17/970,098

(22) Filed: Oct. 20, 2022

(65) Prior Publication Data

US 2023/0089796 A1 Mar. 23, 2023

Related U.S. Application Data

(63) Continuation of application No. PCT/US2021/049439, filed on Sep. 8, 2021, which is a continuation of application No. 17/019,208, filed on Sep. 12, 2020.

(51) Int. Cl.
| | |
|---|---|
| *A45C 11/18* | (2006.01) |
| *A45C 1/06* | (2006.01) |
| *G06Q 20/40* | (2012.01) |
| *H04W 4/80* | (2018.01) |
| *A45C 13/18* | (2006.01) |
| *A45C 11/00* | (2006.01) |

(52) U.S. Cl.
CPC .............. *A45C 11/182* (2013.01); *A45C 1/06* (2013.01); *G06Q 20/40145* (2013.01); *A45C 13/185* (2013.01); *A45C 2001/065* (2013.01); *A45C 2011/002* (2013.01); *H04W 4/80* (2018.02)

(58) Field of Classification Search
CPC ....... A45C 1/06; A45C 11/182; A45C 13/185; A45C 2001/065; A45C 2011/002; H04W 4/80; G06Q 20/40145
See application file for complete search history.

(56) References Cited

U.S. PATENT DOCUMENTS

| | | | |
|---|---|---|---|
| 6,082,422 | A | 7/2000 | Kaminski |
| 6,327,749 | B1 | 12/2001 | Antinone |
| 2006/0187061 | A1 | 8/2006 | Colby |
| 2014/0223584 | A1 | 8/2014 | Cabouli |
| 2018/0294845 | A1 | 10/2018 | Bimbaud et al. |
| 2019/0278953 | A1 | 9/2019 | Lal |
| 2020/0013032 | A1 | 1/2020 | Moskowitz et al. |

FOREIGN PATENT DOCUMENTS

| | | |
|---|---|---|
| WO | 2013095434 A1 | 6/2013 |
| WO | 2015064799 A1 | 5/2015 |
| WO | 2020051553 A1 | 3/2020 |

*Primary Examiner* — Sue A Weaver
(74) *Attorney, Agent, or Firm* — Kevin J. McNeely; McNeely, Hare & War, LLP

(57) ABSTRACT

A wallet assembly that receives a contactless payment card includes a wallet arranged as at least a bifold wallet with first and second wallet sides, one side configured to receive the contactless card and the other configured to receive additional items and payment cards. RFID shielding eliminates electromagnetic signals from the additional payment cards. A flap attached to the wallet side holding the contactless card has a hole or window that physically exposes a portion of the payment card.

24 Claims, 81 Drawing Sheets

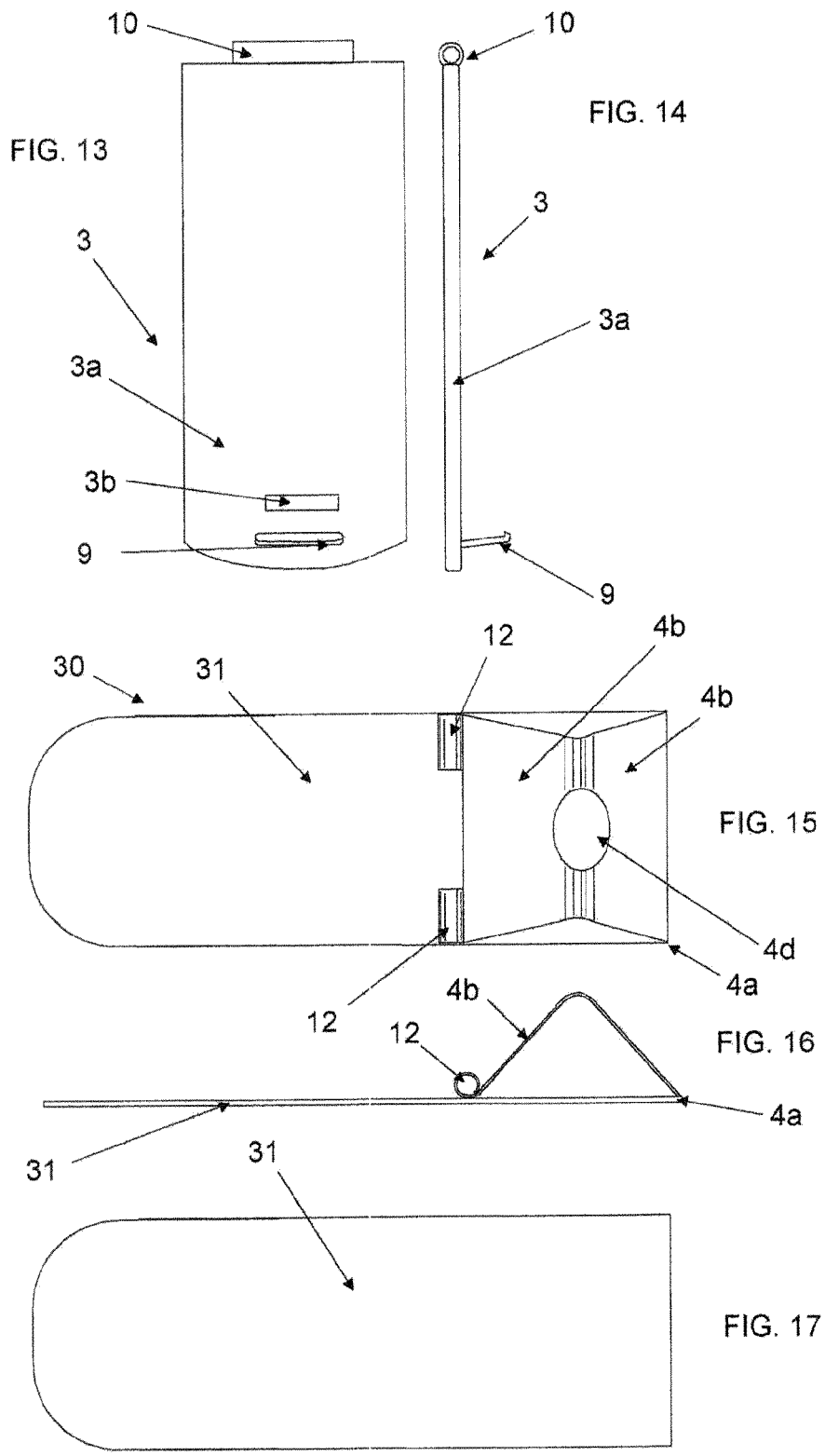

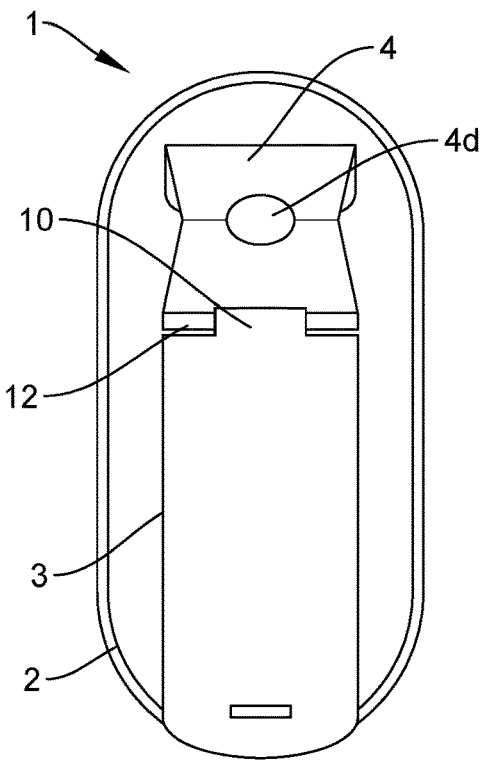
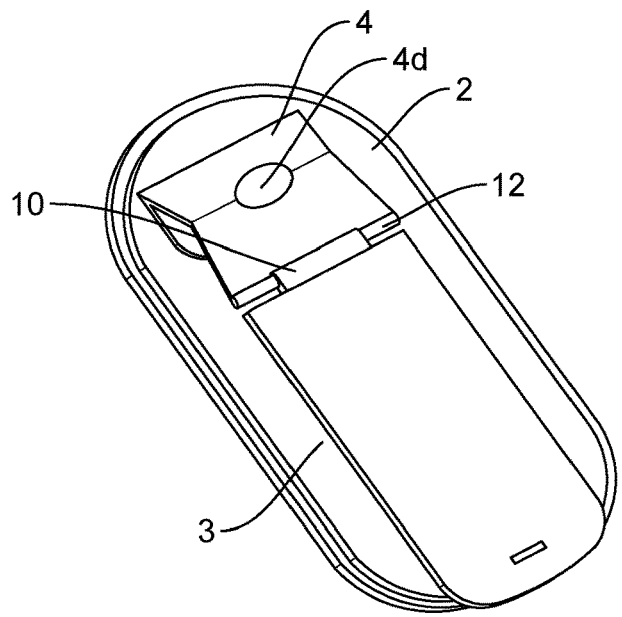
FIG. 18 | FIG. 19
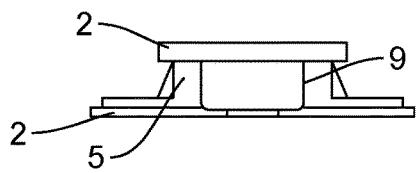
FIG. 20
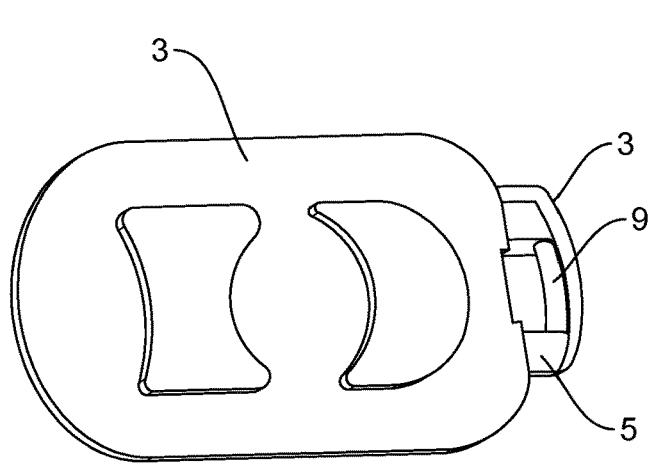
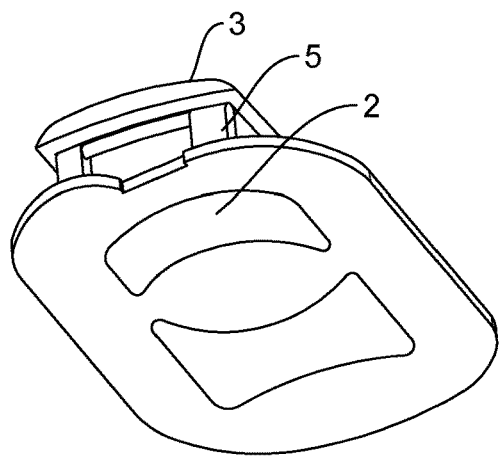
FIG. 21 | FIG. 22

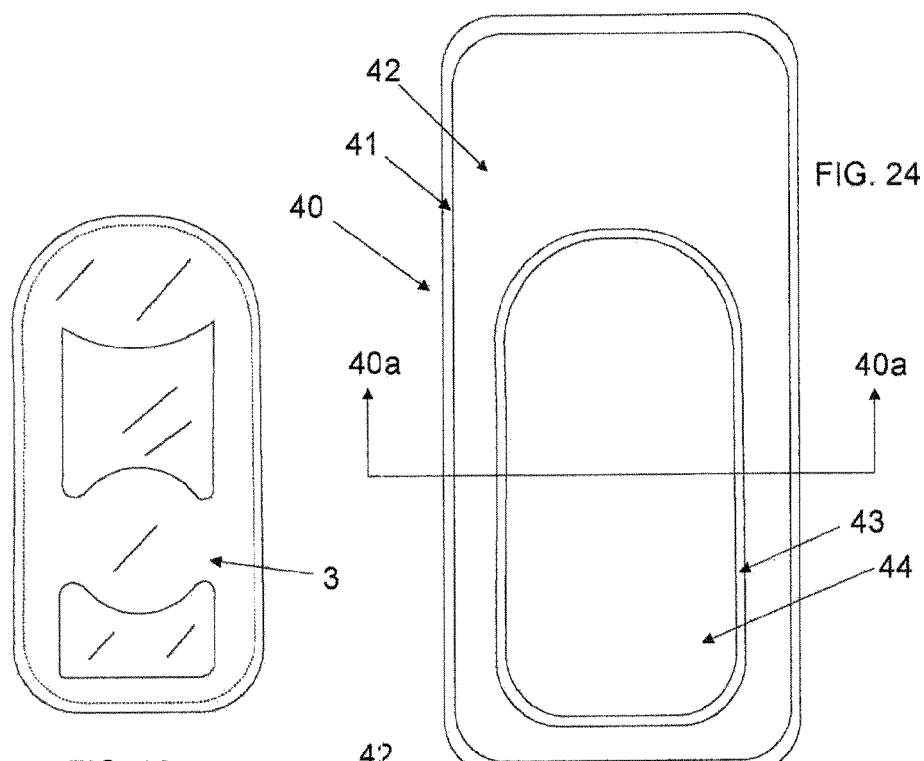
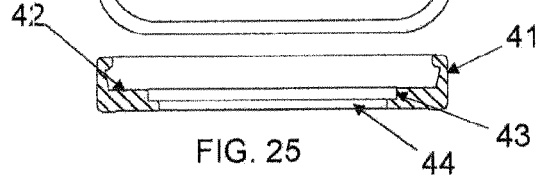
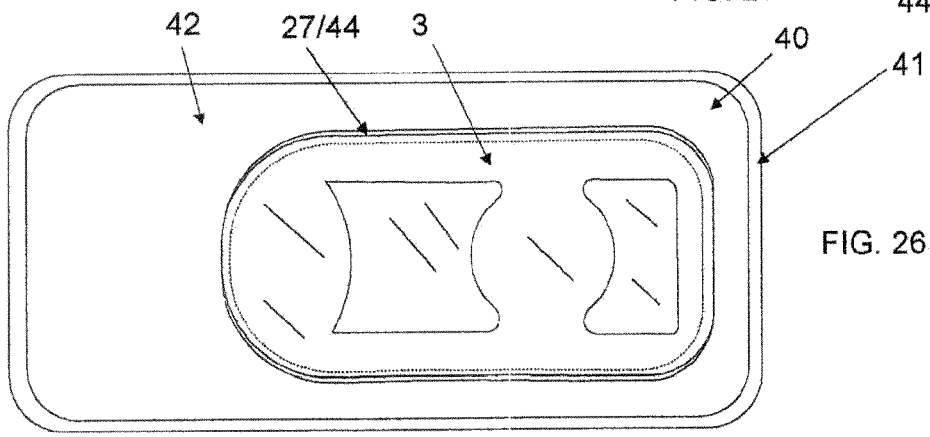
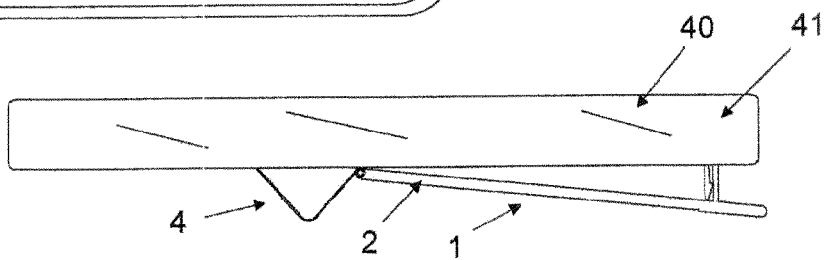

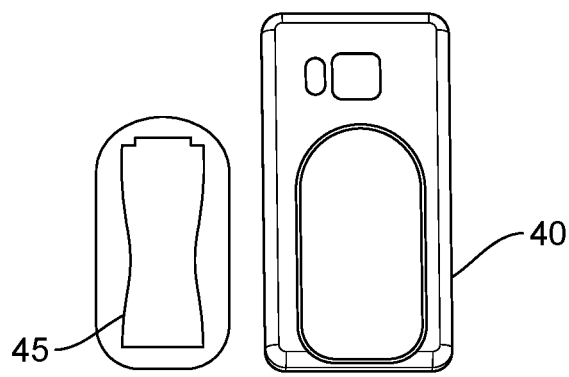
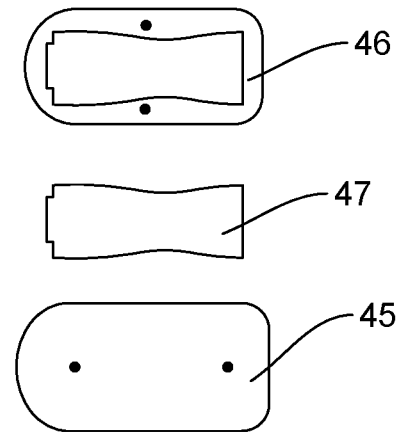
FIG. 28  FIG. 29
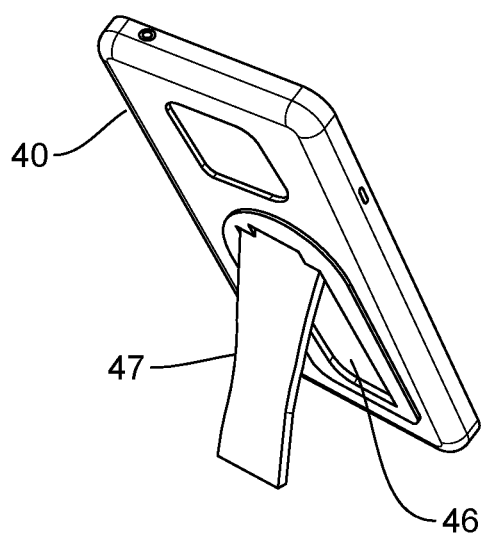
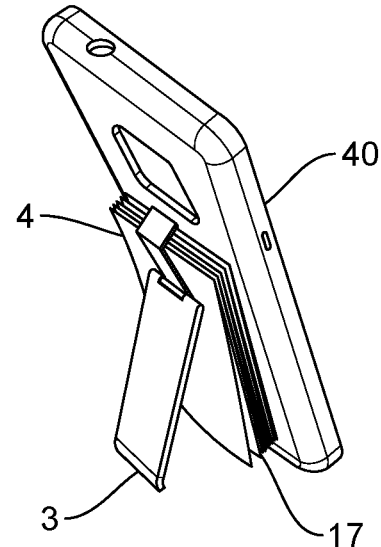
FIG. 30  FIG. 31

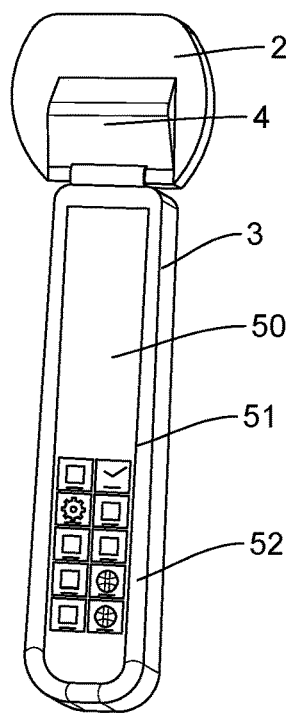
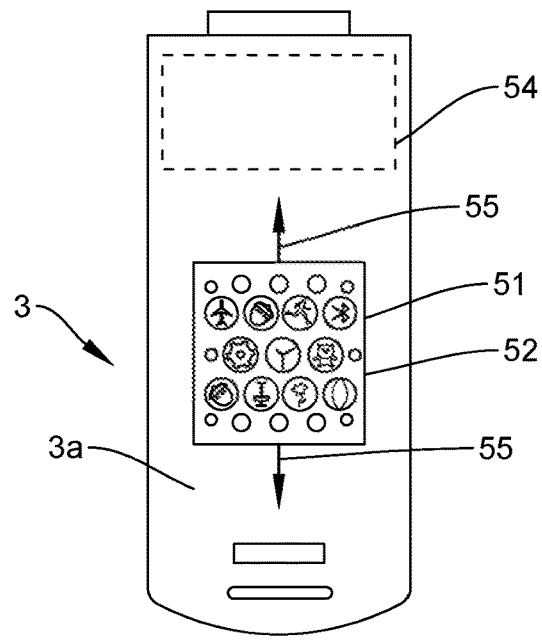
FIG. 35  FIG. 36
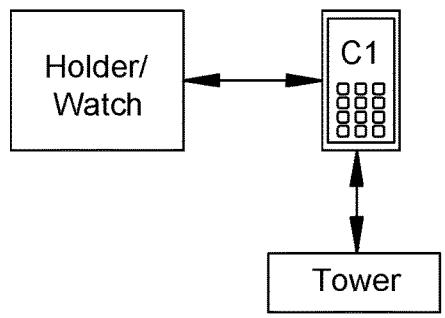
FIG. 37
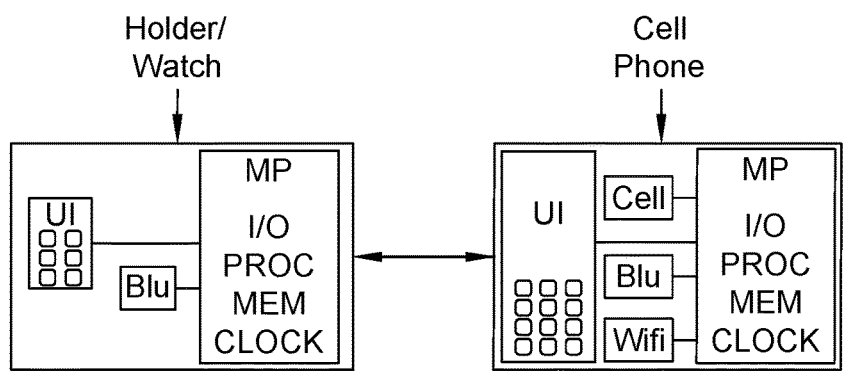
FIG. 38

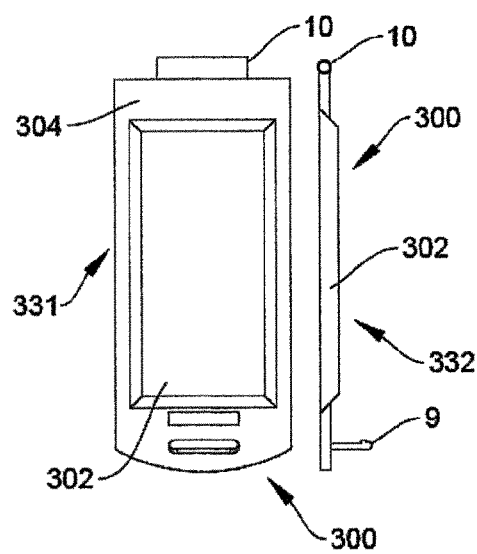
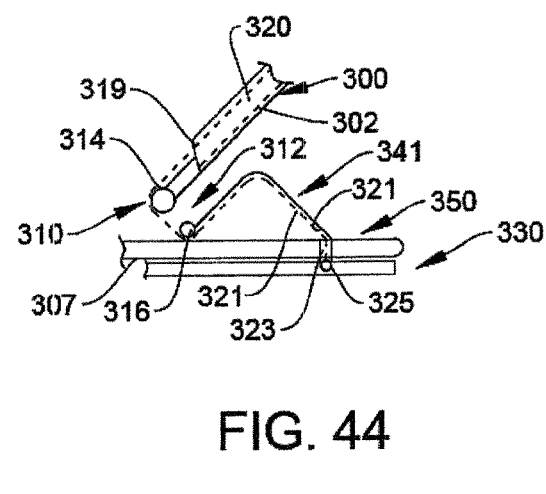
FIG. 42
FIG. 44
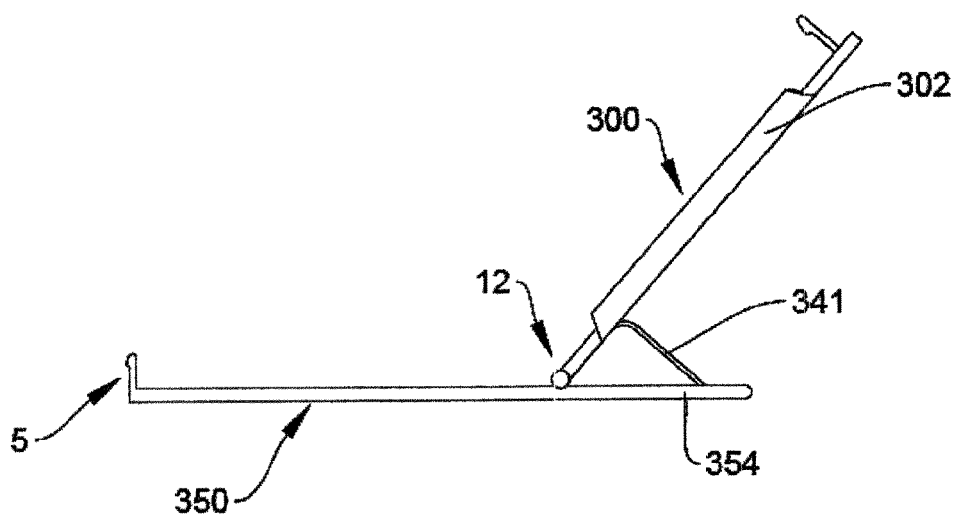
FIG. 43

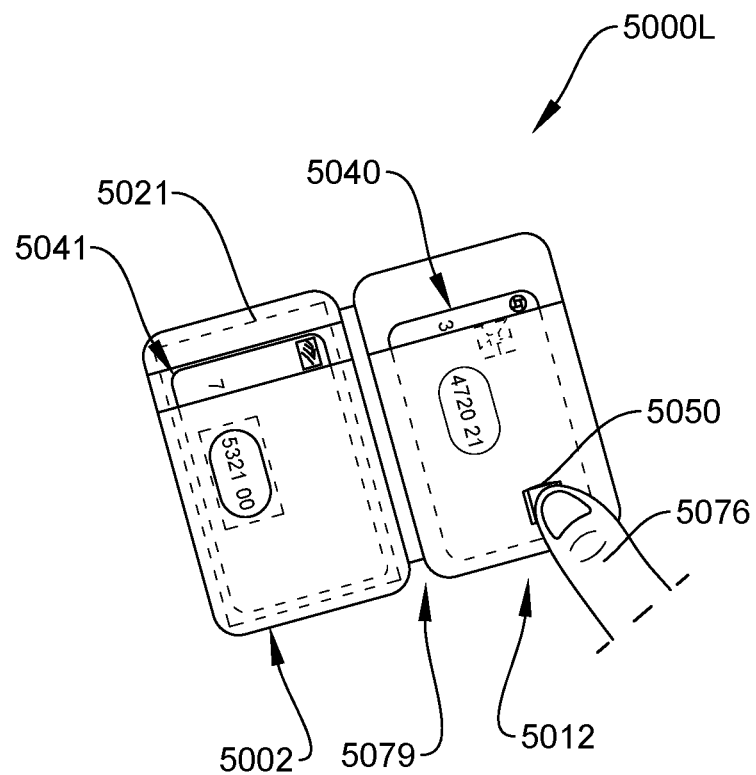
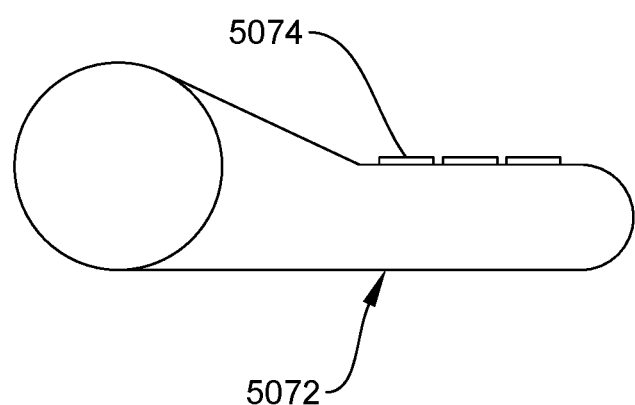
FIG. 50L

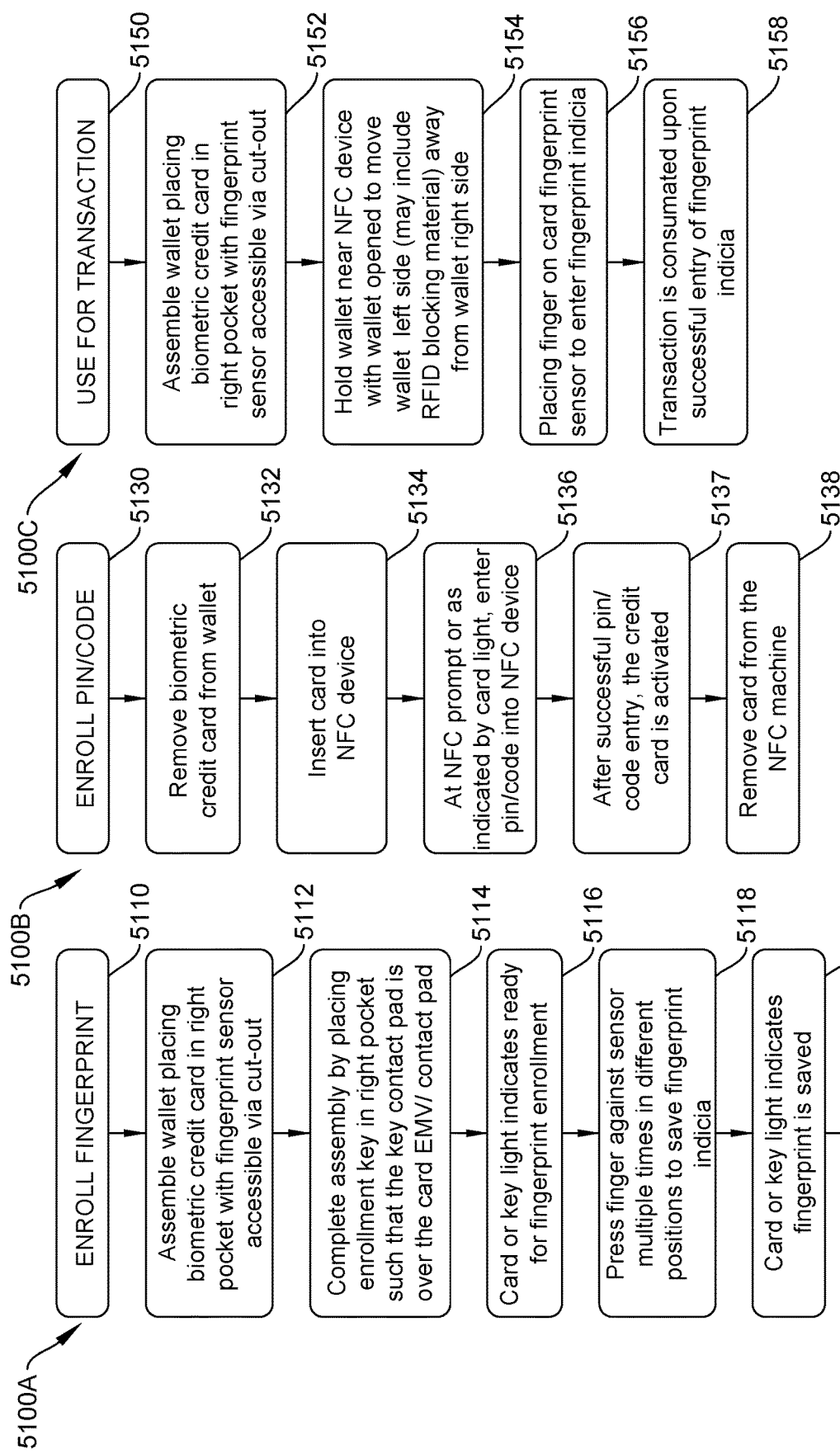

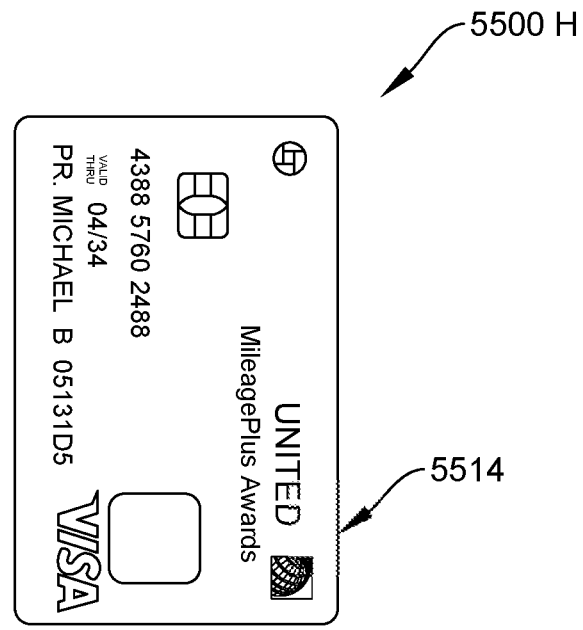
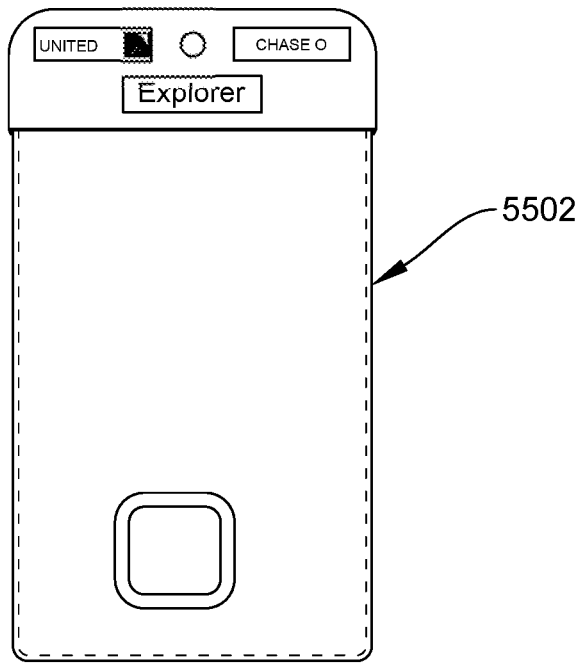
FIG. 55H

WALLET ASSEMBLY AND METHOD OF USE

PRIORITY CLAIM AND INCORPORATION BY REFERENCE

This application is a continuation of PCT/US2021/049439 filed on Sep. 8, 2021, and claims priority to U.S. patent application Ser. No. 17/019,208 filed Sep. 12, 2020, which are incorporated by reference herein.

FIELD OF THE INVENTION

The present invention is broadly directed to an item of manufacture. In particular, a wallet for holding a credit card such as a contactless, biometric or contactless biometric credit card is provided.

BACKGROUND OF THE INVENTION

For over one hundred years, money clips have been well known in the art. An example is shown in U.S. Pat. No. 1,899,753, showing a simple metal clip capable of engaging dollar bills. The '753 patent discloses a common failure of prior art money clips, i.e., the sole engaging means for bills or credit cards is spring pressure generally provided by a U-shaped metal clip. Agitation or abrasion of the bills or credit cards in such a money clip easily dislodges them from the money clip.

U.S. Pat. No. 6,357,084 attempts to improve the security of the prior art money clips by providing a band that will generally ineffectively gather the bills and credit cards across their lengths. U.S. Pat. No. 7,640,632 continues in that concept with an additional belt across the short sides of gathered credit cards.

As described above, another equally important problem with prior art money clips and credit card holders using a single invariable width between metal parts to provide spring pressure to secure such items. There is a need for a device which is capable of providing a money clip function with a much greater capacity to engage a single credit card or several more with equal security.

Further, money clips in the prior art are of limited functionality, excepting as described in U.S. Pat. No. 4,768,648 that combines with a simple money clip a calculator.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

SUMMARY OF THE INVENTION

The present invention includes embodiments of a biometric wallet assembly and embodiments of a biometric wallet assembly for use with an enrollment key.

In an embodiment a wallet assembly comprises: a wallet for use with an enrollment key; a biometric card with a fingerprint sensor, the biometric card for contactless communications; the biometric card having first opposed edges and second opposed edges, the first opposed edges longer than the second opposed edges; the biometric card having an electrical contact pad or EMV; the enrollment key having a battery and an electrical contact pad for mating with the biometric card electrical contact pad; the wallet for receiving the biometric card in a first fixed position therein such that the fingerprint sensor is accessible; the wallet for guiding an enrollment key portion to a second fixed position therein; in the first and second fixed positions, the biometric card electrical contact pad in electrical contact with the enrollment key electrical contact pad; the pad to pad contact for providing power from the battery to operate the fingerprint sensor; and, a biometric card memory for saving fingerprint indicia entered via the fingerprint sensor.

In some embodiments, the biometric card is received in a pocket therein, the pocket having a window that physically exposes the fingerprint sensor. In some embodiments, the wallet is arranged as a bifold wallet with left and right sides, the right side for holding the biometric card and no other cards capable of contactless communications, the left side for holding other cards including cards capable of contactless communications. In some embodiments, there is no RFID blocking means incorporated in the wallet right side for allowing communications between the biometric card in the wallet right side and an NFC device proximate the wallet right side and RFID blocking means are incorporated in the wallet left side for blocking communications with cards inserted in the wallet left side. In some embodiments, the wallet is folded the left side pockets are opposite the right side pockets and a wallet exterior is exposed. In some embodiments, the enrollment key is "T" shaped and when inserted in the wallet enrollment key shoulders are proximate one of the biometric card second opposed edges. In some embodiments a sleeve is bendably attached to the wallet exterior and the sleeve is for holding a contactless card which may be pivoted away from the wallet such that communications between the contactless card and a proximate NFC device are not blocked by RFID blocking means in the wallet left side.

In some embodiments, the wallet is arranged as a multi-page wallet having multiple pocket pages between front and back covers. In some embodiments, the wallet comprises RFID blocking means in one of the covers. In some embodiments, a first pocket page is for holding a biometric card, the first pocket page having a window for exposing a biometric card fingerprint sensor such that moving the first pocket page away from the remainder of the wallet enables communications with an NFC device and pressing the fingerprint sensor with a finger enables a test to verify fingerprint indicia. In some embodiments, NFC device communications with contactless cards and biometric cards in the remainder of the wallet are blocked by the RFID blocking means. In some embodiments, movement of the first pocket page away from the remainder of the wallet is by the finger inserted therebetween to maintain separation therebetween. In some embodiments, one or more other pocket pages duplicate the function of the first pocket page. In some embodiments an nth pocket page is for holding a contactless card such that moving the nth pocket page away from the remainder of the wallet enables communications with an NFC device while communications between the NFC device and the remainder of the wallet are blocked by the RFID blocking means. In some embodiments, the wallet is arranged as a lever wallet having a spring clip near one end that joins a bottom plate with a hasp. In some embodiments, the spring clip captures a biometric card between the bottom plate and the spring clip. In some embodiments, the spring clip captures an enrollment key between the biometric card and the spring clip. In some embodiments, the hasp is separated from the bottom plate to access the fingerprint sensor. In some embodiments, access to the fingerprint sensor is via a hole in the hasp. In some embodiments, when inserted in the wallet, the enrollment key is inserted perpendicular to a length of the biometric card.

In another embodiment a wallet assembly comprises: a bifold wallet with a left side foldable to lie atop a right side; RFID blocking means in the left side and no RFID means in the right side; only one contactless card in a right side pocket; and, one or more contactless cards in one or more left side pockets; wherein no contactless card communications with a proximate NFC or POS device occur when the wallet left side is atop the wallet right side and wherein only the contactless card in the right side pocket communicates with the proximate NFC or POS device when the wallet left side is separated from the wallet right side by at least the width of a finger and the wallet right side faces the NFC or POS device. Here and elsewhere herein, the wallet left side and the wallet right side may be reversed.

In some embodiments when the wallet is folded a left side pocket is opposite a right side pocket and a wallet exterior is exposed. In some embodiments the wallet further comprises: a sleeve bendably attached to the wallet exterior; and, the sleeve for holding a contactless card which may be pivoted away from the folded wallet such that communications between the contactless card and a proximate NFC or POS device are not blocked by the RFID blocking means in the wallet left side.

In another embodiment a wallet assembly comprises: a wallet including a front cover, a back cover, and multiple pocket pages between coupled to the covers; and, RFID blocking means in the wallet front cover.

In some embodiments a first pocket page is for holding a single contactless card and other pocket pages are for holding other contactless cards wherein moving the first pocket page away from the remainder of the wallet enables a proximate NFC or POS device to communicate only with the contactless card in the first pocket page. In some embodiments the wallet includes the wallet covers stacked with the remaining pocket pages. In some embodiments movement of the first pocket page away from the remainder of the wallet is by the finger inserted therebetween. In some embodiments an nth pocket page containing a contactless card other than the first pocket page may duplicate the function of the first pocket page and its contactless card.

BRIEF DESCRIPTION OF THE DRAWINGS

FIGS. 13 and 14 are respectively top and side views of the latch plate of the invention holder.

FIGS. 15, 16 and 17 are respectively top, and bottom views of the spring plate of the invention holder.

FIGS. 18, 19, 20, 21 and 22 are respectively the holder of FIG. 1 shown in top view, top perspective view, end view, bottom slanted view and bottom perspective view.

FIG. 23 is a bottom view of the invention holder of FIG. 1 showing in broken line a cutaway edge.

FIG. 24 is a top view of a cell phone case with an opening to receive into a mating cutout the top portion of the invention holder of FIG. 23.

FIG. 25 is the section 40a of FIG. 24.

FIG. 26 is the holder of FIG. 23 mated to the opening in the cell phone case of FIG. 24.

FIG. 27 is a side view of the assembly of FIG. 26 with a cell phone secured in the cell phone case to thereby secure the invention holder to a floor of the cell phone case and to present to the rear of the cell phone and cell phone case assembly the holder portion of the invention holder.

FIG. 28 shows the cell phone case of FIG. 24 and a top view of an insert to replace the invention holder as shown in FIG. 26.

FIG. 29 is a top view of the insert of FIG. 28 and also separated into a base and extendable plate.

FIG. 30 is the cell phone case and cell phone of FIG. 27 shown supported from the extendable plate of the insert of FIG. 29.

FIG. 31 is the assembly of FIG. 27 shown with the latch plate unlatched to provide a support similar to that provided by the extendable plate of the insert of FIG. 30.

FIG. 35 is a top view of an narrow embodiment of the invention holder having embedded in its latch plate a housing supporting the visible touch screen display, which housing and touch screen display are electrically connected to circuits and a microprocessor in the housing to comprise the functions of a typical smart watch, which is operable by itself or in wireless communication with a cell phone.

FIG. 36 is a top view of the latch plate of FIG. 1 separated from the invention holder only for purposes of showing that the smart watch of FIG. 35 may also be incorporated into all the forms of the latch plate of the invention holder.

FIG. 37 is a diagram of the invention holders of FIGS. 35 and 36 in wireless communication with a cell phone, which is wireless communication with a cell tower.

FIG. 38 is a high-level diagram of the holder/watch embodiments of FIGS. 35-37 in wireless communication with a cell phone.

FIG. 42 shows a lever adapted to hold a battery.

FIG. 43 shows the lever of FIG. 42 mounted on a spring plate.

FIG. 44 shows a power supply cable used with the battery and lever of FIG. 42.

FIGS. 50A-L show a bifold wallet for use with an enrollment key.

FIGS. 51A-C show flowcharts describing operations of the first wallet using the enrollment key.

DETAILED DESCRIPTION OF THE INVENTION

Detailed embodiments of the present invention are disclosed herein; however, it is to be understood that the disclosed embodiments are merely exemplary of the inventions, which may be embodied in various forms. Therefore, specific structural and functional details disclosed herein are not to be interpreted as limiting, but merely as a basis for the claims and as a representative basis for teaching one skilled in the art to employ the inventions in any appropriately detailed structure.

The present invention is described in multiple embodiments as evident from the associated figures and text which follows.

Figure 1:
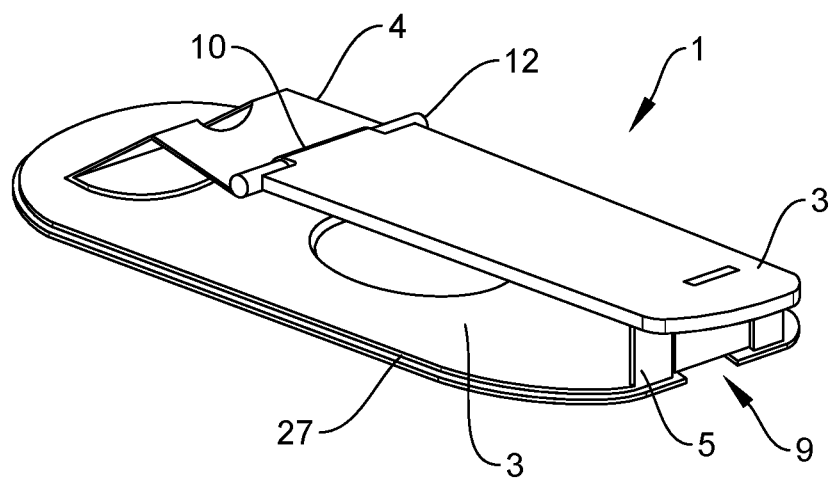
FIG. 1 is a top perspective view of the invention holder in a closed position.

FIG. 1 shows an inventive holder for credit cards, cash, and similar items that might be held in a wallet. The figure shows a top perspective view of the inventive holder 1 in a closed position showing a bottom plate 2, a latch plate 3 and a spring means 4, where spring means 4 connects to latch plate 3 at a pinned hinge connection comprising cylinder 10 at a first end of latch plate 3 and two aligned pin cylinders 12 with a straight metal pin 13 providing a pivot that allows latch plate 3 to rotate about cylinder 10 from the closed position shown in FIG. 1 to the open position shown in FIG. 2. Latch plate 3 comprises a second end with a downward latch piece 9 which releasably latches to latch piece 5 extending up from bottom plate 2. Spring means 4 comprises a V-shape of a flat plate of spring steel, with two pin cylinders forming a distal edge at the contact portion, where the distal edge is strongly urged against a top surface of the bottom plate 2 by way of connection of a proximal edge 4a being non-rotatably fixed relative to the plane of bottom plate 2. The V-shape of spring means 4 causes the contact portion to press strongly against the top surface of bottom plate 2 at the distal edge because of the fixing of the proximal edge structurally to the plane of the bottom plate 2. In a one embodiment of spring means 4 shown in FIGS. 1 and 2, a spring plate secures the proximal edge of spring means 4, where after the spring plate is inserted into a body slot formed in bottom plate 2 as described below.

It will clear from this description that there are many ways in which the connection of a proximal edge 4a being non-rotatably fixed relative to the plane of bottom plate 2 may be accomplished. One such manner is described below, i.e., the bottom plate is formed from a single metal plate and the proximal edge 4a being non-rotatably fixed relative to the plane of bottom plate 2 by way of welding said proximal edge 4a. Another such method may be to provide a metal or other extension from proximal edge 4a of spring means 4 such that the extension can be fixed by rivets or embedded in bottom plate 2 to accomplish the desired fixing of proximal edge 4a.

In a similar consideration, spring means 4 may be formed of alternate embodiments than a single V-shaped thin plate of spring steel. For example the spring may have a curved shape. For example the spring may have a curved shape such as a semi-circular shape or near semi-circular shape. For example, the spring may be a coil spring with ends that trace out a "V" shape. For example, the spring may be a coil spring with ends that trace out a near semi-circular shape. For example the spring may be a nearly flat or flat spring.

In a particular alternative spring embodiment, spring means 4 may be formed using two plates equivalent to sections 4b. These plates can be joined by a spiral spring to accomplish the desired function of having a generally V-shape spring means, a distal side of which is contacted with an upper surface of latch plate 3 to accomplish the objects of the invention to lift the contact portion of spring means 4 upward from the top surface of bottom plate 2.

Figure 2:
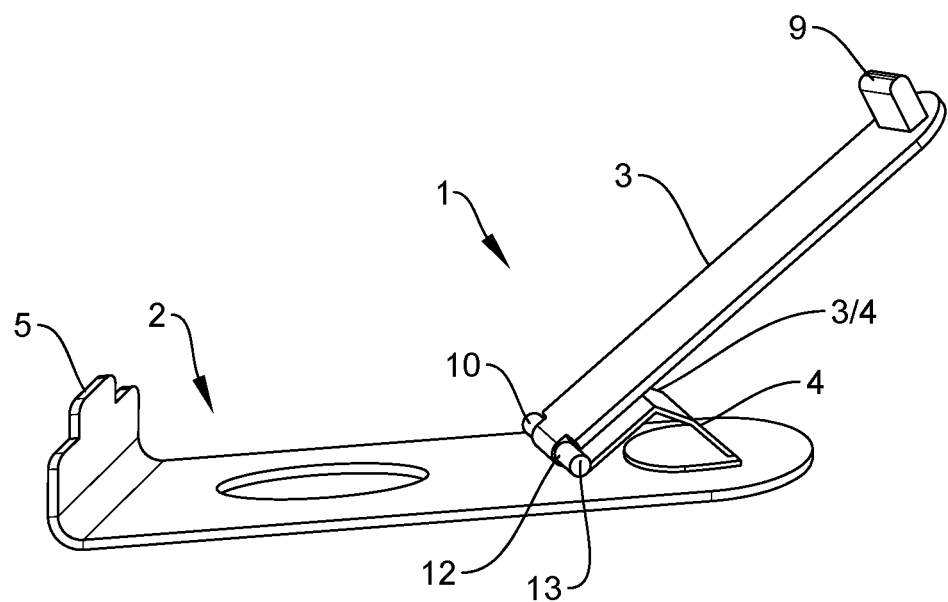
FIG. 2 is a side perspective view of the invention holder.

FIG. 2 shows that an interface 3/4 is formed between a top surface of latch plate 3 and a lower part of the V-shape spring of spring means 4. One of the disadvantages of the prior art with respect to spring means provided for holding credit cards and bills is that the user lacks lever assistance to open the spring means. In the present invention, FIG. 2 shows that a user continuing the rotation of the latch plate 3 about the pivot hinge connection formed with spring means 4 that the distal edge of spring means 4 will be lifted off its urged position against a top surface of bottom plate 2 by way of the mechanical advantage provided by turning a plate that latches to secure credit cards and bills on the top surface of bottom plate 2 in place into a lever for lifting the contact portion of spring means 4 away from the top surface of bottom plate 2 so that credit cards and bills can easily be inserted without fighting against the spring means 4 to cause that insertion. FIGS. 3 to 9 show the invention holder performing those steps.

Figure 3:
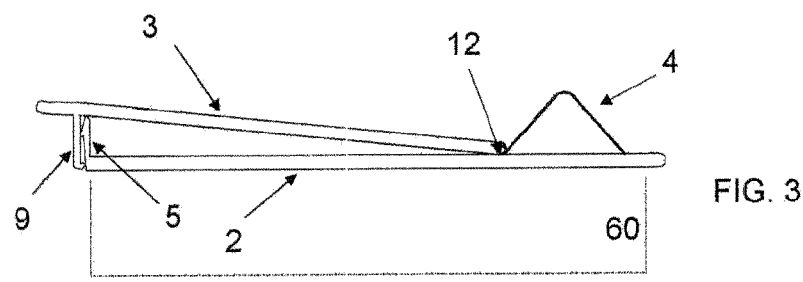
FIG. 3 is side view a side perspective view of the invention in FIG. 1.

FIG. 3 is side view a side perspective view of the invention holder 1 in FIG. 1 showing latch plate 3 engaged by latch piece 9 to latch piece 5 of the bottom plate 2. The contact portion of spring means 4 is shown at cylinders 12 being urged against a top surface of bottom plate 2. Broken lines 60 indicate that a sealable coin purse can be fixed to a bottom surface of bottom plate 2.

Figure 4:
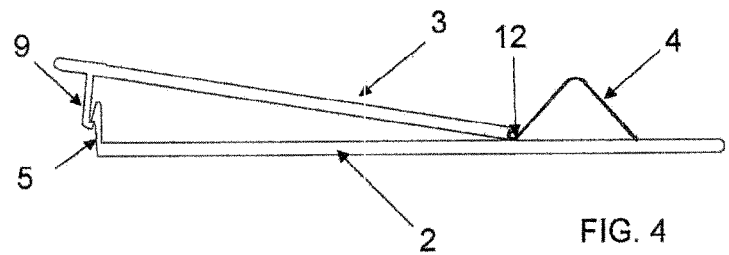
FIG. 4 is the holder of FIG. 3 with a latch plate lifted to a latching notch.

FIG. 4 is the holder 1 of FIG. 3 with a latch plate 2 lifted to latching notches of latching pieces 9 and 5.

Figure 5:
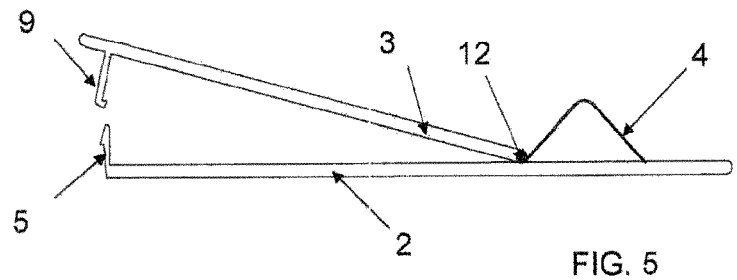
FIG. 5 is the holder of FIG. 4 with the latch plate free of a latch.

FIG. 5 is the holder 1 of FIG. 4 with the latch plate 3 having its latching piece 9 free of a latch engagement with latching piece 5.

Figure 6:
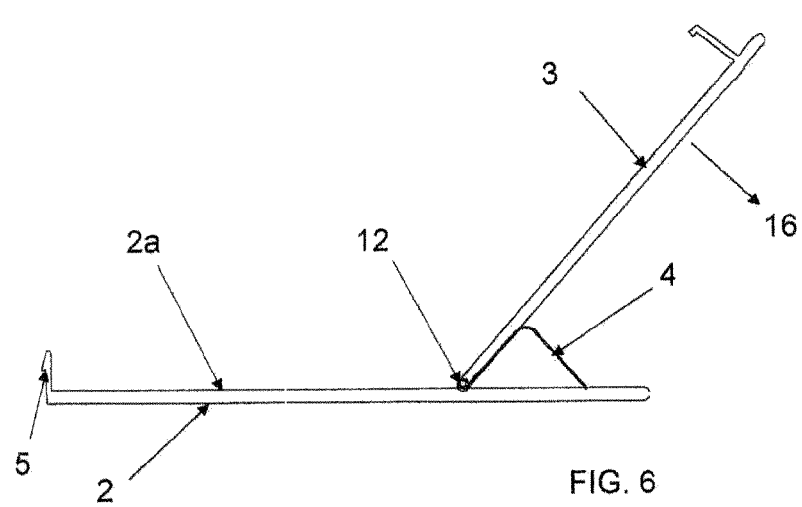
FIG. 6 is the holder of FIG. 5 with the latch plate moved to the open position shown in FIG. 2.

FIG. 6 is the holder 1 of FIG. 5 with the latch plate 2 moved to the open position shown in FIG. 2, where a user presses upon latch plate 2 in direction 16 to cause the contact portion of spring means 4 to lift from the top surface of bottom plate 2.

Figure 7:
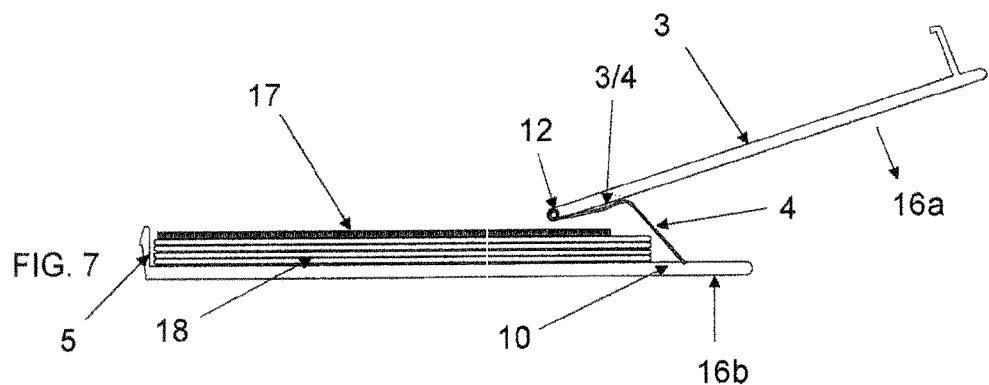
FIG. 7 is the holder of FIG. 6 with the latch plate pressed in a spring opening direction so that credit cards and bills can be inserted between a bottom plate and a spring contact.

FIG. 7 is the holder 1 of FIG. 6 with the latch plate pressed in a spring opening direction 16*a* and a top end of bottom plate 2 pressed in direction 16*b* so that credit cards 18 and bills 17 can be inserted between a bottom plate and the contact portion of spring means 4. Note that credit cards 18 and bills 17 are insertable upon and are support upon the top surface of the bottom plate 2 without interference with the contact portion of spring means 4. This position of the invention holder 1 is also the position from which credit cards 18 and bills 17 can be easily removed from the invention holder 1. In another embodiment of the latch that connects the latch plate 3 to bottom plate 2, pieces 5 and 9 may have mating, relatively vertical notches similar to the to those shown in FIG. 7 so that an underside of latch plate 3 is fixed closer to a top surface of cards 17 or bills 18.

Referring again to FIG. 7, note that with latch plate 3 in the entirely open position, credit cards cannot slide inadvertently to the left and out of the holder. They cannot slide out of the holder to the right or upwards because spring means 4 bars that movement. Flexible bills 17 can easily be lifted upward and be removed in a direction into or out of the drawing figure, i.e., from the sides of the holder, for easy access while eliminating the potential of sliding out to the left or right.

Figure 8:
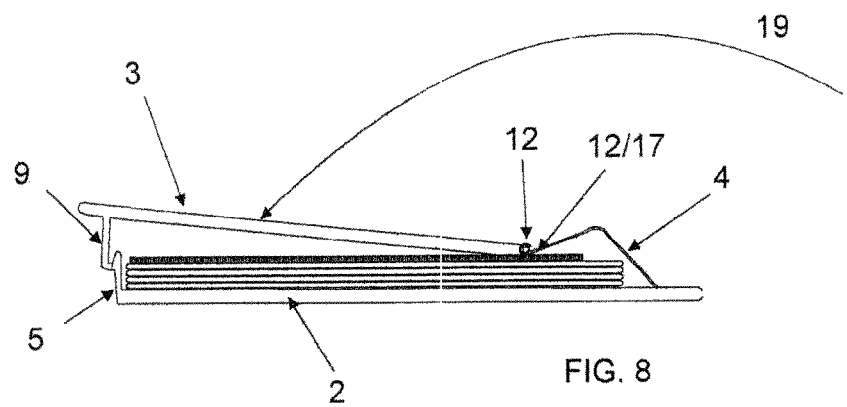
FIG. 8 is the holder of FIG. 7 with the latch plate released and returned to the partly latched position of FIG. 4.

FIG. 8 is the holder 1 of FIG. 7 with the latch plate 3 released and returned in path 19 to the partly latched position of FIG. 4.

Figure 9:
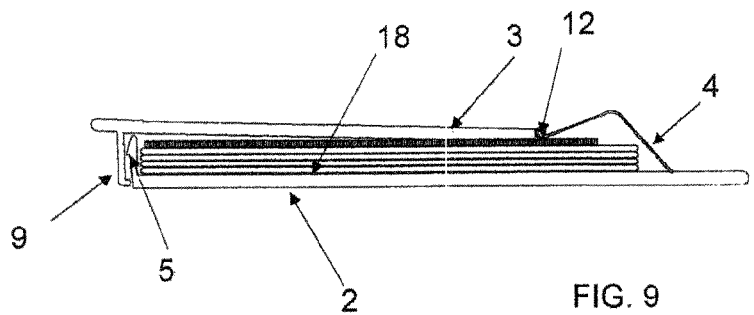
FIG. 9 is the holder of FIG. 8 with the latch plate returned to the fully closed position of FIG. 1.

FIG. 9 is the holder of FIG. 8 with the latch plate 2 returned to the fully closed position of FIG. 1. This position provides dual security. First, the contact portion of the spring means 4 is strongly pressed upon a top surface of the credit cards 18 and bills 17 to secure them to the top surface of bottom plate 2 and latch plate 3 covers the top surface of credit cards 18 and bills 17 and creates a latched space between the underside of latch plate 3 and a top surface of bottom plate 3 within which the credit cards 18 and bills 17 are held securely.

Figure 10:
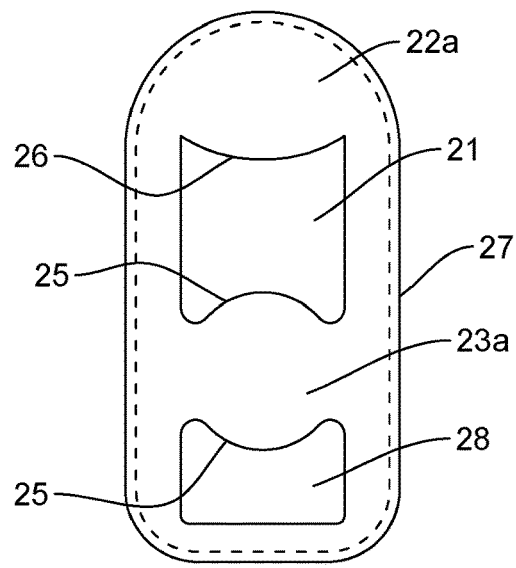
FIGS. 10 and 11 are respectively a bottom view and top perspective view of the bottom plate of the invention holder.
Figure 11:
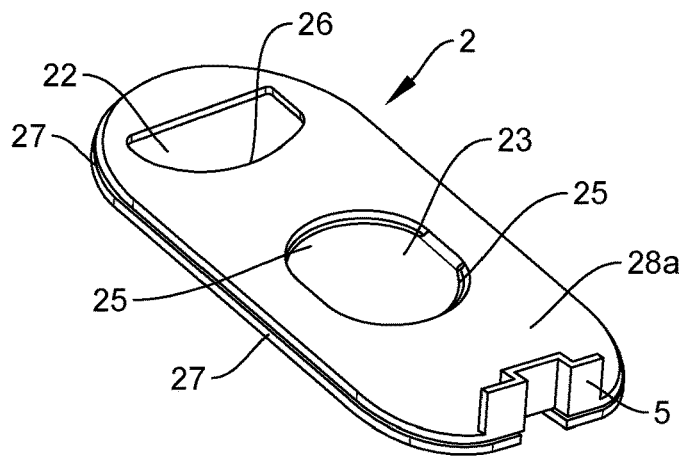

FIGS. 10 and 11 are respectively a bottom view and top perspective view of the bottom plate 2 of the invention holder 1, where bottom plate 2 is provided with an original thickness 3*a* (FIG. 12) into which are formed impressions and slots to provide a means for insertion and securing of a spring plate 30 (FIGS. 15-17) to which the proximal end 4*a* of spring means 4 is fixed, thereby forming a non-rotatable connection between a proximal edge of spring means 4 and a plane of the bottom plate 2.

Impressions 21 and 28 (with opposite sides respectively of sections 21*a* and 28*a*) are formed in an underside of bottom plate 3 that mate to and connection with impressions 22 and 23 (with opposite sides respectively of sections 22*a* and 23*a*) by way of slots 25 and 26. This arrangement of slots and impressions provides that a flat steel plate can be inserted in slog 26 in direction 29*a*, continued to be inserted through slots 25 in direction 29*b*, and then extended into impression 28 in direction 29*c*. After taking that action a flat metal plate will be seated firmly into bottom plate 2 for the secure location for the proximal end of spring means 4.

Figure 12:
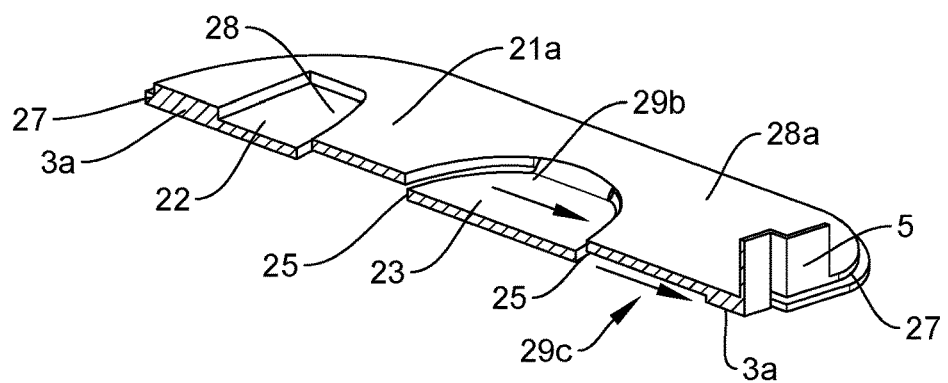
FIG. 12 is the bottom plate of FIG. 11 shown in cutaway view so that insertion slots for a spring plate are shown.

FIG. 12 is a cross-section of FIG. 11.

FIGS. 13 and 14 are respectively top and side views of the latch plate 3 of the invention holder, having a solid body 3*a* preferably of polymer. More preferably, the polymer of body 3*a* comprises carbon fiber or appropriate metal so that, in combination with a spring plate located in bottom plate 2, credit card secured in the invention holder shall not be capable of being hacked by near field communications due to metallic interference provided by the spring plate and the content of body 3*a*. This is commonly referred to as RFID protection.

FIGS. 15, 16 and 17 are respectively top, and bottom views of the spring plate 30 of the invention holder, where spring means 4 comprises proximal and distal sides 4*b* of the V-shape, cylinders 12 at a contact portion, and a proximal edge 4*a* which is fixed to a top edge of a flat metal plate 31, which is adapted to be inserted into the arrangement of impressions and slots of the bottom plate as described above.

An opening 4*d* is provided so that a cell phone embodiment of the invention allows a user to insert a side or tip of a forefinger to provide support when a user is making a cell phone call.

FIGS. 18, 19, 20, 21 and 22 are respectively the holder 1 of FIG. 1 shown in top view, top perspective view, end view, bottom slanted view and bottom perspective view.

FIG. 23 is a bottom view of the invention holder of FIG. 1 showing in broken line a cutaway edge of bottom plate 3.

FIG. 24 is a top view of a cell phone case 40 with a floor 42 and sidewalls 41 with an opening 44 and a mating ledge 43 to receive the top portion of the invention holder 1 of FIG. 23. FIG. 25 is the section 40*a* of FIG. 24 showing a mating ledge 43 and opening 44. A periphery of opening 44 may alternately be provided with convex or concave surface so that an outer edge of bottom plate 2 may be formed respectively in a concave or convex shape to snap fit into case 40. Further, said periphery can be rounded and provided with an elastomer surface for securely engaging an outside edge of bottom plate 2.

FIG. 26 is the holder 1 of FIG. 23 mated at interface 27/43 to the opening in the cell phone case 40 of FIG. 24.

FIG. 27 is a side view of the assembly of FIG. 26 with a cell phone (not shown but entirely encased in the case 40) secured in the cell phone case 40 to thereby secure the invention holder 1 to a floor of the cell phone case 40 and to present to the rear of the cell phone and cell phone case assembly the holder portion of the invention holder 1 so that credit cards 18 and bills 17 can be secured to a backside of a user's cell phone.

FIG. 28 shows the cell phone case 40 of FIG. 24 and a top view of an insert 45 to replace the invention holder 1 as shown in FIG. 26.

FIG. 29 is a top view of the insert 45 of FIG. 28 and also separated into a base 46 and extendable plate 47.

FIG. 30 is the cell phone case 40 and cell phone of FIG. 27 shown supported from the extendable plate 47 of the insert 45 of FIG. 29, where the extendable plate at a lower free edge has incorporated into it a surface material of elastomer with a high coefficient of friction to resist sliding on a smooth surface and a limitation of rotation away from the backside of the cell phone case to 90 degrees or less.

FIG. 31 is the assembly of FIG. 27 shown with the latch plate 2 unlatched to provide a support similar to that provided by the extendable plate 47 of the insert 45 of FIG. 30.

Figure 32:
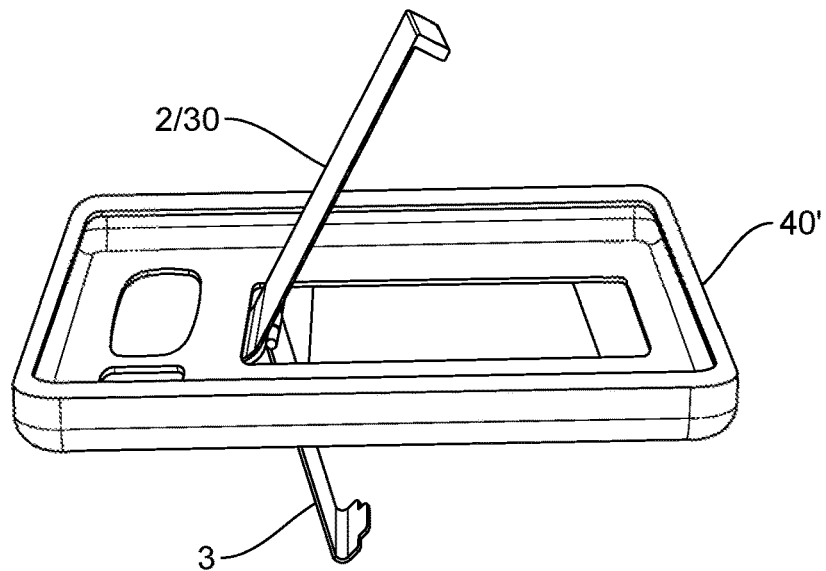
FIG. 32 is an alternate embodiment of the invention holder and cell phone case of FIG. 26, where, in a top perspective view, a combined bottom and spring plate is adapted to incorporate the structure and function of the spring plate and bottom plate and the cell phone case is provided with two openings to receive the combined bottom and spring plate.

FIG. 32 is an alternate embodiment of the invention holder and cell phone case of FIG. 26, where, in a top perspective view, a combined bottom and spring plate 2130 is adapted to incorporate the structure and function of the spring plate 30 and bottom plate 2 and the cell phone case 40' is provided with two openings to receive the combined bottom and spring plate.

Figure 33:
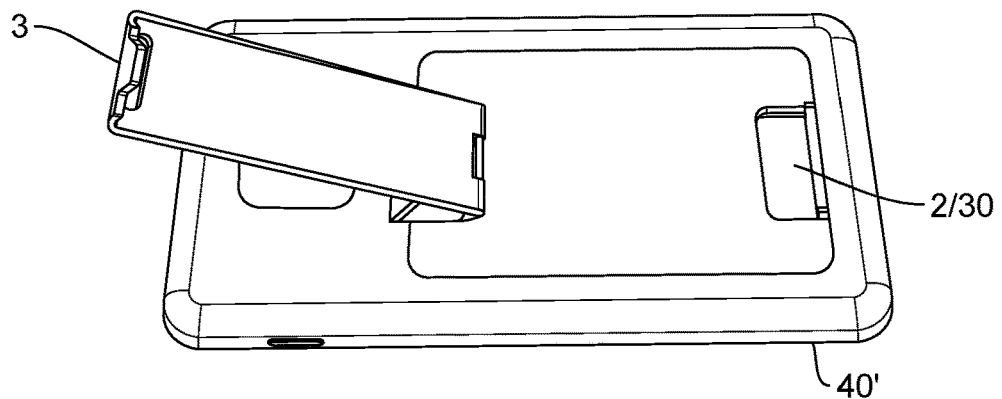
FIG. 33 shows the assembly of the holder of FIG. 32 with the combined bottom and spring plate fixed in the openings of the cell phone case.

FIG. 33 shows the assembly of the holder of FIG. 32 with the combined bottom and spring plate 2/30 fixed in the openings of the cell phone case 40'. This embodiment also comprises a complementary piece similar to insert 45 of FIG. 29 which adapted to cover the openings in case 40' when the invention holder shown in FIG. 33 is taken apart from case 40'.

Figure 34:
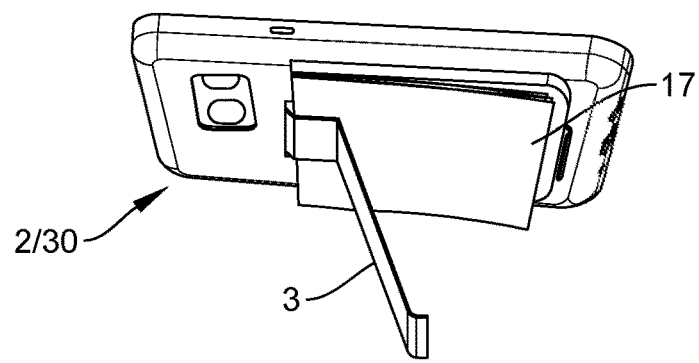
FIG. 34 shows the embodiment of the holder of FIG. 32 in rear perspective view with that holder engaged with the cell phone case and retaining bills and credit cards with the latch plate unlatched to provide support similar to that of the extendable plate of FIG. 30.

FIG. 34 shows the embodiment of the holder of FIG. 32 in rear perspective view with that holder engaged with the cell phone case 40' and retaining bills and credit cards 17 with the latch plate 3 unlatched to provide support similar to that of the extendable plate of FIG. 30.

FIG. 35 is a top view of an narrow embodiment of the invention holder, having a narrow bottom plate 2 narrow and a narrow latch plate 3 narrow having embedded in its latch plate a housing supporting the visible touch screen display 52, which housing and touch screen display are electrically connected to circuits and a microprocessor in the housing to comprise the functions of a typical smart watch, which is operable by itself or in wireless communication with a cell phone.

FIG. 36 is a top view of the latch plate of FIG. 1 separated from the invention holder only for purposes of showing that the smart watch of FIG. 35 may also be incorporated into all the forms of the latch plate of the invention holder, but that display 52 can be increased in size in directions 55 and protected from contact with spring means 4 in section 54 by way of a spacer post or flange so the display 52 does not contact spring means 4.

FIG. 37 is a diagram of the invention holders of FIGS. 35 and 36 as holder/watch in wireless communication with a cell phone Cl, which is wireless communication with a cell tower.

FIG. 38 is a high-level diagram of the holder/watch embodiments of FIGS. 35-37 in wireless communication with a cell phone. The cell phone comprises a standard touch screen or similar display and pressure sensitive button interface operating under a control program of the microprocessor MP and having means for wireless communication by cellular, WiFi, and Bluetooth standards.

The holder/watch comprises similar operating under a control program of the microprocessor MP and having means for wireless communication by Bluetooth {or other appropriate) standard with the cell phone. The holder/watch may operate independently {free from communications with the cell phone) or dependently (in communication with the cell phone) to perform all functions of current smart watches, such as notification by sound or vibration of receipt of emails or messages or alarms that occur at the cell phone, tracking of GPS coordinates for fitness, display of data at the holder/watch of data transmitted from the cell phone, such as results of operation of software or apps on the cell phone.

Figure 39:
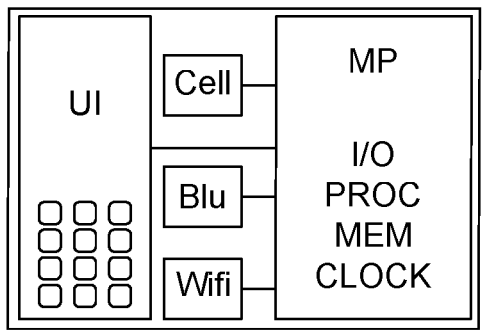
FIG. 39 is a high-level diagram of the holder embodiments of FIGS. 35-37 incorporating a cell phone into the latch plate.

FIG. 39 is a high-level diagram of the holder embodiments of FIGS. 35-37 incorporating a cell phone into the latch plate, where, instead of smart watch a cell phone is provided within the supporting housing described above.

Figure 40:
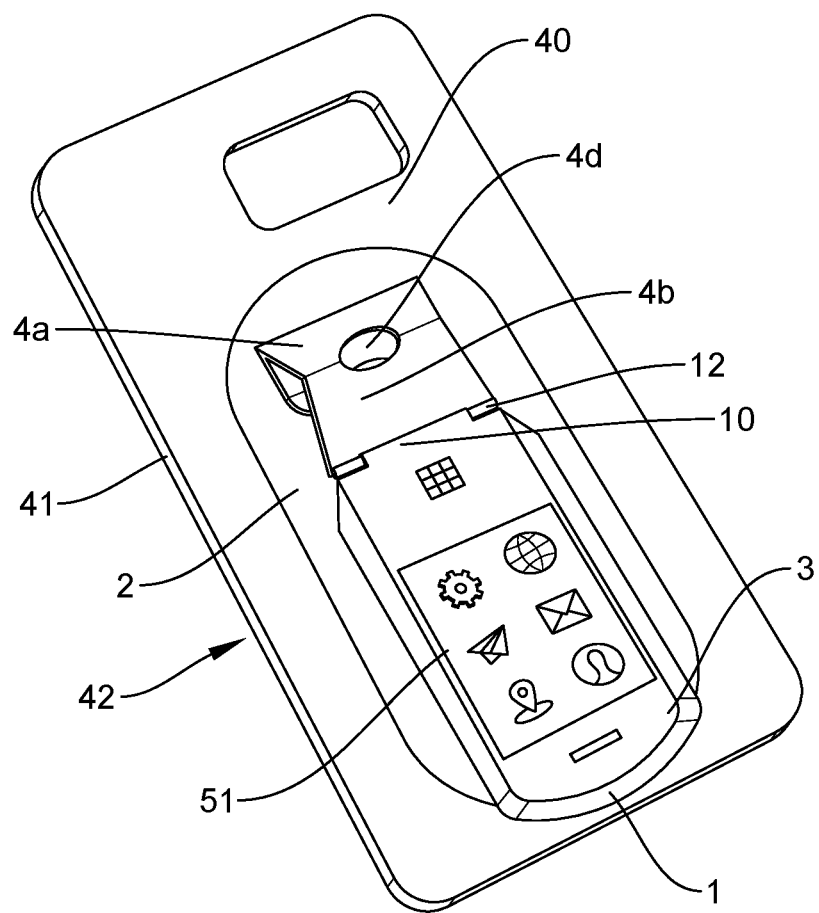
FIG. 40 is a rear perspective view of a rectangular cell phone case as in FIG. 24 further showing incorporation of the holder 1 into such a cell phone case.

FIG. 40 is a rear perspective view of a rectangular cell phone case as in FIG. 24 further showing incorporation of the holder 1 into such a cell phone case. The broken line outline shows a general surface area in which the form factor of the invention smart watch 51 can be incorporated into the invention holder. Power for cell phones is typically provided by a battery of substantial size relative to the form factor of the rest of the circuits, so that it will be preferred that a bottom plate of the invention holder is adapted to contain the powering battery for the cell phone (or smart watch embodiment) with appropriate wiring and electrical connection made between the latch plate and the bottom plate.

Incorporation of smart watch functionality into the invention holder of currency or credit cards is an improvement in some ways over wearing a watchband with a housing and touch screen to accomplish the same functions. A user need not endanger the sensitive components on a wrist and instead carry the holder/watch in their pocket with valuable credit cards and cash. The fitness aspect of the smart watch is more accurate, in that it does not record actions of the arm of a user, only actual full body movements.

It will be understood that the breadth of the invention concept of incorporation of a credit card holder or bill clip that extends outward from a surface of a support plate of a rectangular removable cell phone case is not limited by the specific description, i.e., any credit card or bill clip or holder with a substantial flat surface of a support plate supporting the clip or holder outward from that flat surface can be adapted using the present description to be fixed in a plate such as bottom plate 2 or otherwise glued or fixed to the backside of a cell phone case as described herein.

It will be further understood that the breadth of the invention concept of incorporation of smart watch with the invention holder extends to any card holder or bill clip that extends outward from a surface of a support plate and adapting said support plate to sufficient width and structural depth to secure in said support plate a housing and circuits of a touch screen smart watch. For instance, said smart watch can be incorporated into bottom plate 2 or into latch plate 3 by way of the above description.

The above described prior art clips may be adapted to incorporate a smart watch by way of the present description as well, by way of thickening support plates from which extends clips or similar structural features to capture credit cards or bills.

Figure 41:
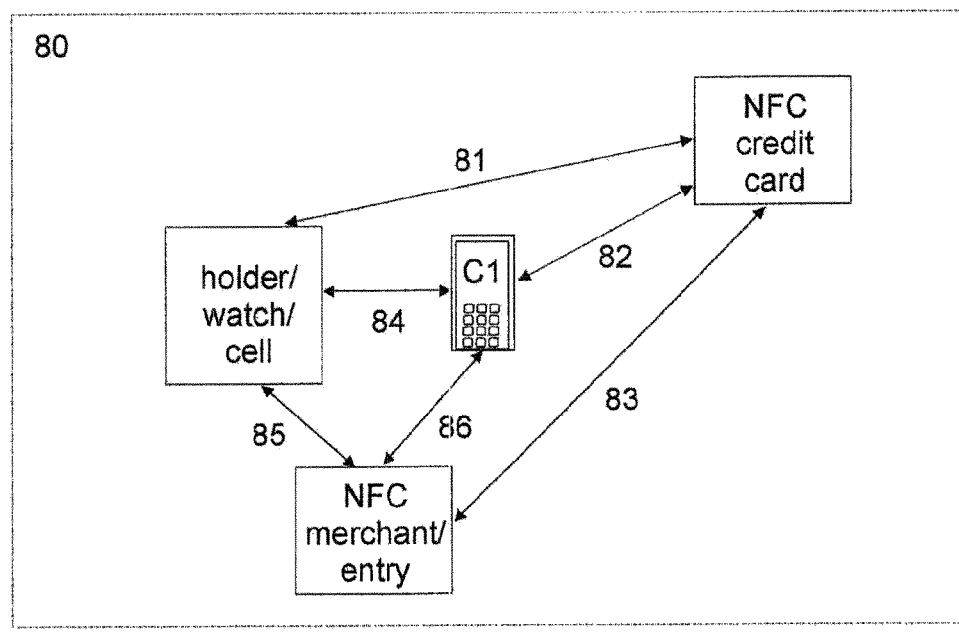
FIG. 41 is a high-level diagram of a credit card or bill holder of any construction incorporating the microprocessor devices of FIGS. 35-39 and communicating wirelessly directly or indirectly with a near field communication enabled credit card or where said near field near field communication enabled credit card secured in said holder wirelessly communicates with a cell phone.

FIG. 41 is a high-level diagram of a security system 80 having additional and virtually un-hackable levels of security for transactions conducted involving a near field communication enabled credit card NFC credit card and a wireless communication between the NFC credit card and an near field communication enabled authorization device NFC merchant/entry. The following is a description of the relevant technology to the security system 80.

Near field communication (NFC) devices provide easily transportable access to payment for and/or provider—delivery of goods and services by way of secure integrated circuits (or their functional equivalent) incorporated into handheld items, some as small as paper tickets, brought into close proximity of a NFC reader device. In cases, advanced security against misuse of NFC devices and readers may be available. Security in digital systems may balance hardware requirements, computing power, memory, and permissible time required for computation of access, transmissions, and security algorithms. In some cases, time is a critical limitation for a security system controlling consumer purchases. For example, consumers may be intolerant of time delays in making purchases or obtaining goods or services by way of digitally secure transactions.

Portable and handheld computing devices may include substantial processing capabilities and where combined with near field communication capabilities for concluding local transactions they provide important additions to consumer methods of purchasing. Such devices may include mobile communications devices enabled with near field communication (NFC) capability for making financial transactions and transacting sales at POS terminals of transaction offering entities (such as mobile cellular telephones, WiFi enabled data devices, such as the iTouch, iPhone and iPad), mobile computer tablets, and laptop computers enabled for cellular communication) (referred to herein as Enabled Devices).

Enabled Devices may have a microprocessor comprising a CPU, memory, and input/output circuits operating under a control program or programs for effective connections to wireless communication components and a local user interface to accomplish wireless communications between an Enabled Device and a remote correspondent.

A remote correspondent may be a wireless communications device across a table from a user of an Enabled Device in a direct peer to peer communication session. A remote correspondent may also be a credit card server system across the globe from a user of an Enabled Device, where the Enabled Device wirelessly communicates with a cellular communication tower or link and thereafter is routed to an Internet connection to the credit card server system for an indirect communication session.

Further, a remote correspondent may be a local sales processing computer server system in a store where a user of an Enabled Device directly wirelessly communicates with a local NFC reader, which in turn in linked with a sales processing sales computer system of the merchant store. As used herein, a remote correspondent comprises any of those recipients or transmitters of voice or data that are capable of communicating directly or indirectly with an Enabled Device. These specific examples of remote correspondents are not intended to be limiting as to the definition of a remote correspondent.

NFC user smartcard architecture combines coprocessors for security protocols RSA, ECC, DES and AES and enables implementation of operating systems including Java Open Platform and MULTOS. However, functions carried out by processor circuits of an NFC user card can be incorporated into processor circuits of appropriately modified or more capable computer chips and processors.

While many advanced security and encryption methods are available in the art, those security methods which meet the requirements of NFC device and readers actually used are limited by well-known industry standards and handheld device capabilities and structures. Presently, a further limitation of handheld devices may occur where an NFC communication includes use of a mobile or wireless communication device (including, without limitation, a cellular phone or WiFi enabled handheld device).

As described in US Patent Application Publication 2010/0205432 (Title: METHOD, SYSTEM, TRUSTED SERVICE MANAGER, SERVICE PROVIDER AND MEMORY ELEMENT FOR MANAGING ACCESS RIGHTS FOR TRUSTED APPLICATIONS; Ser. No. 12/679,874; Filed: Sep. 20, 2008), which is incorporated herein by reference, "Mobile NFC" combines a secure NFC user card or its equivalent and a mobile telephone or similar handheld device. This provides long range wireless communication of NFC voice or data.

NFC user card functionality can be incorporated into a mobile telephone by way of the UICC (Universal Integrated Circuit Card), a removable integrated circuit or card used in mobile phones in GSM, UMTS and similar networks. Such a device must be NFC capable, such as supporting SWP (single wire protocol), to use UICC which provides storage of credit card credentials.

We turn now to a description of the invention security system 80. The remote correspondent of the above corresponds to the NFC merchant/entry aspect of FIG. 41. It should be noted that NFC security is weak where the interception of wireless signals between the NFC credit card and the NFC merchant/entry allow for mis-use by an intercepting device/user.

Mitigating this weakness, embodiments of applicant's system provide an additional level of confirmation security to the wireless transactions. This confirmation security cannot be duplicated by an intercepting device/user.

In the security system 80, NFC merchant/entry device alerts by wireless signals either the (i) invention holder (which in FIG. 40 may be any type of credit card or bill holder or clip with a support plate expanded to incorporate the appropriate microprocessor/interface/NFC enabled device), (ii) the cell phone Cl, or (iii) the NFC credit card of its presence and, after appropriate "handshake" signals, requires authorization from one of these before proceeding with authorization of a transaction or entry.

In the invention security system 80, one of several combinations of communications among the devices of FIG. 41 occurs: (1) authorization is required from the NFC credit card and one of either the invention holder or the cell phone Cl according to authorizations required for NFC transactions; (2) authorization is required by the NFC merchant/entry device directly from either the invention holder (which in FIG. 40 may be any type of credit card or bill holder or clip with a support plate expanded to incorporate the appropriate microprocessor/interface/NFC enabled device) or cell phone Cl, one of which must obtain a typical NFC authorization wirelessly and directly from the NFC credit card before transmitting an authorization code to the NFC merchant/entry device; or (3) authorization is required by the NFC merchant/entry device directly from either the NFC credit card which must obtain a typical NFC authorization wirelessly and directly from the invention holder (which in FIG. 40 may be any type of credit card or bill holder or clip with a support plate expanded to incorporate the appropriate microprocessor and interface) or cell phone C1.

In any of these three security system embodiments, mere duplication of the communicated authorization signal to the NFC merchant/entry device cannot accomplish the transaction. Only interactive communication with (i) the invention holder, which holds the NFC credit card, or (ii) the cell phone C1 and the NFC credit card can accomplish the transaction. This is because the authorization required by the NFC merchant/entry device is a two step authorization depends upon (1) an NFC credit card code and (2) one of an (i) invention holder or (ii) cell phone code.

Security system 80 allows for concluding a sale or for authorized entry into a secure building, said card or bill holder of any construction incorporating the microprocessor devices of FIGS. 35-39 and communicating wirelessly directly or indirectly with a near field communication enabled credit card or where said near field near field communication enabled credit card secured in said holder wirelessly communicates with a cell phone.

Turning now to embodiments of the currency and credit card holder with alternate latch plates or upper jaws, reference is made to FIGS. 42-45.

Similar to the latch plates/upper jaws described above, FIG. 42 shows a rectangular upper jaw 300 in plan 331 and profile 332 views. However, this upper jaw includes a pocket or depressed area 302 in its surface 304. The pocket 302 is for receiving a battery, NFC chip, storage device, or the like 320.

FIG. 43 shows the upper jaw 300 of FIG. 42 which accommodates the battery and/or an NFC chip 320 in the pocket 302. The battery and/or NFC chip may be removable. The upper jaw is mounted to a spring plate or lower jaw 350 that is similar to the spring plates described above. In various embodiments the lower jaw is rectangular and/or substantially flat.

FIGS. 43-44 show one end of a "V" shaped spring 341 is anchored to the lower jaw 350 near an end of the lower jaw 354. The other end of the spring includes a hinge part 316 (see FIG. 44) that is biased toward the lower jaw 350. Hinge 312 includes parts 314 and 316 (see FIG. 44) and hinge part 316 rotatably connects with mating hinge part 314 at one end of the upper jaw 300. For example, a pinned hinge may be used where a pin (not shown) is inserted through hinge parts 314 and 316 to rotatably fix the upper jaw to the lower jaw.

In FIG. 44 the upper jaw 300 is shown above the lower jaw 350 before the hinge parts 314, 316 are mated. This view illustrates the location of a power cable such as a ribbon cable 310 which conducts electric power from the battery 320 within the pocket 302 of the upper jaw 300 to a cell phone or other appliance 330 mounted on a side of the lower jaw 350 opposite the spring 307.

The power cable 310 may take various routes between the battery and the cell phone and along these routes may traverse the interior or exterior of the spring 321. For example, the power cable may be routed from the battery 320, through a pocket end wall 319, and around hinge parts 314, 316. The cable may continue along an interior surface of the spring 321 and through a lower jaw hole such as a hole beneath the spring 323. And, the power cable may end at a power connection of the cell phone 325.

Figure 45:
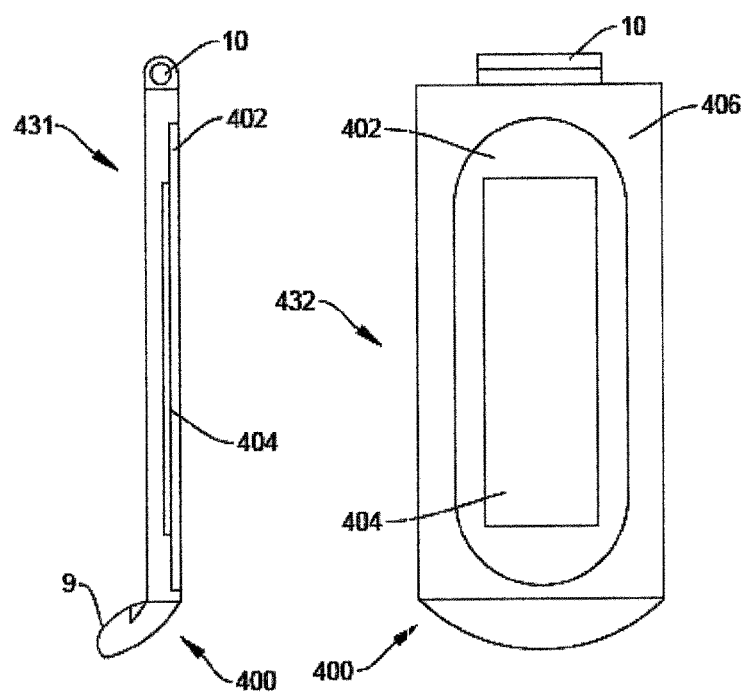
FIG. 45 shows a lever adapted to hold an NFC or Bluetooth device.

In FIG. 45, yet another upper jaw design is similar to the upper jaws described above. As seen, a rectangular upper jaw 400 in presented in plan 431 and profile 432 views. However, this upper jaw includes nested pockets or depressed areas 402, 404 in its surface 406. As shown, pocket 404 is the deepest pocket. Pocket 404 is for receiving an NFC chip and pocket 402 is for receiving an insert or cover such as a natural or manmade fabric, hide, mat, or means of advertising or personalization such as a logo or personalization plate (not shown).

We turn now to variants of a lever wallet that include biometric functionality. In particular, a lever wallet having a biometric input and/or a means for contactless communications with a device such as a point of sale (POS) terminal is disclosed.

Figure 46:
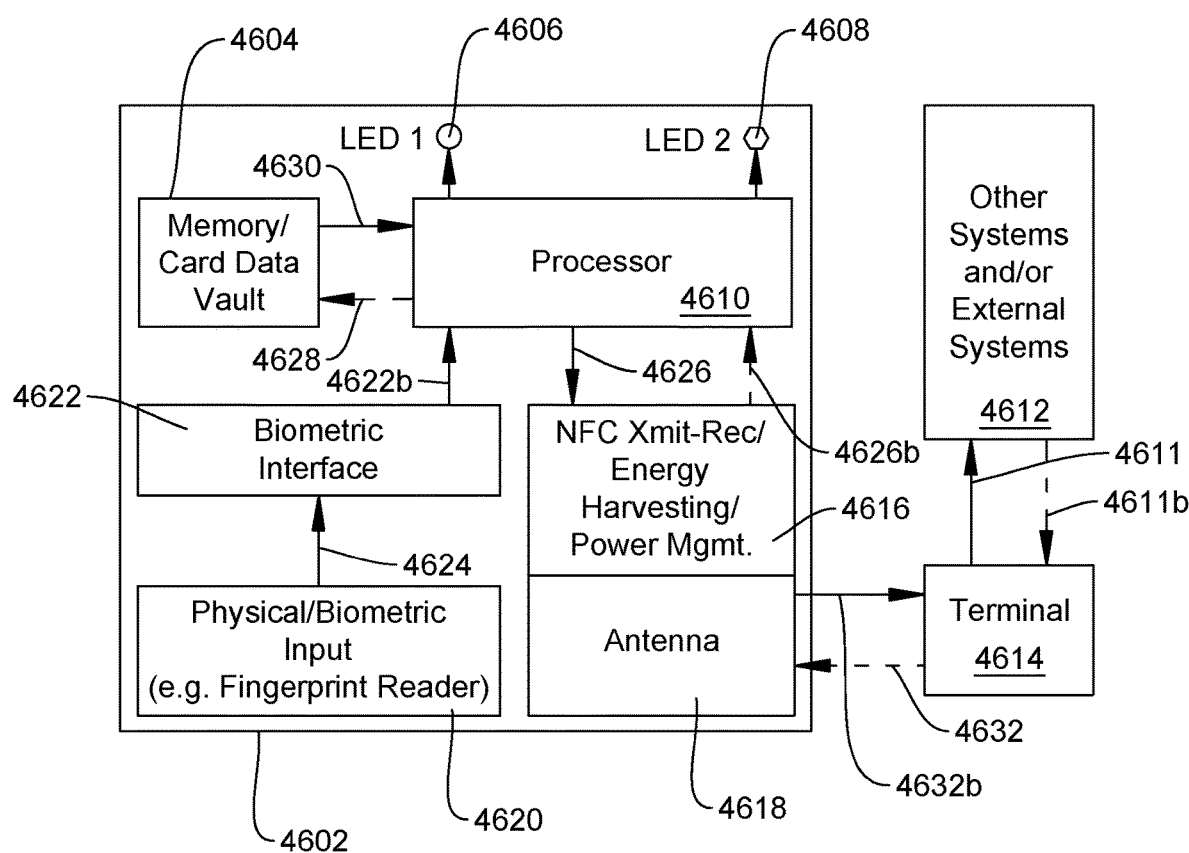
FIG. 46 shows a block diagram of components and functions included in a biometric lever wallet.

FIG. 46 shows components and functions of a wallet lever 4602 that includes biometric functionality. In general, a biometric input 4620 and an antenna 4618 provide for contactless communications with a terminal 4614 in order to verify that the wallet user is authorized to complete the transaction offered by the terminal.

Wallet lever components include a processor 4610 coupled to a biometric input such as a fingerprint reader 4620. A biometric interface 4622 with an output to a processor 4622b may be used between the biometric input and the processor 4620. The interface may include amplifier (s), comparator(s), and/or signal conditioning components. Fingerprint readers or scanners include capacitive devices, optical devices, thermal devices, and ultrasonic devices. A processor is also coupled to a memory device 4604.

Communications 4632 from the terminal 4614 to the wallet lever 4602 may include a terminal's request for a particular credit card or a preferred card as where a store card is involved. Communications 4632b from the wallet lever to the terminal 4614 may include information required for the granting of rights such as the information verifying identity of the wallet user.

Communications from the wallet lever to the terminal typically include transmission of a credit card number after verification that the wallet lever user is authorized to use the card.

Communications from the wallet lever to the terminal typically are preceded by placing a finger on the fingerprint scanner 4620 resulting in fingerprint signals 4624 being sent to the processor 4610. At this point, an authorized user fingerprint file stored 4628 in memory 4604 may be retrieved 4630 and compared with the scanned fingerprint. If there is a match, the processor grants a fingerprint permissive which we will refer to as the grant of a first token.

Two factor authentication may include use of a second token. The second token may be granted based on a code entered into the terminal 4614 or based on yet another biometric comparison.

If the first token is granted in one factor authentication, the processor 4610 sends a credit card number or the like to the terminal 4614. If the first and second tokens are granted in two factor authentication, the processor 4610 sends a credit card number or the like to the terminal.

In some embodiments, the credit card number reaches the terminal 4614 after being transmitted wirelessly. For example, the processor 4610 may pass the credit card number 4626 to an NFC transmitter 4616 and an antenna 4618 may receive the NFC transmitter output. In this manner, the credit card number may be transmitted to the terminal 4614 and the terminal may relay the information to other systems or external systems 4612 to complete the transaction. Information leaving the terminal 4614 may be transferred 4611 to external systems. External system information may also be sent 4611b to the terminal 4614. In some embodiments, the processor 4610 may receive 4626b information such as fingerprint templates, for example from external systems 4612.

One or more colored LED indicators or multicolored LED indicators 4606, 4608 may be located on the lever. LED(s) colors advise the user of transaction status and/or lever operation and in general may be used to show states precedent to transmission of a credit card number to the terminal 4614 and whether a card number is successfully transmitted to the terminal 4614. In an embodiment, a color such as yellow indicates a fingerprint has been acquired by the reader 4620, and/or a color such as green indicates that the fingerprint matches the fingerprint filed in memory 4604, and/or a color such as green or blinking green indicates that the credit card number has been transmitted to the terminal 4614, and/or a color such as red indicates that the credit card number will not be transmitted to the terminal 4614.

Other functions of the wallet lever may include energy harvesting and/or battery or removable battery powering with subsequent management and distribution of electric power to wallet lever electronics. The NFC Transmit/Receive/Energy Harvesting/Power Management device 4616 may accomplish these functions. In particular, energy the wallet lever receives via antenna 4618 communications with the terminal 4614 results in usable electrical power that is harvested and managed 4616 for the benefit of wallet electronics including any of memory 4604, LED 1 4606, LED 2 4608, processor 4610, NFC transmit receive/energy harvesting/power management and biometric interface 4622 in the wallet lever.

Figure 47A:
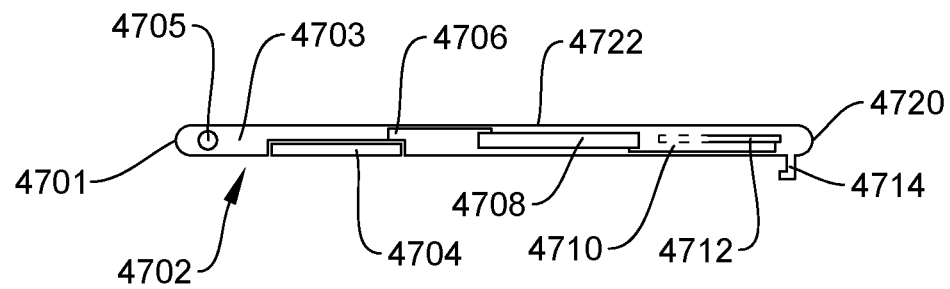
FIG. 47A shows a biometric lever for use with a biometric lever wallet.

FIG. 47A shows a wallet lever 4702. In various embodiments the wallet lever 4702 includes a hinge, hinge point, or pivot point 4705 at a first end 4701 and a catch or latch 4714 at the opposite end 4720. Between these ends, is a fingerprint reader 4704 near the first end 4701 and an antenna 4712 near the opposite end or near the top of the opposite end. Electronics 4708 including any or all of the electronics mentioned in connection with FIG. 46 may be located near a center 4722 of the wallet lever. An electrical connection 4706 exists between the fingerprint reader and the electronics package and an electrical connection 4710 exists between the electronics package and the antenna.

It should be noted that biometric devices other than fingerprint scanners may be used with the inventive wallet. For example, a palm scanner may be included in a base (e.g. FIG. 47D, item 4742) of the wallet (e.g. FIG. 47D items 4702 and 4742). For example, an iris scanner may be included for example on the bottom of the lever (FIG. 470). For example, an imaging device for facial recognition may be included for example on the bottom of the lever. For example, voice recognition may be included with a microphone placed anywhere on the wallet.

The lever frame 4703 may be made from a material that is not an electrical conductor. The lever frame 4703 may be made from or include plastic. The electrical parts may be embedded in a plastic frame.

The lever frame 4703 may be made from or include an electrical conductor such as steel. The lever may include a material of high permeability. For example, where the wallet lever includes steel frame parts, high permeability sheets may be located between the antenna and steel frame parts to lessen the ground plane (detrimental) effects of the steel frame parts.

Where the spring 4744 is a part of a metallic strip that extends throughout the length of the base or a substantial portion thereof (not shown), it may act as a ground plane beneath the antenna 4712 when the wallet lever 4702 is closed against the base 4742. While this ground plane is detrimental to radio frequency communications, it is noted that as shown in FIG. 47E, wireless wallet communications with a terminal 4770 typically occur when the wallet lever is rotated away from the base and therefore when the wallet lever antenna is moved away from the base and out of proximity with the wallet lever antenna.

Figure 47B:
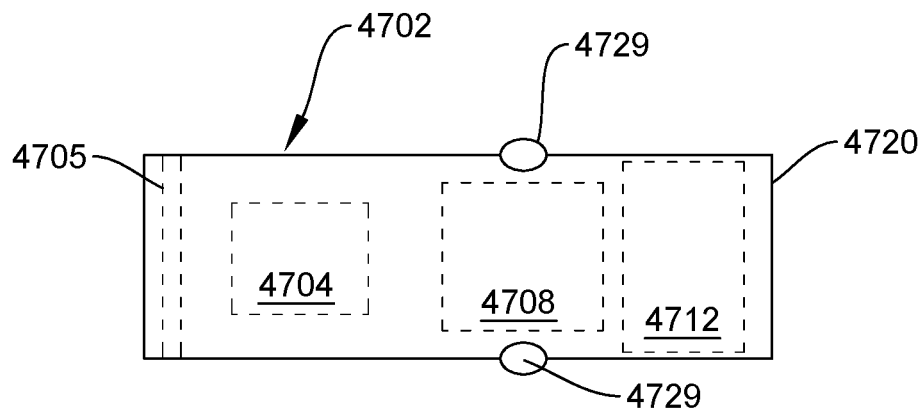
FIGS. 47B-C show top and bottom views of the lever of FIG. 47A.

FIG. 47B shows a top view of the lever 4702 that is visible when the lever is closed against a lever base (e.g., item 2 in FIG. 3). In this view, the fingerprint reader 4704 is shown in dashed lines as are the electronics 4708 and the antenna 4712. The dashed lines indicate placement of components below the upper surface of the wallet lever when the wallet lever is viewed from the top. As such these components are not visible from the top of the wallet lever.

Notably, the antenna 4712 is shown adjacent to the opposite end 4720 of the lever. Advantages of this arrangement include limited antenna effectiveness and as such limited range making it difficult for electronic eavesdropping. Advantages of this arrangement place the antenna at the end of the wallet lever that is placed over the terminal 4614 (for example, see FIG. 47E).

In various embodiments the antenna 4712 may be a wire embedded in the wallet lever frame 4703 and the extent of the antenna may be limited as shown or it may, for example, follow more closely the perimeter of the wallet lever and so be larger in footprint. In various embodiments, the antenna may be coiled traces on a printed circuit board. In some embodiments, the antenna is designed with an inductance of about 1 microhenry or more for use as an NFC antenna.

The lever wallet may be opened with one hand. The benefit is that the wallet may be held and "opened" with only one hand. For example, the thumb of the hand holding the lever wallet may be placed on the lever end 4720 to lift the end away from the base 4702. In another embodiment, a projection, indented portion, or raised portion of the sides of one or more frames 4729 may provide a thumb hold for lifting the lever 4729 (e.g., see lever base 4742) away from the lever base using the same hand that holds the device (e.g., see wallet device 4760). As is typical of the features described herein, this wallet lever lifting feature may be used on any of the wallet levers disclosed herein.

Figure 47C:
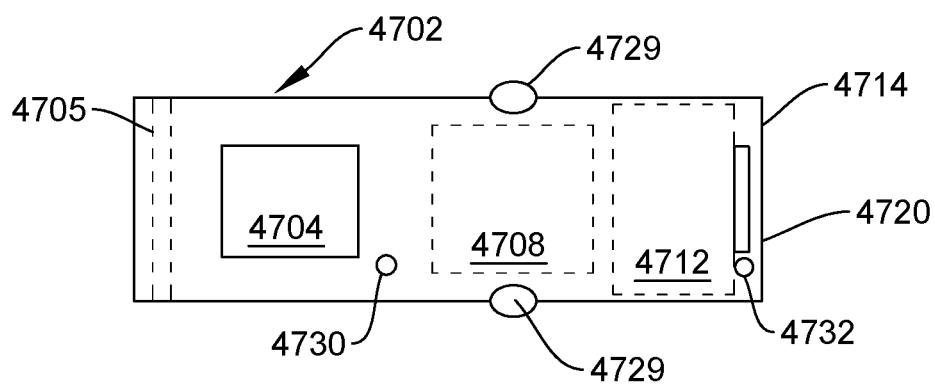

FIG. 47C shows a bottom view of the lever 4702 that is accessible when the lever is pivoted away from the base as shown in FIG. 6. In this view, the fingerprint reader 4704 is visible such that a finger such as a thumb can be placed on the reader. However, because they are fully embedded, the electronics 4708 and the antenna 4712 are again not visible from the bottom of the wallet lever.

In addition, FIG. 47C shows the latch which is visible from the bottom of the wallet lever as are LED(s). In particular, LED(s) 4730, 4732 (see also 4606, 4608) may be located on the lower wallet lever surface adjacent to the fingerprint reader 4730, adjacent to the opposite end 4720, or in another location visible to the wallet user when the user's finger covers the fingerprint reader.

Figure 47D:
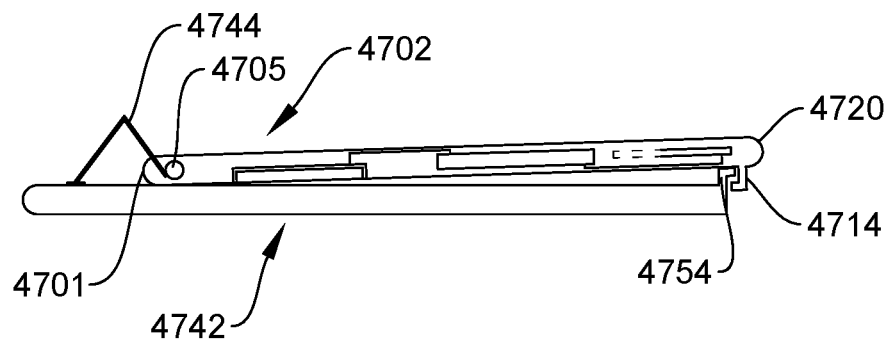
FIG. 47D shows a biometric lever similar to that of FIG. 47A mounted on a base.
Figure 47E:
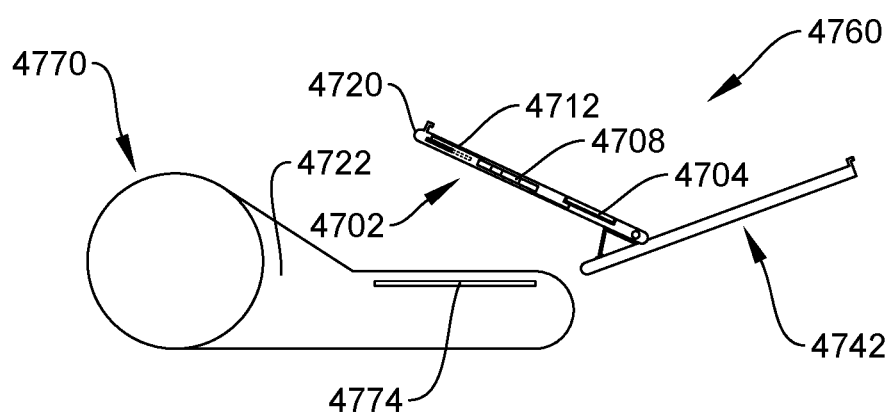
FIG. 47E shows a biometric lever wallet in communication with a terminal.

FIG. 47D shows an assembled wallet lever 4702 and wallet base 4742. At the first end 4701, the wallet lever is biased against the wallet base by a spring 4744. At the second end 4720, a wallet lever latch part 4714 engages a wallet base latch part 4754 such that motion of the wallet lever with respect to the wallet base is limited. Notably, in some embodiments the second end of the wallet 4720 extends beyond the wallet base by about 0.25 to 0.75 inches to allow for a finger hold that enables separation of the latch parts 4754, 4714 and lifting of the wallet lever 4702 away from the wallet base 4742.

It is also noted that the fingerprint scanner 4704 location at the bottom of the wallet lever 4702 provides protection from damage. In particular, when the wallet lever is closed near or against the base 4742, the fingerprint scanner/sensor is protected by items held under the spring 4744 and/or by the base.

FIG. 47E shows a wallet 4760 and terminal 4770. The wallet includes a wallet lever 4702, wallet base 4742, antenna 4712, electronics 4708, and fingerprint reader 4704. The terminal includes a body 4722 and mounted within the body an antenna 4774. As shown, the wallet lever is moved away from the base such that the wallet is "opened." By placing the opposite end of the wallet lever and thus the wallet antenna 4712 above the terminal 4770 and its antenna 4774, the close proximity of the antennas 4774, 4712 provides good electromagnetic coupling and thus good communication.

Figure 48A:
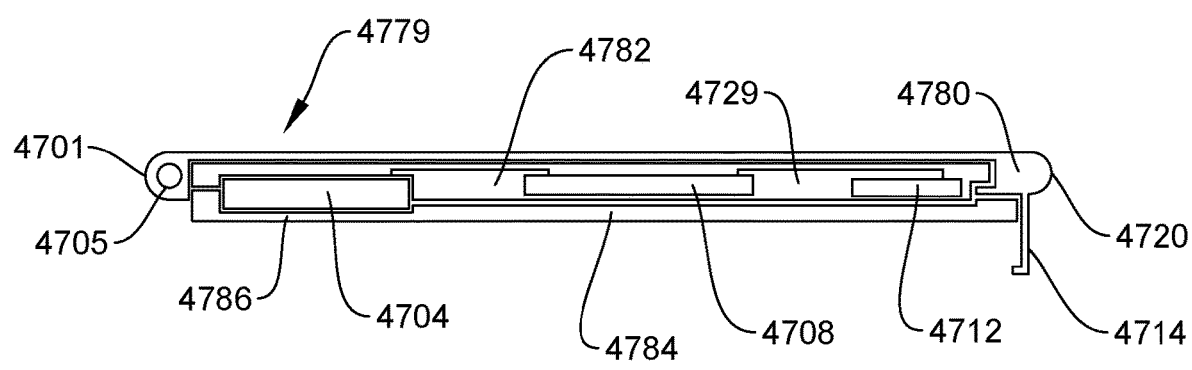
FIG. 48A shows a biometric lever comprising three layers.

FIG. 48A shows another example of a wallet lever 4779. In this example, a middle layer or middle frame 4782 is between a top layer or top frame 4780 and a bottom layer or bottom frame 4784.

Figure 48B:
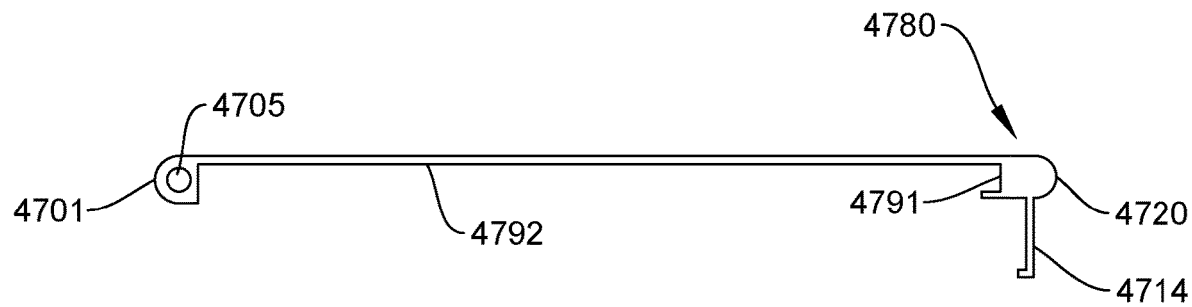
FIG. 48B shows a top layer of the biometric lever of FIG. 48A.

FIG. 48B shows the top frame which includes the pivot point or connection 4705 at a first end 4701 and a latch part 4714 at the opposite end 4720. The frame provides a cavity 4792 for receiving the middle frame 4782 and a pocket 4791 for receiving and fixing a tang 4793 of the middle frame. In various embodiments the top frame may be made from appropriate ones of the materials mentioned in connection with FIG. 47 above. In various embodiments the frame can be made of materials including electrical conductors or electrical non-conductors, plastic(s), metals, and the like. In an embodiment, the frame is substantially made from plastic.

Figure 48C:
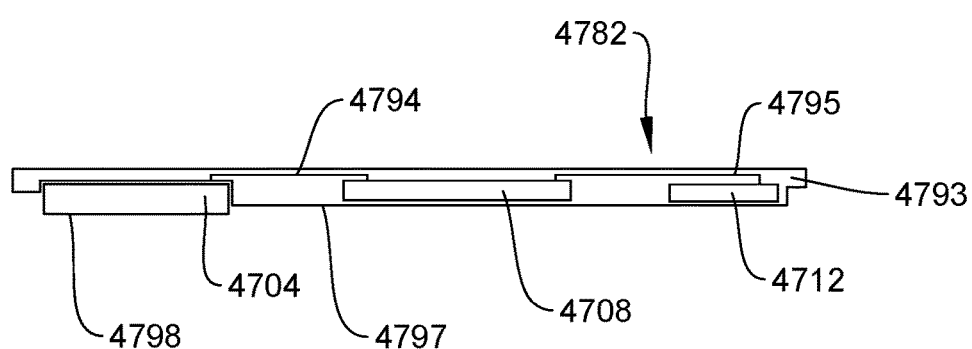
FIG. 48C shows a middle layer of the biometric lever of FIG. 48A.

FIG. 48C shows the middle frame which carries components including the fingerprint reader 4704 which may include a fingerprint scanner bezel, the electronics package (s) 4708, and the antenna 4712. An electrical connection joins the fingerprint reader and electronics package(s) 4794 and an electrical connection joins the electronics package(s) and the antenna 4795. As seen, the fingerprint reader may protrudes from the frame 4798 and provide a free surface that is accessible through a window 4786 in the bottom frame. In various embodiments the middle frame may be made from appropriate ones of the materials mentioned in connection with FIG. 47 above. In various embodiments the frame can be made of materials including electrical conductors or electrical non-conductors, plastic(s), metals, and the like. In an embodiment, the frame is substantially made from plastic.

Figure 48D:
FIG. 48D shows the bottom layer of a biometric lever of FIG. 48A.

FIG. 48D shows the bottom frame 4784 which covers the bottom 4797 of the middle frame 4782 and provides a penetration or window 4786 for exposing a surface 4798 of the fingerprint reader 4704. When assembled, the top frame 4780 and bottom frame may be fixed together by joining the materials of each, with an adhesive material, or with fasteners such as screws. Alternatively, the frames 4780, 4782, 4784 may be joined in pairs or in any order using appropriate methods including any of the methods described above.

As shown, the fingerprint scanner 4704 is accessible through a window or bezel 4786 in the bottom frame 4784. The bezel or window may be proud/extend beyond the fingerprint sensor and/or the fingerprint sensor may be recessed in the bezel or window such that a finger pocket exists to assist in positioning a finger on the fingerprint scanner.

While the above contemplates use of the lever wallet in a financial transaction, the lever wallet may also be used to gain assess to things or places where access is controlled. Things or places where access is controlled. may include metros, airports, facilities, secure facilities, government facilities, detention facilities, commercial establishments, homes, stores of valuable items and the like.

Described below are wallet versions including the Essential Wallet, Premium Wallet, and Ultimate Wallet. Any of these wallets may include one or more of the features described in connection with the biometric wallets above.

We now turn to other versions of the biometric wallet. They are 1) the Essential Wallet, 2) the Premium Wallet, and 3) the Ultimate Wallet.

Essential Wallet

Figure 49A:
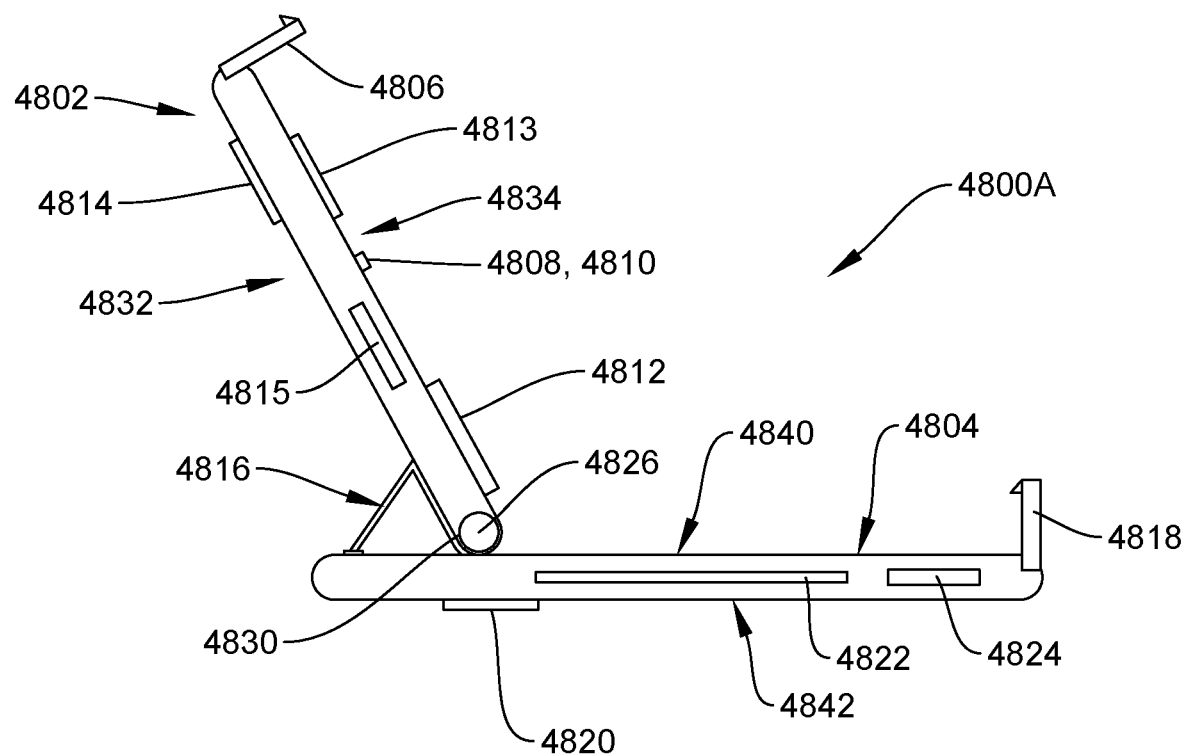
FIG. 49A shows an essential wallet incorporating a lever and a base.

FIG. 49A shows an embodiment of an essential wallet which may sometimes be referred to as a passive wallet 4800 A. In the figure, a lever 4802 is articulated with respect to a base 4804 via a spring means 4816. The lever has lever latch 4806 for mating with a base latch 4818. This wallet may include one or more of the features or components described above.

Currency, credit cards, and the like can be placed between a lever foot 4826 and the base 4804 when a gap is opened between the foot and the base (see FIGS. 7-9). This gap may be opened by pivoting the lever away from the base such that the foot and a spring means end 4830 attached to the lever 4802 and/or foot are lifted away from the base. Once currency and/or cards are placed in the gap the lever may be pivoted back toward the base such that the latch 4806/4818 is engaged.

The lever 4802 includes an internal 4834 face intended to face the base 4804 and an external face 4832 opposite the internal face. Components and/or features visible on the internal face of the lever may include logo 1 4813, indicator lights (e.g. LED) 4808, 4810, and a fingerprint reader 4812. Components and/or features visible on the external face of the lever may include logo 2 4814. Logos may be those of credit services, bank services, payment services, suppliers of the wallet, or the like. For example, logos of one or more entities such as VISA, MASTERCARD, Bank of America, AMEX and other sponsor related entities may be presented.

Components and/or features integral with the lever may include electronics 1 4815. Electronics 1 may include any of the electronic devices mentioned above. Electronics 1 may include one or more of an on/off switch, antenna, EMV devices, micro control unit, secure element, power harvesting and reader. Electronics 1 may include one or more of memory, processor, biometric interface, LED lamp(s), NFC functions, remote enrollment functions including battery, antenna, and circuitry.

The base 4804 includes an internal face 4840 intended to face the lever 4802 and an external face 4842 opposite the internal face. Components and/or features at the internal face of the base may be found with the currency and/or credit cards within the wallet and may include an RFID blocker. Components and/or features at the external face of the base may include logo 3 4820 and/or an RFID blocker 4822. Components and/or features integral with the base may include electronics 2 4815, a battery 4824, and radio frequency (RFID) blocker 4822. Electronics 2 may include any of the electronic devices mentioned above. Electronics 2 may include one or more of an on/off switch, antenna, EMV devices, secure element, micro control unit, power harvesting and reader. Electronics 2 may include one or more of memory, processor, biometric interface, LED lamp(s), NFC functions, remote enrollment functions including battery, antenna, and circuitry.

RFID blocking technology may be used. RFID blocking reduces the readers transmitted signal power, preventing the microchip in the RFID card working which safeguards data. Contactless payment cards, ID cards, passports and the like may use this technology, In some embodiments, the RFID blocker is used to shield multiple cards preventing card clash, or to shield a single card and/or multiple cars such that it is the wallet that communicates with NFC machines and not the card(s). Because, in some embodiments, a typical RFID blocker has a range about 2-3 centimeters, opening the wallet lever can move a wallet antenna such as a wallet lever antenna out of range of the RFID blocker and allow wallet/NFC machine communications.

The essential wallet has two primary electronic functions. The first is receiving a copy of all or a part of card digital contents. The second is providing information for electronic transactions. Notably, as described above this wallet may obtain or harvest electric power from nearby devices such as transaction machines, for example an NFC machine.

In various embodiments, card copying begins with a user's receipt in the mail or otherwise of a EMV card or the like such as a contactless, contact, non-biometric card or biometric card.

In a first case, such as with a non-biometric card, use of the card may be authorized with a financial institution via phone or internet or the like. Then the wallet may receive and store card information. In addition, the card user's fingerprint may be stored in the wallet such that transactions made with the wallet require both the card information and the user's fingerprint. Notably, when the wallet is used with a transaction system such as one including an NFC device, the transaction system is informed by wallet operation that a biometric device is being used, allowing, for example, larger value transactions without a signature.

In a second case a biometric card may be subject to biometric enrollment which includes, for example one or more of, remote enrollment using a battery to power the card, enrollment of the card at an NFC machine, or enrollment of the card at a financial or other institution.

With remote enrollment, this card may be associated with a sleeve, other accessory, or within the wallet to provide battery power to the card either wirelessly or via electrical contacts. For example, sliding the card with respect to a sleeve may activate a circuit/path between the battery and the card such that the card is powered by the battery. For example, where the battery is in the wallet, it may be activated by wallet motion such as opening the lever. In some embodiments, the battery is intended to function for a few hours or days.

In various embodiments, once the card is powered, a user fingerprint is captured by a fingerprint reader on the card. At this point, a unique fingerprint is linked with a number or unique number associated with the card. For example, the card may be numbered and that number may be linked with the user's fingerprint.

Card transactions such as transactions requiring the card number may be subject to a biometric verification. For example, biometric verification that the associated fingerprint is reproduced on the cards fingerprint reader at the time of the transaction may be required before the transaction is allowed. Tokenization may be used.

Where the card must be authorized before transactions are allowed, the card recipient may be required to report receipt of the card via a phone call or another means. The authorizing entity may use the caller's telephone number or information provided by the caller to verify that the caller is authorized to use the card. Authorization may entail a change to the programming of an electronic system that vets card transactions. This change in programming typically makes transactions permissible, but does not permit transactions. Transactions are permitted only when biometric verification occurs at the time of the transaction.

Once a biometric identity is loaded into the card and the card is authorized for use, it may be copied into the electronic system of the wallet such that the wallet can be used for card transactions without the card.

In a card copying step such as a first card copying step, the card identification such as a card number is read by the wallet electronics when the card communicates with the wallet. A wallet light may flash or flash in color to indicate this step. This communication may be spontaneous depending on card/wallet proximity or it may be initiated by a signal from either the card or the wallet. The signal may be initiated by the user. For example, a biometric signal such as a fingerprint or a voice command may initiate the transfer of card information to the wallet. Having loaded the card information, the wallet may now awaits fingerprint recording. A wallet light may flash or flash in color to indicate this step is next. When indicated, the user presses the same finger as was used on the card onto the wallet fingerprint reader and the wallet stores this fingerprint information for use in transactions where the card number and a matching fingerprint are required.

Having completed the card copying process, the wallet is now capable of completing transactions that require the card number and a matching fingerprint. For example, a transaction may be completed merely by placing the wallet proximate an NFC device and opening the lever to initiate communications while placing a fingerprint finger on the wallet fingerprint reader. Note that it may not be necessary to remove the payment card from the wallet or even to have the payment card in the wallet to complete the transaction.

Premium Wallet

Figure 49B:
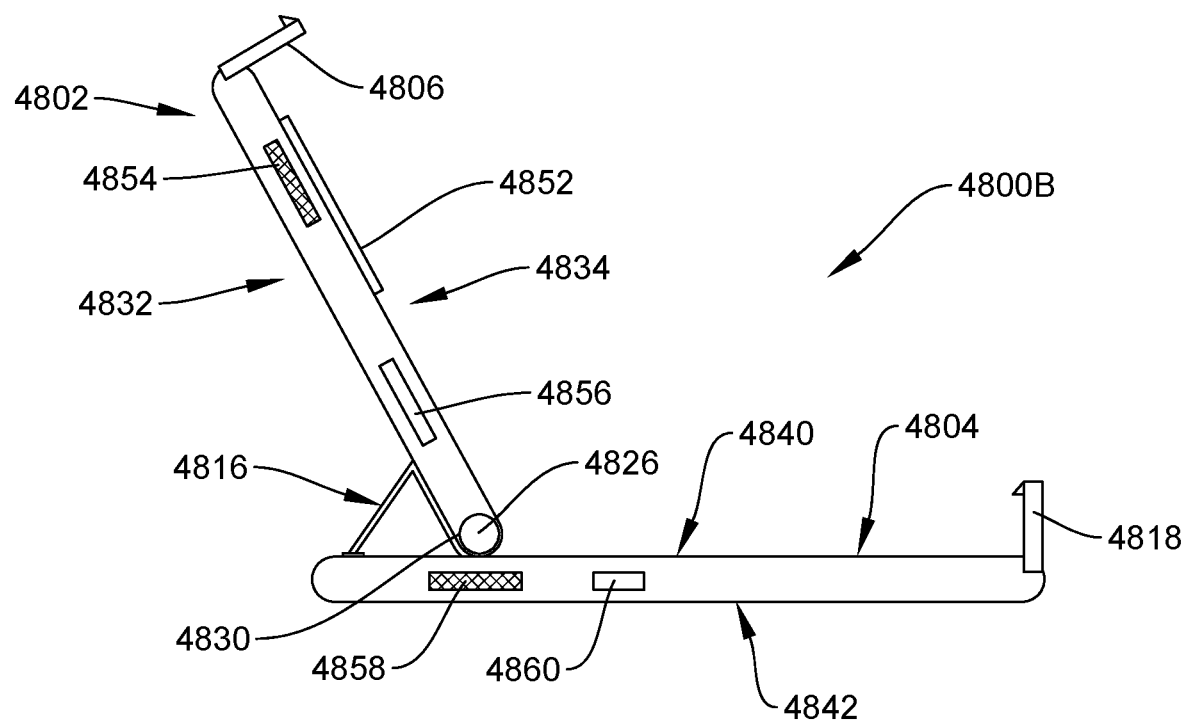
FIG. 49B shows a premium wallet incorporating a lever and a base.

FIG. 49B shows an embodiment of a premium wallet 4800B. In the figure, a lever 4802 is articulated with respect to a base 4804 via a spring means 4816. The lever has lever latch 4806 for mating with a base latch 4818. The lever 4802 includes an internal 4834 face intended to close against the base 4804 and an external face 4832 opposite the internal face. This wallet generally includes the features described in connection with the essential wallet above plus additional features.

Components and/or features visible on the internal face of the lever may include an internal LED screen 4852. Components and/or features integral with the lever may include internal screen electronic circuitry 4856 and may include a battery 4854. Notably, any wallet electronics mentioned here and above may reside on a single chip or on multiple chips.

The base 4804 includes an internal face 4840 intended to close against the lever 4802 and an external face 4842 opposite the internal face. Components and/or features integral with the base may include a battery 4858 and may include circuitry for charging the battery such as circuitry that harvests NFC power to charge the battery.

The screen 4852 provides a visible indication of information from wallet 4800B memory storage and information from other devices and services including transaction devices such as NFC devices, commercial services, financial services, software download services, and the like. For example, information stored in the wallet 4800B may include information related to cards generally, payment/credit cards, identification, commercial services such as transportation and airline services, entry codes/passwords/ credentials, and the like. This information may be presented on the wallet screen and/or manipulated as required to carry out wallet functions.

In some embodiments, information from multiple cards/credit cards/payment cards may be copied to the wallet 4800B and use of this information for transactions may require entry such as contemporaneous entry of a fingerprint on the wallet fingerprint reader 4812. See the discussion of card copying above. In a similar fashion, use of other information stored on the wallet may require entry of fingerprint information.

Figure 49C:
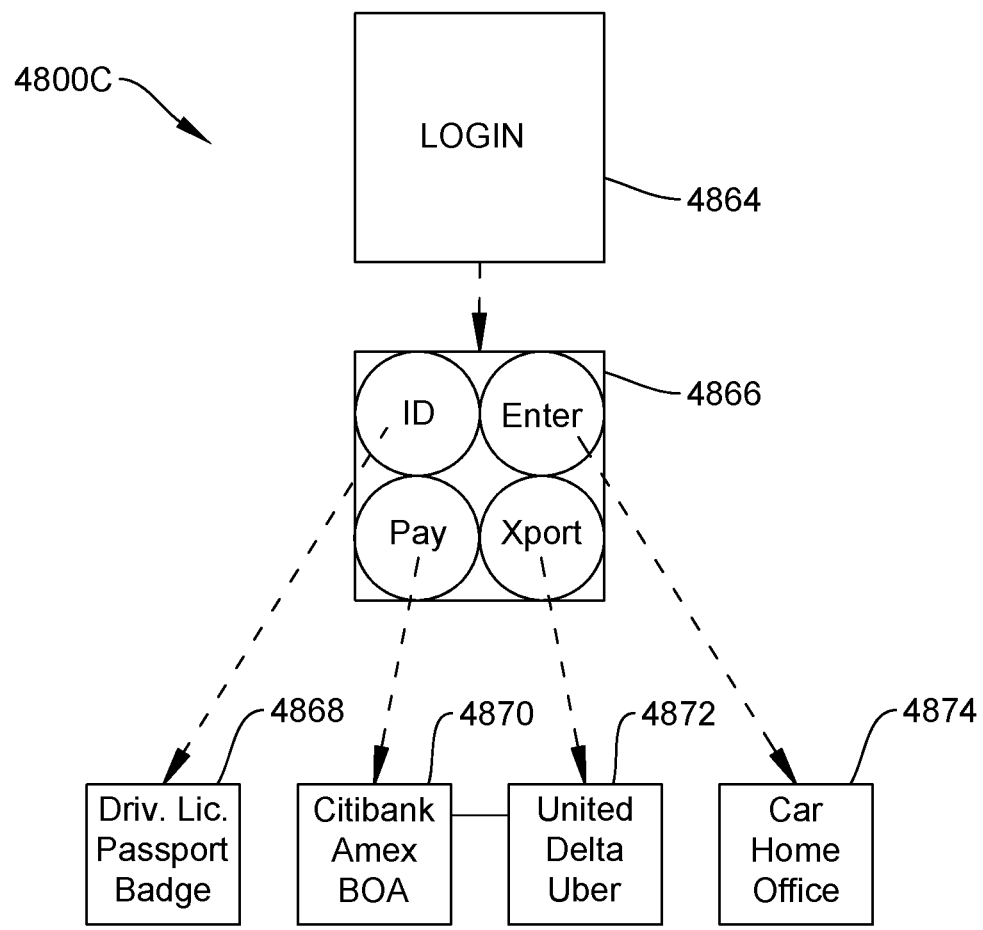
FIG. 49C shows menus or screen shots available on the premium wallet and on the ultimate wallet.

FIG. 49C shows exemplary screen shots 4800C that may be presented on the wallet internal screen 4852. A screen such as a first screen may present a login request 4864. After login, subsequent screens may offer selections from multiple classes of "transactions" 4866. Once a transaction class is selected, a subsequent screen may present multiple class-types for selection 4868, 4870, 4872, 4874.

For example, login may be accomplished biometrically using the wallet fingerprint reader 4812. After login, a class screen 4866 may offer a selection of classes such as a) ID (identification), b) Pay (e.g., use of paypal/credit/payment card), c) Enter (entry or use credentials), and d) Xport (transport and transport services).

Where the ID class is selected, multiple options may appear. These include a drivers license, a passport, or a badge/credential. Where the Pay class is selected, multiple options may appear. These include bank cards such as Citibank, Amex, and Bank of America. Where the Enter class is selected, multiple options may appear. These include access to a car, access to a home/residence, and access to an office or other protected space. Where the Xport class is selected, multiple options may appear. These include United Airlines, Delta Airlines or any airline and Uber or any transport service.

Ultimate Wallet

Figure 49D:
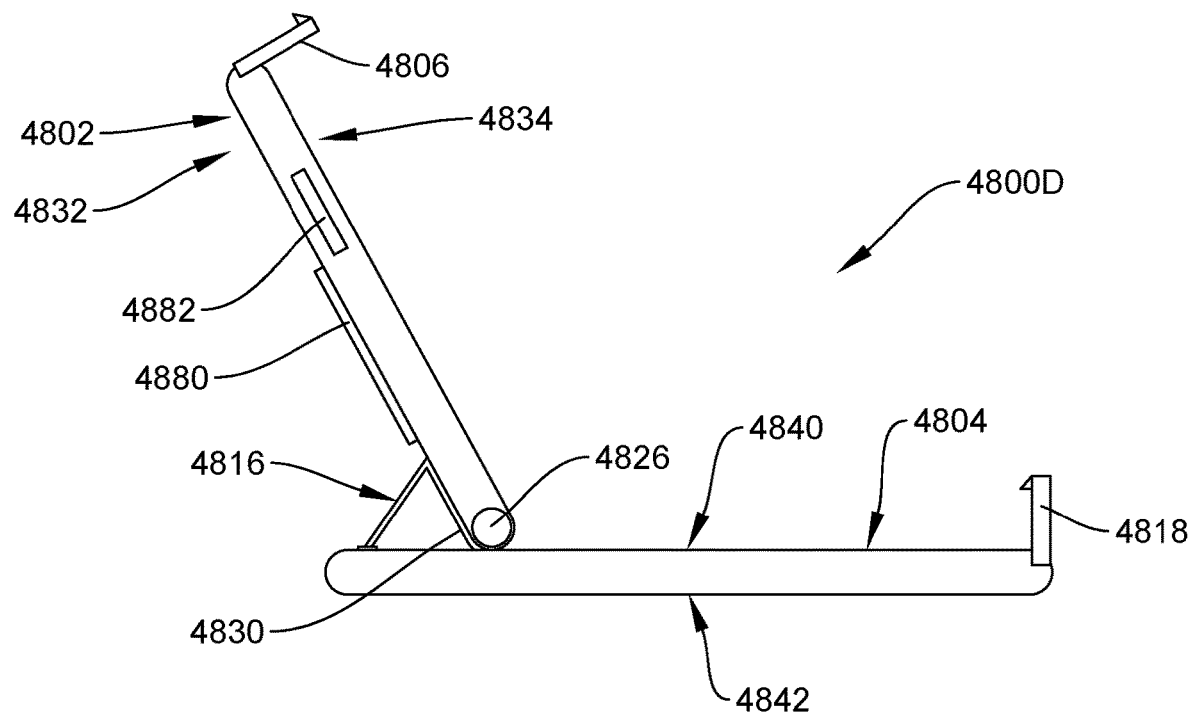
FIG. 49D shows an ultimate wallet incorporating a lever and a base.

FIG. 49D shows an embodiment of an ultimate wallet 4800D. In the figure, a lever 4802 is articulated with respect to a base 4804 via a spring means 4816. The lever has lever latch 4806 for mating with a base latch 4818. This wallet generally includes the features described in connection with the premium wallet above plus additional features.

The lever 4802 includes an internal 4834 face intended to close against the base 4804 and an external face 4832 opposite the internal face. The base 4804 includes an internal face 4840. The internal face is intended to close against the lever 4802 while an external face 4842 is opposite the internal face.

Components and/or features visible on the external face of the lever may include an external LED screen 4880 where any of the functions/displays of the internal screen 4852 may, where appropriate, be implemented. Components and/or features on or integral with the lever may include external screen electronic circuitry 4882. Notably, any wallet electronics mentioned here and above may reside on a single chip or on multiple chips.

The external screen 4852 may display user information such as directions or instructions pertaining to use of the wallet, news, time, weather, stock market quotes, wallet transactions including spending, usage versus credit card limits, map and/or directions, and the like. In various embodiments, the internal screen 4852 may display this information in lieu of or along with the external screen.

The external screen 4852 may display a logo. Logos may be those of credit services, bank services, payment services, suppliers of the wallet, or the like. For example, the logo of one or more entities such as Bank of America or AMEX may be presented. In various embodiments, the internal screen 4852 may display logos in lieu of along with the external screen.

The external screen 4852 may be used to request a login that provides limited or complete use of the electronic features of the wallet. For example, the screen may be touch sensitive, displaying a login request and then obtaining a user response such as a fingerprint on the screen to verify access. For example, a wallet microphone may accept a voice sample to verify access. For example, a wallet iris scanner may accept an iris scan to verify access. In various embodiments, the internal screen 4852 may operate in a similar manner in lieu of along with the external screen.

The external screen 4880 may be used in a dual authentication required for use of the electronic features of the wallet. For example, the external screen may require a first authentication method while another wallet device such as the internal screen 4852 may require a second authentication method.

The premium and ultimate wallets may be charged wirelessly or with wires such as with USB connectors, miniature/micro-miniature jacks, and specialty connectors.

In some embodiments, the external screen 4880 or the internal screen 4852 may be used as a fingerprint reader. Here, login by fingerprint may permit access to wallet operations including access to the classes and class types such as those shown in FIG. 49C.

In some embodiments the ultimate wallet includes internet access, GPS functionality, cell phone functionality, SMT, and camera functionality. Applications may also be downloaded to the wallet and installed such as online banking, barcode related payment systems, stock alerts, traffic maps and the like.

Any of the wallets above including the essential 4800A, premium 4800B, and ultimate 4800D wallets may receive card/document information via a wallet or a cell phone camera. Local or remote optical character recognition/photo recognition may be provided.

Biometric Identification

Any of the wallets above including the essential 4800A, premium 4800B, and ultimate 4800D wallets may provide biometric identification functions and capabilities.

In a first example a wallet owner obtains a verification application ("app") provided by an authority such as the department of motor vehicles (DMV). The app allows the wallet owner to photograph his/her ID (identification such as drivers license) and the app sends the photograph to the authority (DMV). The authority uses the ID photograph to verify that the information on the ID card matches the person identified by the card. If there is a match, the authority issues a verification number and transmits it to the wallet owner, for example by SMT on a smart phone. When received, the verification number is entered into the wallet, for example into a wallet secure memory.

Requests for identification can be answered by operating the wallet to produce the card information subject to finding the verification number stored in the wallet.

In a second example, ID card information can be captured by a wallet camera and sent to an authority for verification. Once verified, the wallet may receive a code from the authority. In some embodiments, the code provides the wallet with a means to verify that card information is associated with the individual identified by the card.

Requests for identification can be answered by operating the wallet to produce the ID information subject to finding the code stored in the wallet.

In a third example, ID card information can be sent along with the wallet owner's fingerprint such as a fingerprint from the wallet fingerprint reader. Here the authority verifies the card information and fingerprint are associated with the individual identified by the card. The code may be used by the wallet to allow association of the drivers license information with the wallet owner's fingerprint.

Requests for identification can be answered by operating the wallet to produce the DL information after entering the wallet owner's fingerprint on the wallet fingerprint reader.

Bifold Biometric Wallet

In another embodiment, a wallet for holding a biometric card may be used with an enrollment key to provide a means for one or more of card enrollment, card activation, and card use. Notably, the wallet described below may be incorporated in whole or in part into any wearable such as a purse, handbag, briefcase, luggage, or the like.

Where suitable, a card, and in particular a biometric card, may be any of a payment card, financial card, driver's license, identification card, facility access card, health card, passport, loyalty card, pilot license, company ID card, or the like. Where suitable and unless otherwise indicated, reference to biometric cards refers to biometric cards that are contactless. Where suitable and unless otherwise indicated, reference to contactless cards refers to non-biometric cards that are contactless.

Figure 50A:
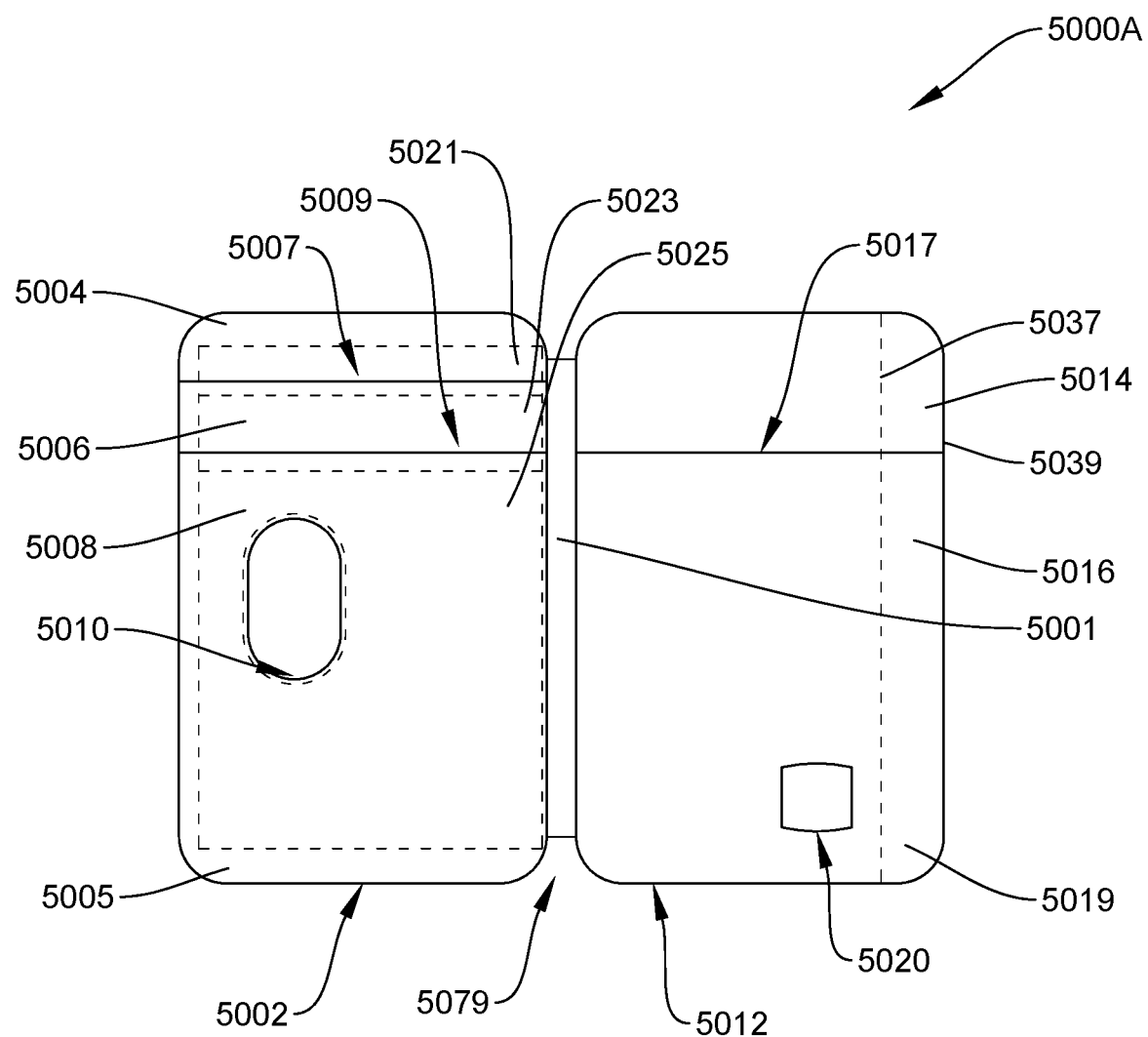

FIG. 50A shows a wallet such as a bi-fold wallet 5000A. The wallet 5079 may be made from materials including synthetic material such as a material including one or more of plastic, fabric, and cellulose. The wallet may be made from materials including a non-synthetic material such as a material including one or more of leather and fabric. Stitching, glue, or fasteners may be used to join overlapping material sections.

The wallet may be constructed with a left part 5002 and a right part 5012, the parts joined at a fold line provided by bendable member 5001 allowing the face 5005 of the left part to be folded opposite the face 5019 of the right part.

The left part 5002 may utilize a stacked construction with a back part 5004 and one, two, or more flaps stacked to cover the back part. For example, a first flap 5006 creating a first pocket 5007 may cover a portion of the back part. For example, a second flap 5008 creating a second pocket 5009 may cover a portion of the first flap. In various embodiments a hole or thumb hole 5010 in the second flap provides a means of urging the contents, such as a card or credit card, of the second pocket to exit the second pocket 5009.

The right part 5012 may utilize a stacked construction with a back part 5014 and one, two or more flaps stacked to cover the back part. For example, a flap 5016 creating a pocket 5017 may cover a portion of the of the back part. In various embodiments a fingerprint hole 5020 in the flap provides a means of touching the fingerprint sensor or reader of a biometric payment card. In various embodiments, a pocket for holding cash 5037 is on the back 5039 of the wallet right side 5012.

In various embodiments the left or right part of the wallet 5002, 5012 may conceal an RFID blocking material or device such as a circuit or a metal foil or other suitable blocking material or device that blocks contactless card signals. Signals may be blocked from cards in the wallet left side 5002 to prevent communications with a device such as an NFC device while signals from cards in the wallet right side 5012 may not be blocked. In various embodiments, an RFID blocking material or device may be used to prevent card clash. For example, one or more sheets of RFID material may be used and/or used between credit cards. In the figure, blocking material 5021 may shield the back 5004 of the wallet left side 5002, blocking material 5023 may shield flap 5006, and blocking material 5025 may shield flap 5008. As mentioned, in some embodiments, the wallet right side 5012 may not include blocking material. Notably, when the wallet is opened or partially opened, the blocking material in the left side 5002 is moved away from a credit card in the right side 5012 such that this unblocked card in the right side can communicate wirelessly with a device, for example a networked device, point of sale device, or NFC device ("NFC" device).

Figure 50B:
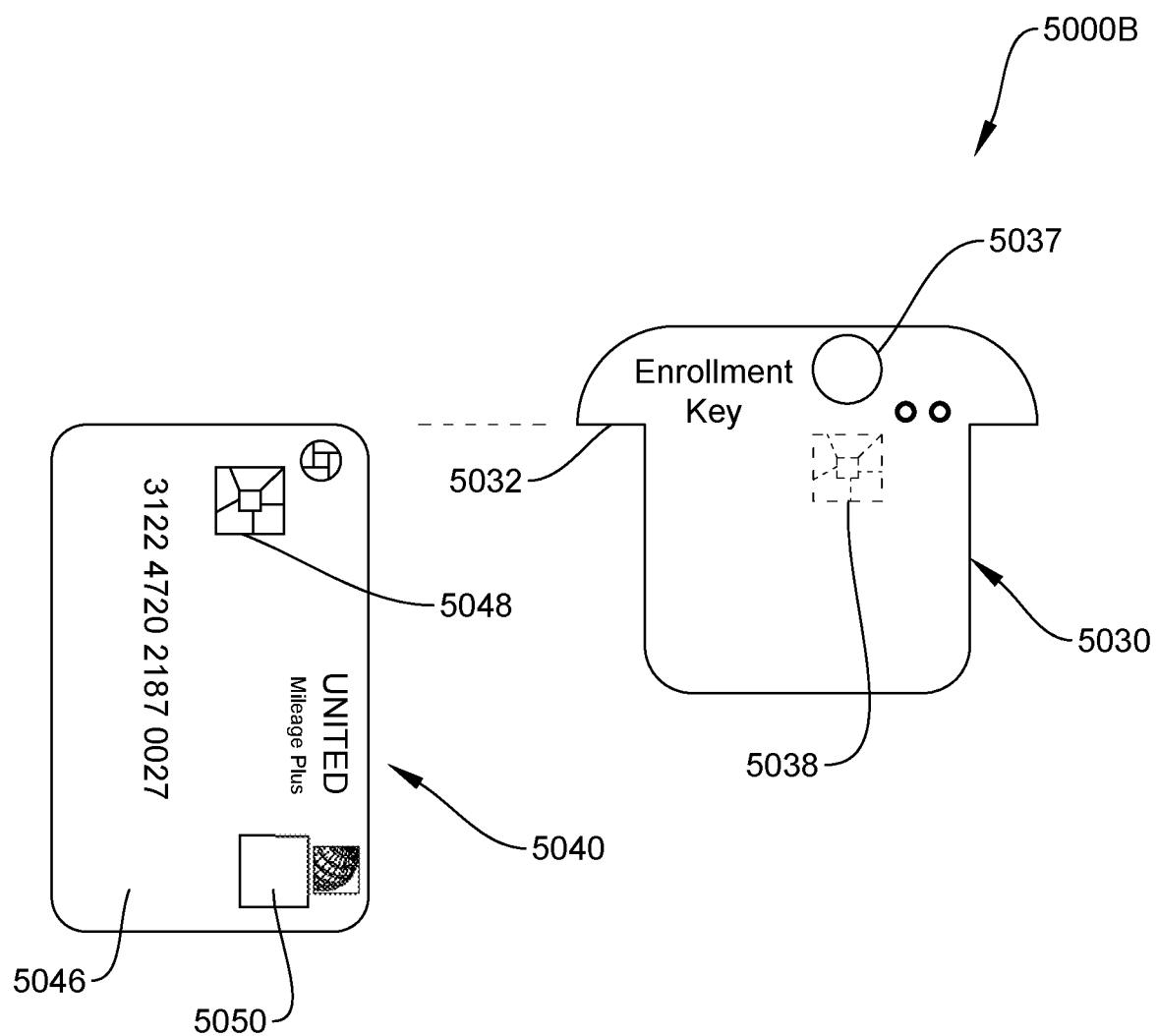

FIG. 50B shows a biometric card and an enrollment key for use with the wallet 5000B. The biometric card 5040 may be a payment card. The biometric card includes pad contacts for electrical connection which may be referred to as an "EMV chip" 5048 and a fingerprint sensor or reader 5050 for registering a fingerprint(s).

The enrollment key 5030 includes pad contacts on its back side 5038 for mating with the biometric card pad contacts 5048 on the card front side 5046. That is, when the enrollment key is superposed over the card, electrical contact is made between the pads. Notably, the enrollment key contact pad may utilize electrical contacts elevated above a surface of the enrollment key and/or biased electrical contacts. Biased electrical contacts may include moving, spring, or elastomeric parts. The enrollment key may include shoulders 5032 such that the enrollment key has a "T" shape. The shoulder or shoulders may limit depth of insertion of the enrollment key in the wallet. A battery 5037 is included in various embodiments.

Figure 50C:
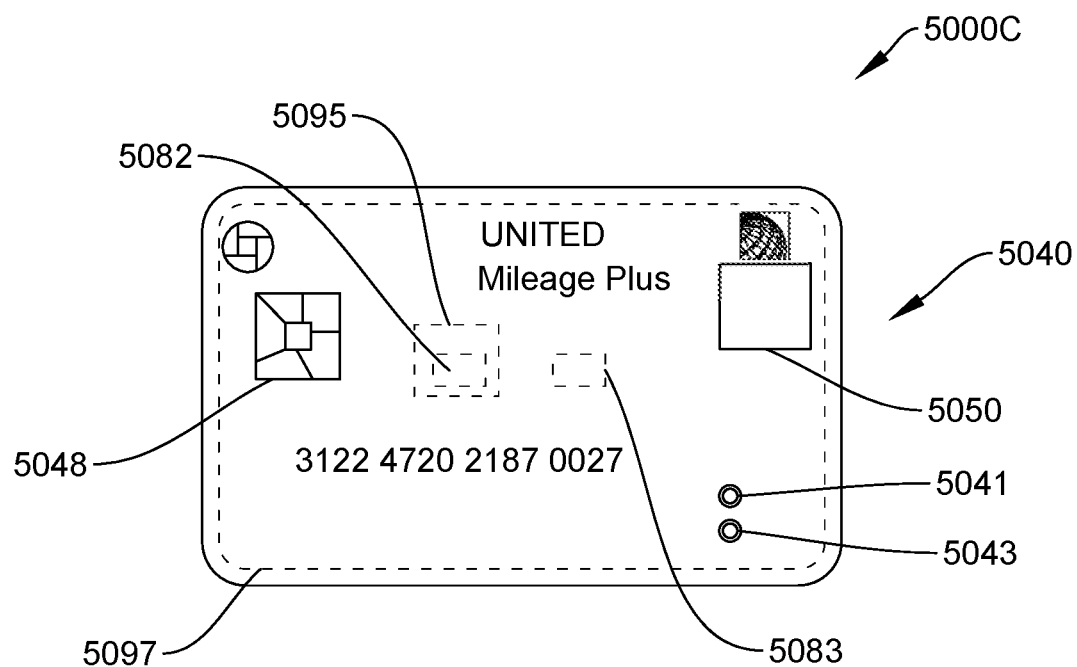

FIG. 50C shows another embodiment of the biometric card 5000C. Here, the card 5040 includes one or two light emitting elements 5041, 5043 such as first and second LEDS. The LEDS may be any color(s), different or not. The first LED may be a first color or multicolor. The second LED may be a second color or multicolor. In an embodiment, the first LED is green or red and the second LED is the other color, green or red. In an embodiment, only a first LED is used and this LED may be multicolor. These one or more card LEDS may indicate power supplied to the card, fingerprint sensor ready, place finger again, transaction ready to be made, transaction completed, fault, or similar. In various embodiments, card electronics 5095 interconnect with the contact pad 5048 and with a card antenna 5097. In some embodiments, memory may be included in card electronics 5082 or apart from card electronics 5083.

Figure 50D:
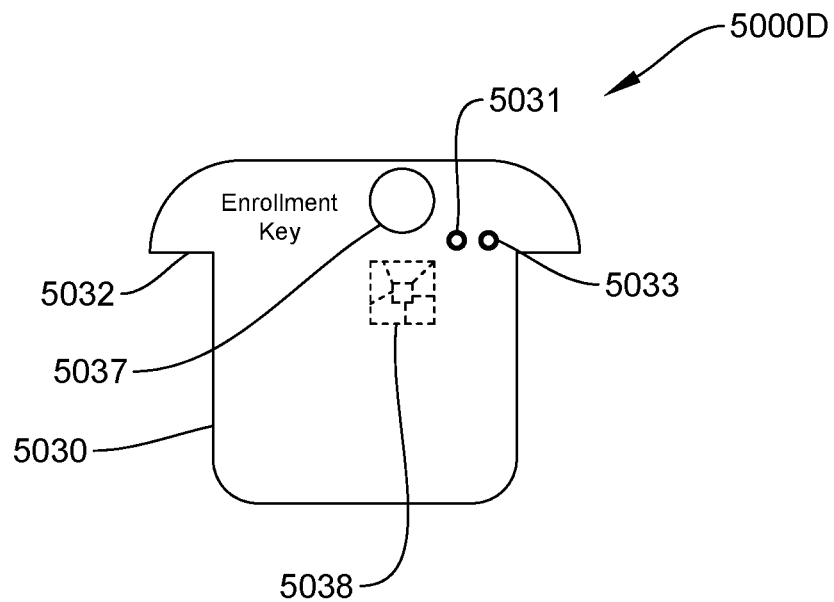

FIG. 50D shows another embodiment of the enrollment key 5000D. Here, the enrollment key 5030 includes an electric power source such as a battery 5037 and one or two light emitting elements 5031, 5033 such as first and second LEDS. The LEDS may be any colors, different or not. The first LED may be a first color or multicolor. The second LED may be a second color or multicolor. In an embodiment, the first LED is green (for example) or red (for example) and the second LED is the other color, green or red. In an embodiment, only a first LED is used and this LED may be multicolor. These one or more card LEDS may indicate power supplied to the card, fingerprint sensor ready, place finger again, transaction ready to be made, transaction completed, fault, or similar. Here and elsewhere, any LED may flash to indicate status.

Figure 50E:
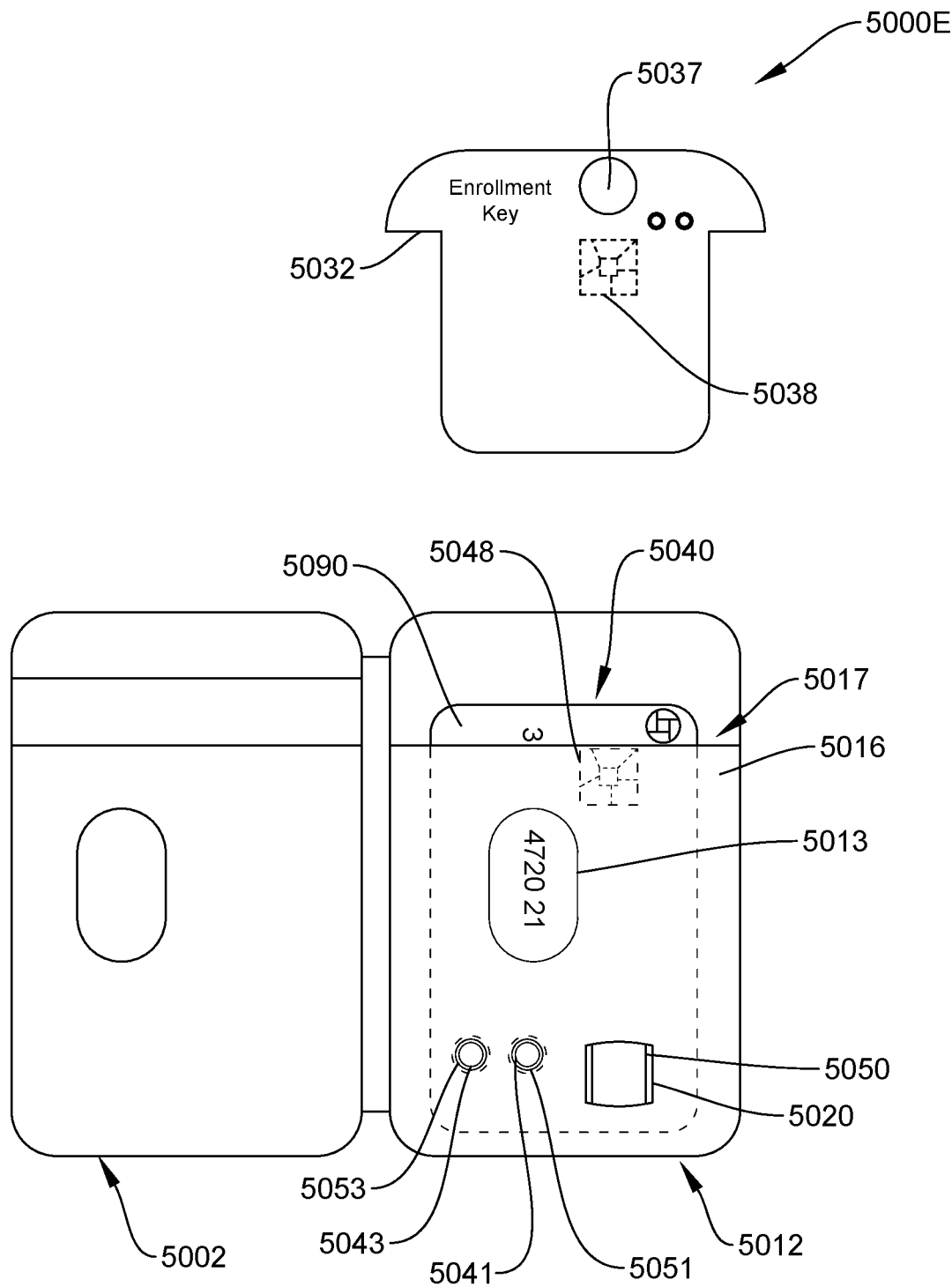

FIG. 50E shows a partially assembled wallet, biometric card, and enrollment key 5000E. Here, the card 5040 with card front face 5090 is inserted in the wallet right part 5012, for example behind the flap 5016 as in a pocket. Notably, when inserted in the wallet, the card is guided into a first fixed position, for example by fitment in the pocket, for example fitment in guides (not shown) affixed to the wallet. The flap may include a fingerprint hole 5020 for accessing the fingerprint sensor 5050. Notably, the fingerprint hole may be any size or shape enabling fingerprint sensing, for example the fingerprint hole may be any size so long as means for retaining the card in the wallet is provided. For example, the fingerprint hole may expose a lower half portion of the card, for example to allow fingerprint sensor access for different cards with different fingerprint sensor locations. The flap 5016 may have a hole or thumb hole 5013 allowing a user to force a card from the pocket 5017.

The flap 5016 may be transparent or partially transparent. Where the flap is not transparent, the thumb hole 5013 may reveal a portion of the inserted card. Where the flap is not transparent, the flap may include one or two penetrations 5051, 5053 for viewing one or two card lights 5041, 5043. Cutout 5020 may expose the fingerprint sensor 5050. Notably, a cutout that demarks the fingerprint sensor, mentioned here and elsewhere, may include a tactile feature such as a rim, lip, wall or similar feature such as a) allowing placement of a finger without viewing the cutout or b) guiding a finger to a proper position over the fingerprint sensor.

Figure 50F:
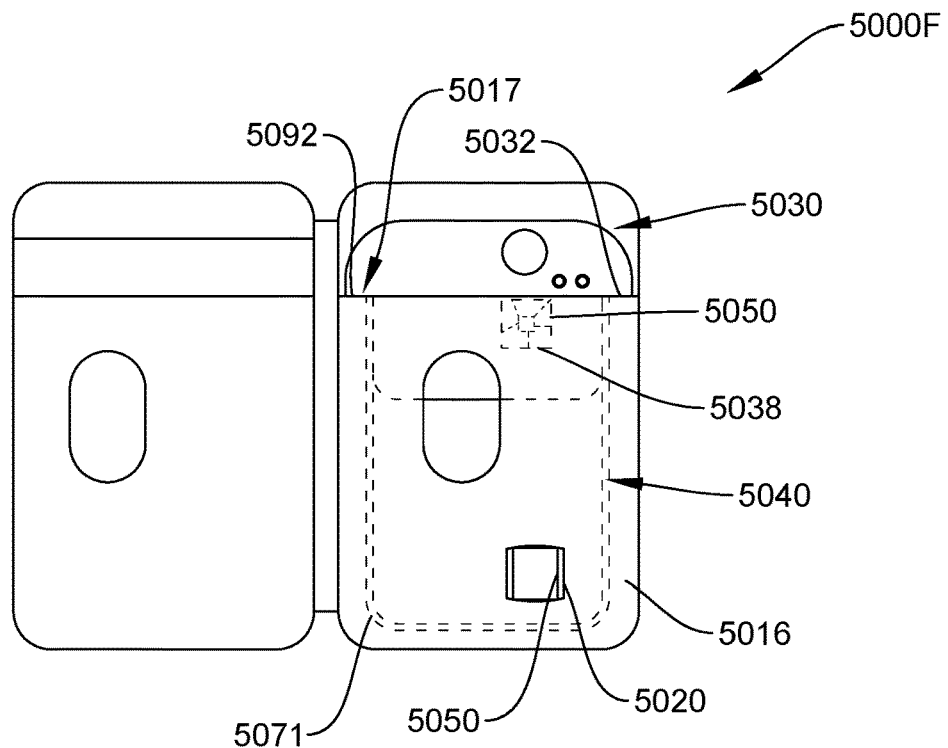

FIG. 50F shows a wallet assembled with the enrollment key/enrollment card 5000F. Here, the enrollment key 5030 is inserted in the pocket 5017 and/or into guides (not shown) affixed to the wallet, for example in a second fixed position, such that the enrollment key contact pad 5038 is over and in contact with the biometric card contact pad 5048 on the card front face 5090 (see FIG. 50G). Notably, the enrollment key shoulders 5032 lodge against upper edges or near upper edges 5092 of the flap 5016 to fix the depth of insertion of the enrollment key in the pocket 5017 and so to align the contact pads.

Contact between the card contact pad 5048 and the enrollment key contact pad 5038 enables electric power from the enrollment key battery 5037 to be transferred to card electronics 5095 (see FIG. 50C). When power is available to the card electronics, the fingerprint sensor 5050 may be enabled.

In some embodiments, stitching 5071 or a similar construct with a similar purpose, guides and may limit insertion depth and/or lateral motion of the biometric card 5040 and/or the enrollment key 5030.

Figure 50G:
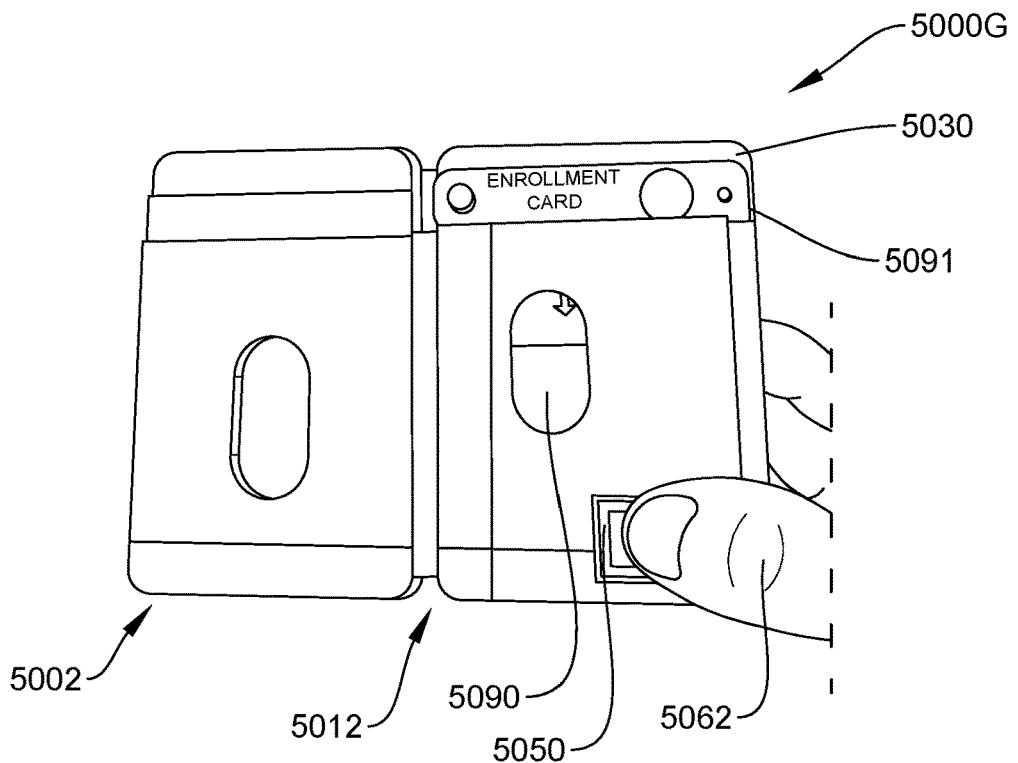

FIG. 50G shows a fingerprint sensor operation such as an enrollment operation 5000G. Here, a wallet 5079 assembled with the enrollment key 5030 provides access 5020 to the fingerprint sensor 5050 on the biometric card 5040 and a user places a finger 5062 on the fingerprint sensor. One or multiple placements of any finger or multiple fingers may be used to obtain a fingerprint reading. The fingerprint reading may be stored in memory 5083 on the card 5040 or in memory 5082 in card electronics 5095 or within the card's electronic ecosystem (see also FIG. 50C). Notably, the enrollment key 5030 shoulders 5037 may extend beyond 5091 the pocket 5017 and serve to stop further insertion of the enrollment key.

Notably, fingerprint reading, and/or final verification of enrollment, may be used alone or in conjunction with a code to activate the card. For example, where the bank provides the card with stored fingerprint data, this data may be compared with data obtained from the fingerprint sensor to activate the card. And notably, an agency or government agency may utilize a fingerprint stored in a government or other system for fingerprint matching.

Figure 50H:
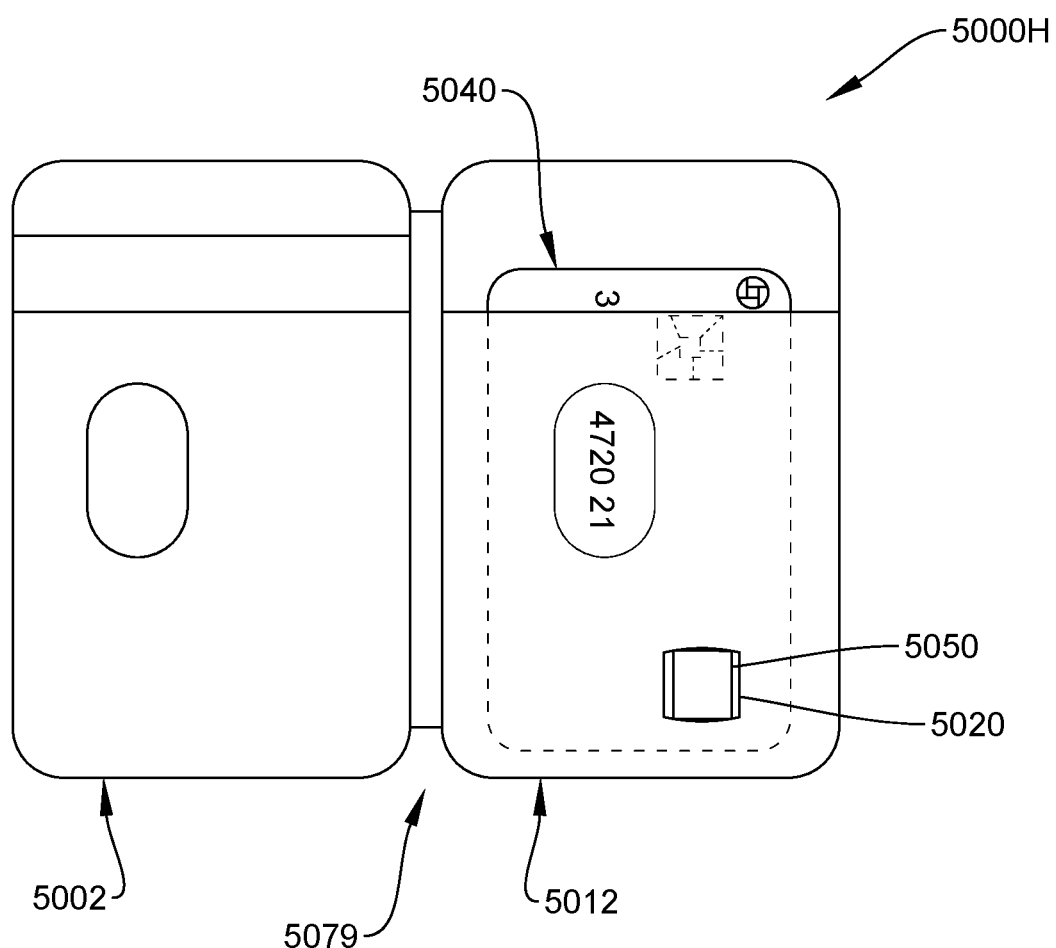

FIG. 50H shows the wallet 5079 with the card inserted after enrollment 5000H. Here, the card 5040 may be activated via communication with a networked device. Here and elsewhere, the networked device may communicate with a dual interface card or in a wireless, or contactless, or contact manner.

Figure 50I:
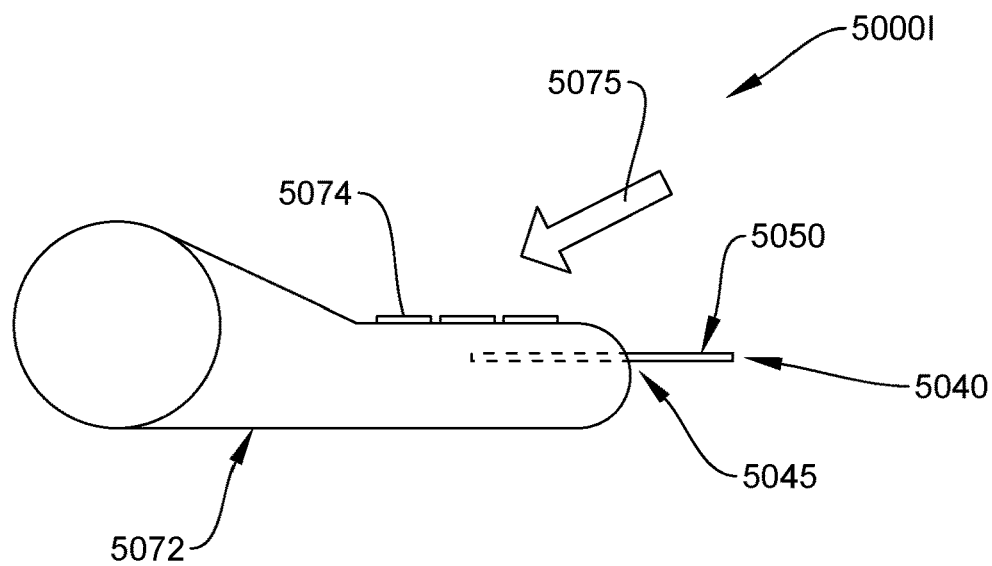
Figure 50J:
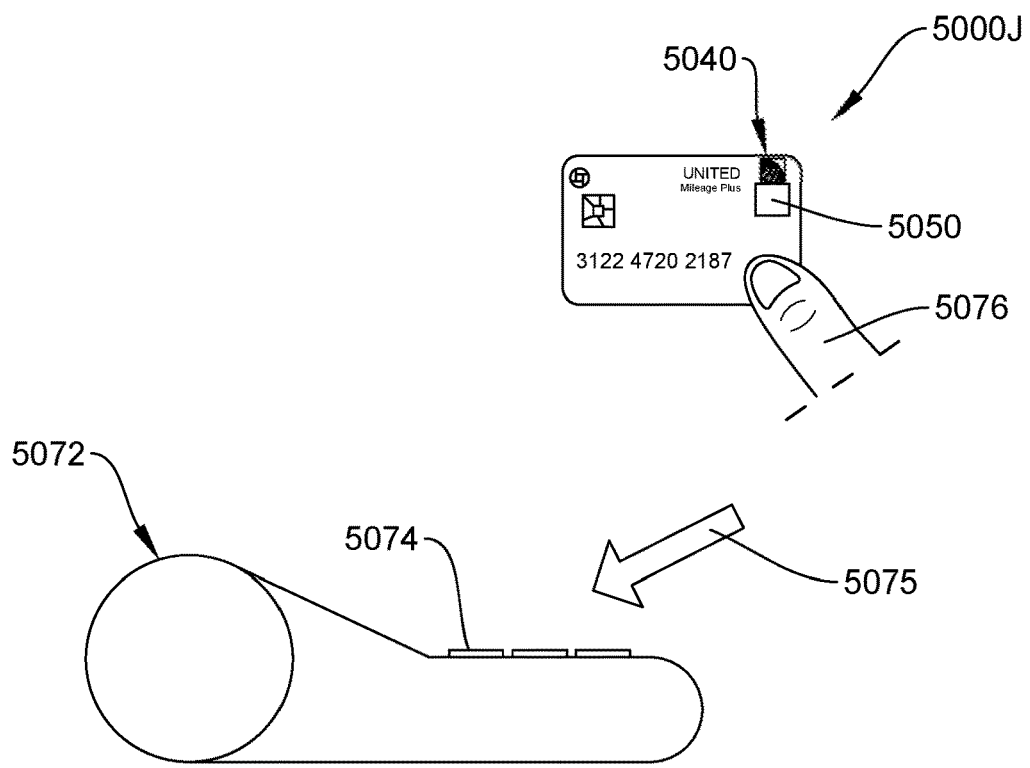

FIG. 50I shows activation of a biometric card in a networked device 50001. In particular, the card 5040 is inserted 5045 into a networked device such as an NFC device 5072. Then, a code such as a PIN code is entered 5074, 5075 into the device. Note the card user need not put a finger on the fingerprint sensor 5050 in this embodiment. In another embodiment, activation requires that the card user press the fingerprint sensor before or after the code is entered.

FIG. 50 J shows activation of a biometric card using a wireless connection with a networked device 5000 J. In particular, the card 5040 is held near a networked device such as an NFC device 5072. Then, a code such as a PIN code is entered 5074, 5075 into the device. Note the card user need not put a finger 5076 on the fingerprint sensor 5050 in this embodiment. In another embodiment, activation requires that the card user press the fingerprint sensor before the code is entered.

Figure 50K:
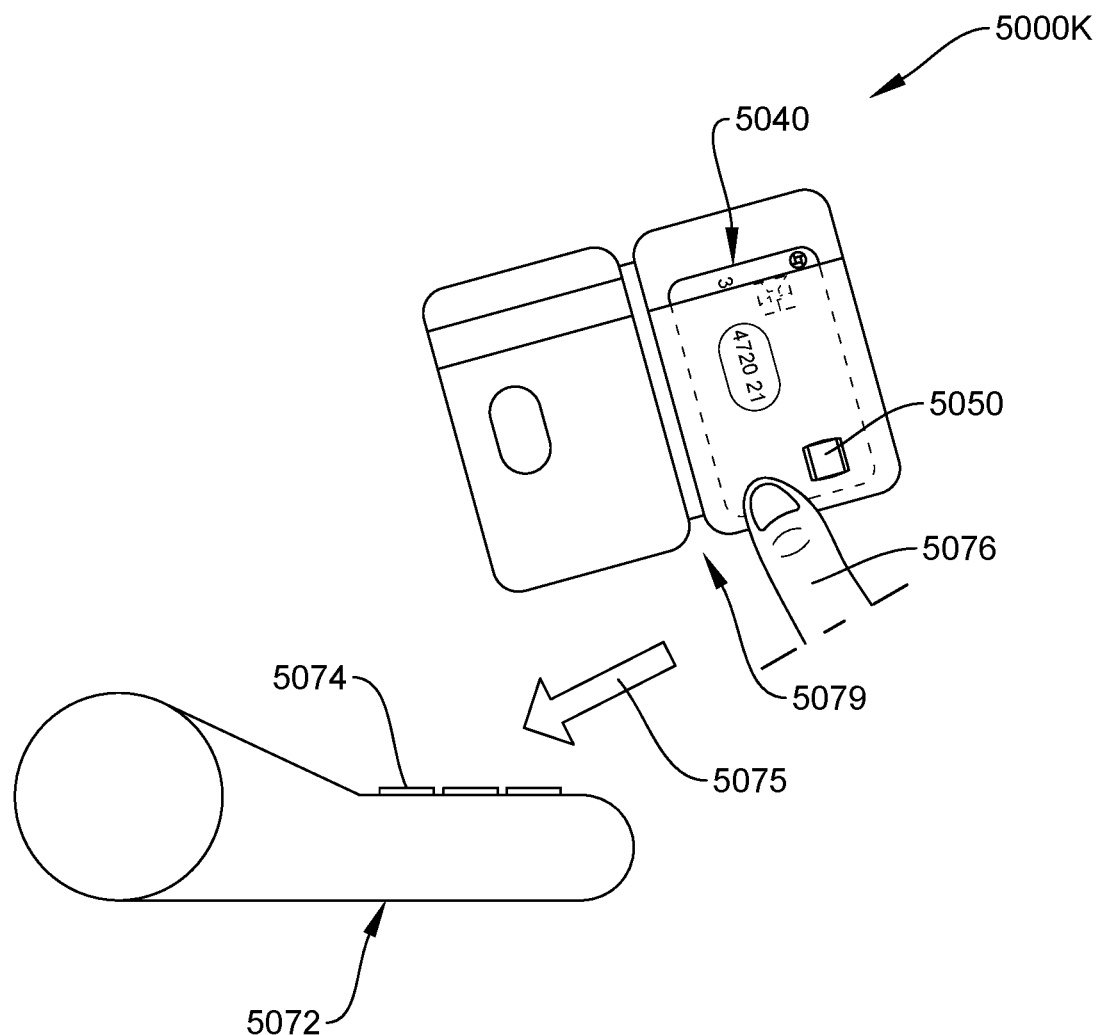

FIG. 50K shows activation of a biometric card in a bifold wallet using a wireless connection with a networked device 5000K. In particular, the card 5040 in a bifold wallet 5079 is held near a networked device such as an NFC device 5072. Then, a code such as a pin code is entered 5074, 5075 into the device. Note the card user need not put a finger 5076 on the fingerprint sensor 5050 in this embodiment. In another embodiment, activation requires that the card user press the fingerprint sensor before the code is entered.

FIG. 50L shows use of the biometric card in a bifold wallet to make a financial transaction 5000L. In particular, the card 5040 in the wallet 5079 right hand side 5012 is a biometric card held near a networked device such as an NFC device 5072. Notably a second contactless card 5041 is in the wallet left hand side 5002 but is blocked and/or prevented from card clash by an RFID material or device 5021. The fingerprint sensor 5050 is then pressed with a finger 5076. For example, a finger may be inserted between and hold apart the wallet halves 5002, 5012 when the finger is placed on the fingerprint sensor such that RFID material in the wallet left hand side 5002 is moved away from the biometric card to allow for NFC communications. After a fingerprint is successfully entered, the transaction may be consummated if there is no error. Typical errors include holds or credit holds placed on cards or users by card issuers and may include card clash.

FIG. 50L describes a payment with a biometric card 5040 in the bifold wallet right side 5012, this biometric card being the only card in the wallet right side that is enabled for contactless communications. Contactless cards 5041 in the wallet left side 5002 do not clash during biometric card communications, for example card clash is prevented by RFID blocking material 5021 in the wallet left side. Notably, the biometric card may be replaced by a non-biometric contactless card. Here, the non-biometric contactless card may again be used for payments without removing the non-biometric contactless card from the wallet. For example, the wallet left side may be separated from the wallet right side by a finger, the gap therebetween removing the biometric card from the effects of the RFID blocking material and enabling communications with an NFC device. For example, separating the wallet left and right sides as in an opened wallet exposes the non-biometric contactless card for communications with an NFC device.

FIG. 51A shows an embodiment with fingerprint enrollment using a biometric card 5100A. Here, fingerprint enrollment 5110 includes: a step 5112 of assembling the bifold wallet by placing the biometric card 5040 in the right pocket 5017 with the fingerprint sensor 5050 accessible via a pocket cut out 5020; a step 5114 of completing assembly by placing the enrollment key in the right pocket such that the key contact pad 5038 is over the card EMV/contact pad 5048; a step 5116 where the card or key light that indicates the card and/or key are ready for fingerprint enrollment; a step 5118 where a finger is pressed against the fingerprint sensor multiple times in different positions to save fingerprint indicia; a step 5120 where the card or key light indicates the fingerprint is saved; and a step 5122 where the enrollment key is removed from the wallet.

FIG. 5 IB follows FIG. 51A and shows PIN/code enrollment steps 5100B. Here, PIN/Code enrollment 5130 includes: a step 5132 of removing the biometric card from the wallet 5079; a step 5134 of inserting the card into an NFC device 5072; a step 5136 where at an NFC prompt or card light 5041, 5043 the PIN/code is entered into the NFC device: a step 5137 where after successful PIN/code entry the card is activated; and, a step 5138 where the card is removed from the NFC device.

FIG. 51C follows FIG. 5 IB and shows use of the biometric card in a financial or other transaction 5100C. Here, use in a transaction 5150 includes: a step 5152 of assembling the wallet by placing the biometric card in the wallet right pocket with the fingerprint sensor accessible via the cut-out; a step 5154 of holding the wallet near an NFC device, the wallet opened to move the wallet left side (may have RFID blocking material) away from the wallet right side; a step 5156 of placing a finger on the card fingerprint sensor to enter fingerprint indicia; and a step 5158 of completing the transaction upon successful entry of fingerprint indicia.

It should be noted that the use of biometric card and enrollment key lights is, with respect to any one of 51A-C, optional. Card lights may be used, enrollment key lights may be used, or no lights may be used for any step in FIG. 51A-C.

Bifold Plus Wallet

Figure 52A:
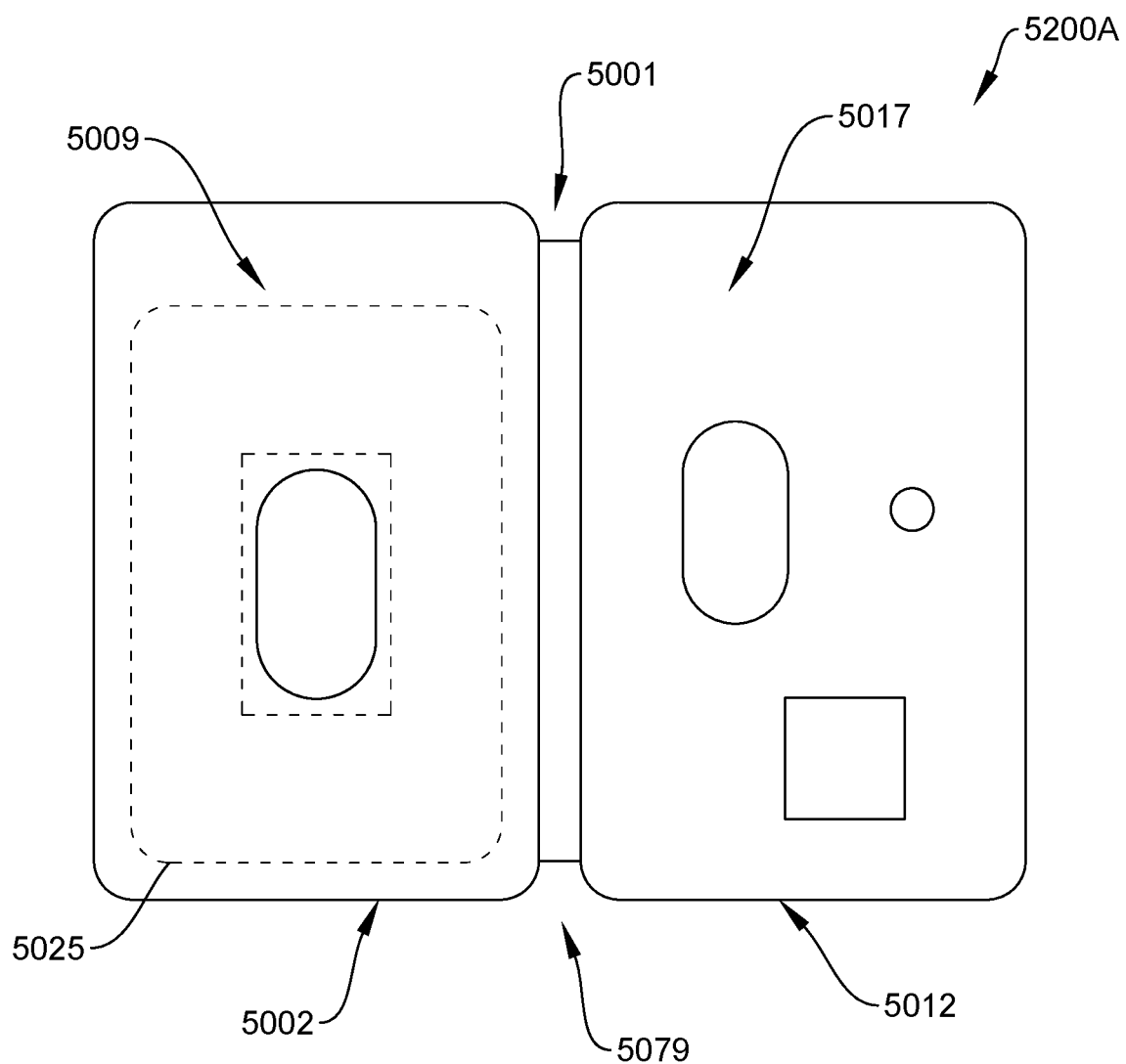
FIGS. 52A-E show a bifold plus wallet which may be used with an enrollment key

FIG. 52A shows a bifold plus wallet similar to the bifold wallet described above 5200A. In the figure, a wallet 5079 left side 5002 adjoins a wallet right side 5012 at a bendable member or hinge 5001. The wallet left side includes one or more RFID shields 5025 and one or more pockets 5009 which may be individually shielded or not. The wallet right side includes a pocket 5017 for a biometric card. Here, the wallet right side does not include an RFID blocking shield. Notably, the wallet may have a third side and the above mentioned left side and right side may occupy any two of the three sides.

Figure 52B:
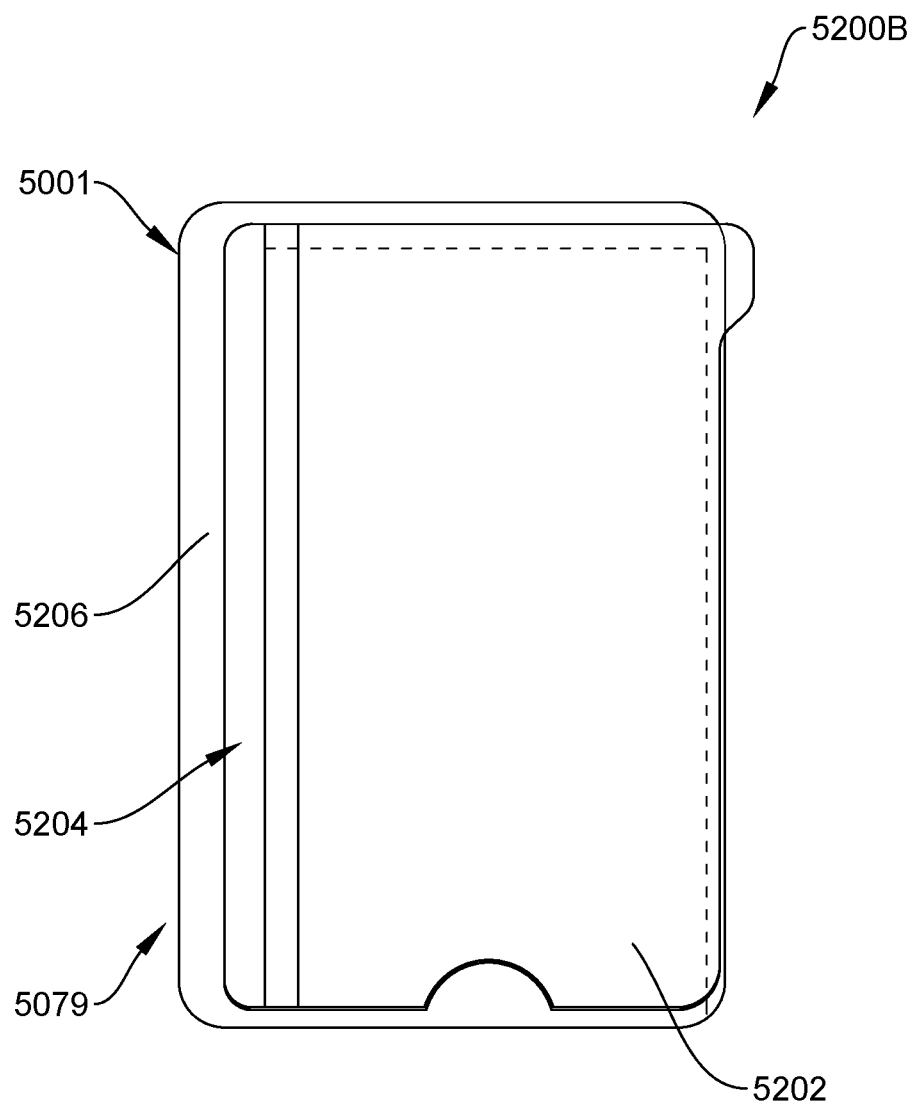
Figure 52C:
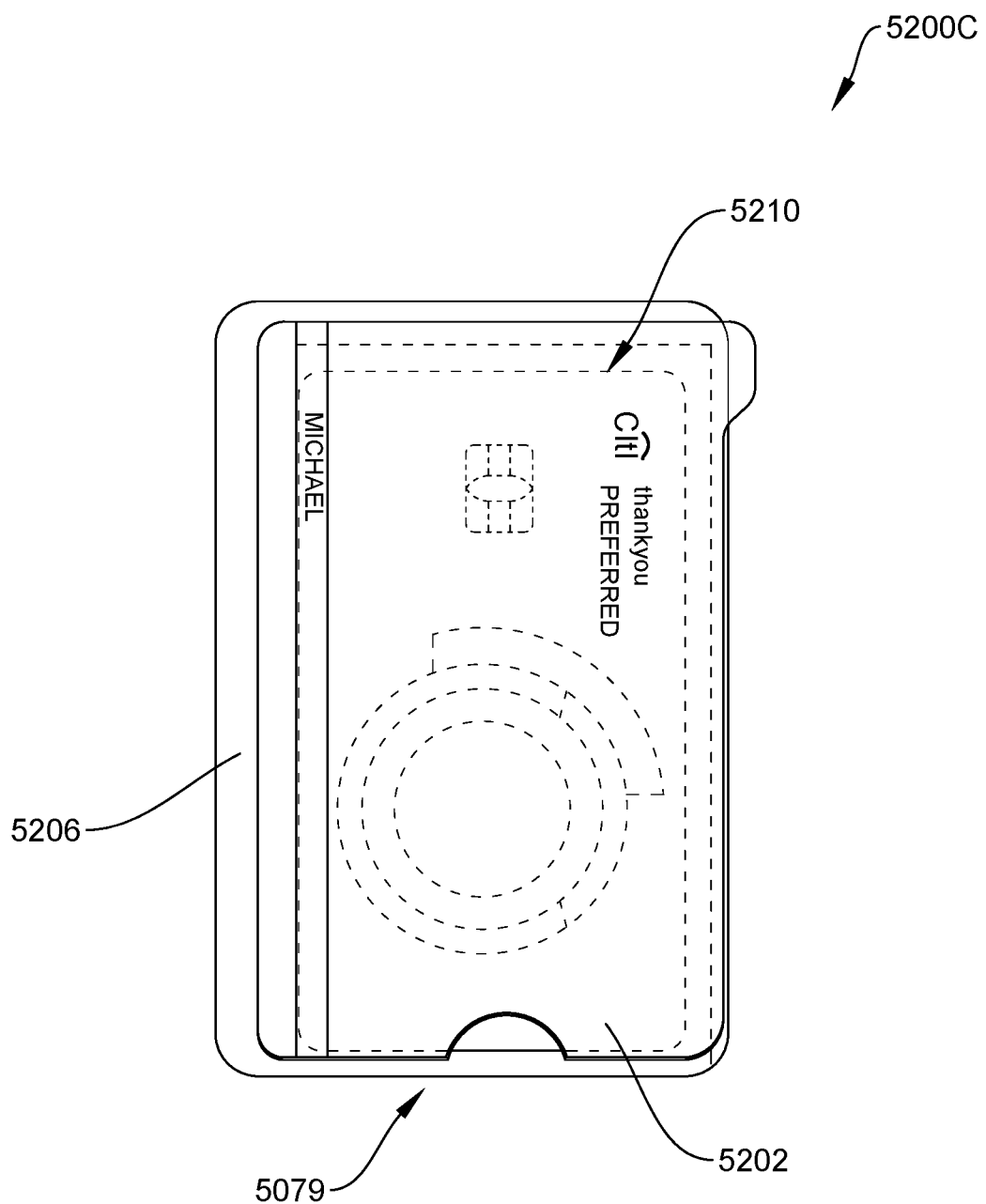

FIGS. 52B-C show the bifold plus wallet 5200B-C. In the figures, the bifold wallet 5079 is folded along the bend line 5001 such that the front/exterior of the wallet left side 5206 is partially visible beneath a pocket or transparent pocket or sleeve 5202. In some embodiments, a biometric card may be used in sleeve 5202 where the sleeve includes a cutout for placement of a finger on the fingerprint sensor.

Notably, the pocket 5202, for example a transparent or non-transparent or partially transparent pocket, is for holding a contactless card. The pocket may include synthetic or natural materials such as plastic and/or leather/faux-leather.

As seen in FIG. 52C the bifold plus pocket 5202 holds a contactless card 5210. This pocket enables transactions using the contactless card. Further, these transactions may take place even when the wallet 5079 is folded such that its left 5002 and right 5012 sides are superposed.

Figure 52D:
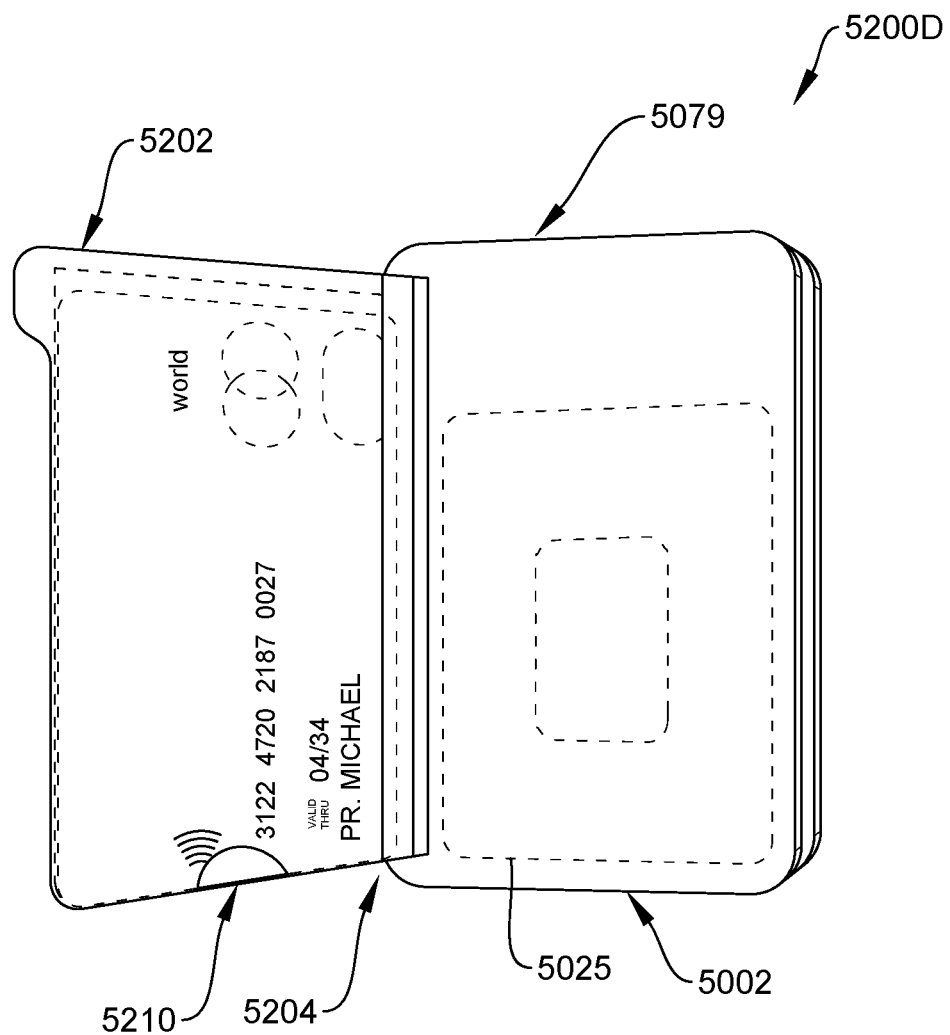
Figure 52E:
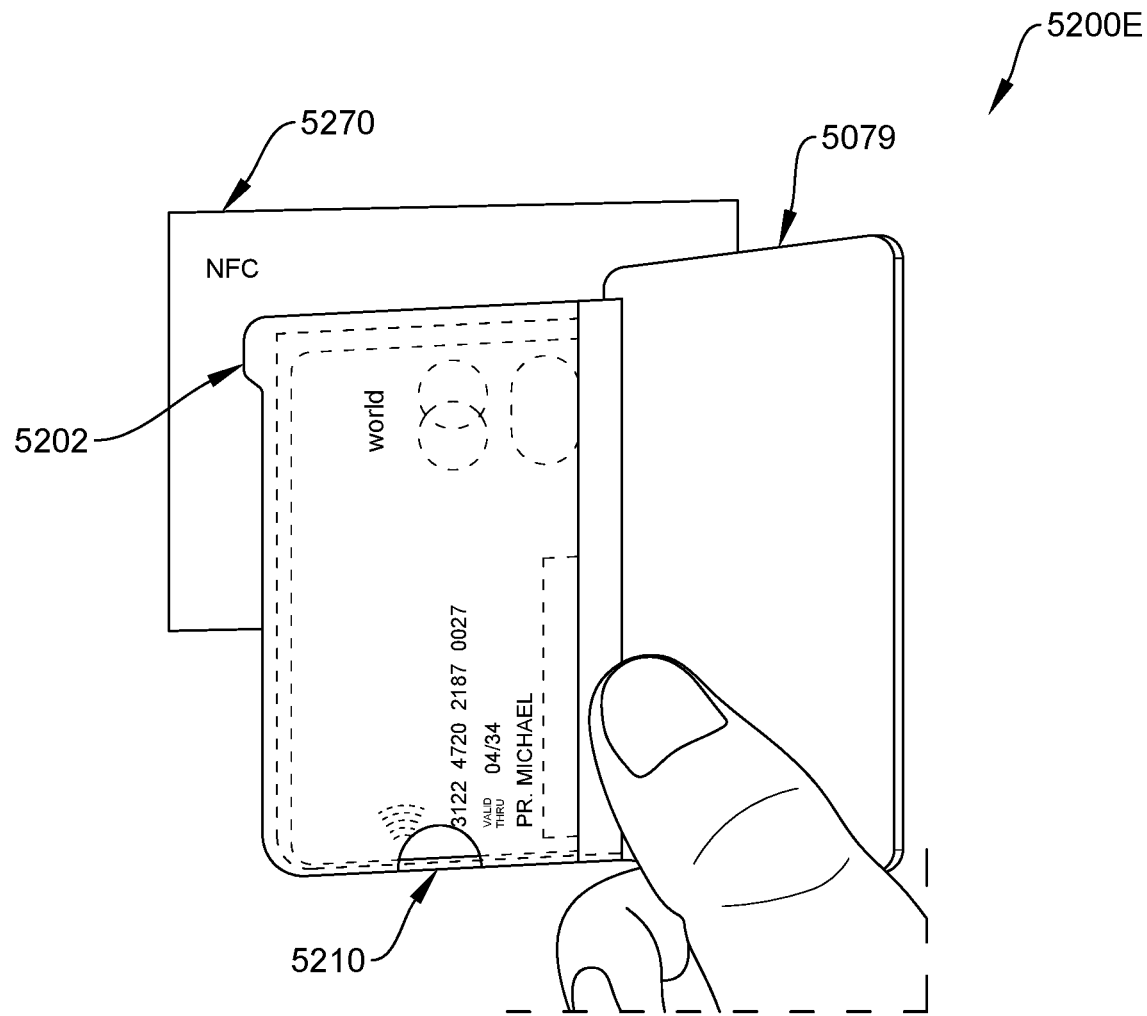

FIG. 52D-E show the pocket pivoted away from the wallet 5200D-E. In particular, the wallet 5079 left side front 5206 is pivoted via a bendable member or hinge 5204 interconnecting the pocket with the wallet. Notably, moving the pocket and card 5210 therein away from the wallet left side front also moves the card away from the RFID blocking material 5025 in the wallet left side 5002. When the blocking material is separated from the card, the card may be able to communicate with a networked device such as an NFC machine.

As seen in FIG. 52E, the bifold plus pocket 5202 is bent away from the wallet 5079 left side front 5206 and is near a networked device such as an NFC device 5270. Communication between the contactless card and the device may be used to complete a financial transaction or as part of completing a financial transaction where a card user's financial institution funds or commits to provide funds for a card user purchase. For example, the card in the pocket 5202 may be used in automated transaction such as low value transactions or transactions conducted in modern transit systems and so avoid card clash.

It should be noted that the bifold plus wallet 5079 may include a biometric card 5040 for use in transactions A when the wallet left side 5002 and right side 5012 are separated such that the wallet is held in one hand while a finger on the same or a different hand presses the fingerprint sensor 5050. Further, the bifold plus wallet may include a contactless card 5210 in a pocket 5202 for use in transactions B when the wallet is closed with the wallet left side 5002 and right side 5012 superposed. A contactless card purchase such as payment at a mass transit turn-style may be made with a single hand, for example holding the wallet with the thumb moving the pocketed card 5210 away from the RFID blocking material 5025 to allow unblocked communication with an NFC device 5270. Transactions A may be high value transactions such as transactions involving purchases over $200. Transactions B may be lower value transactions such as transactions involving purchases of less than $200.

Multipage Wallet

In another embodiment, a wallet includes pages or leaves, at least some of the pages providing pockets for holding cards such as credit cards, contactless cards, biometric cards, payment cards, drivers' license, ID card, and the like.

In various embodiments, a multipage wallet may include features similar to those described in connection with FIGS. 50A-L, FIGS. 51A-C, and FIGS. 52A-E. In particular, use of the multipage wallet with an enrollment key may be similar to the enrollment key use described in FIGS. 50A-L.

Figure 53A:
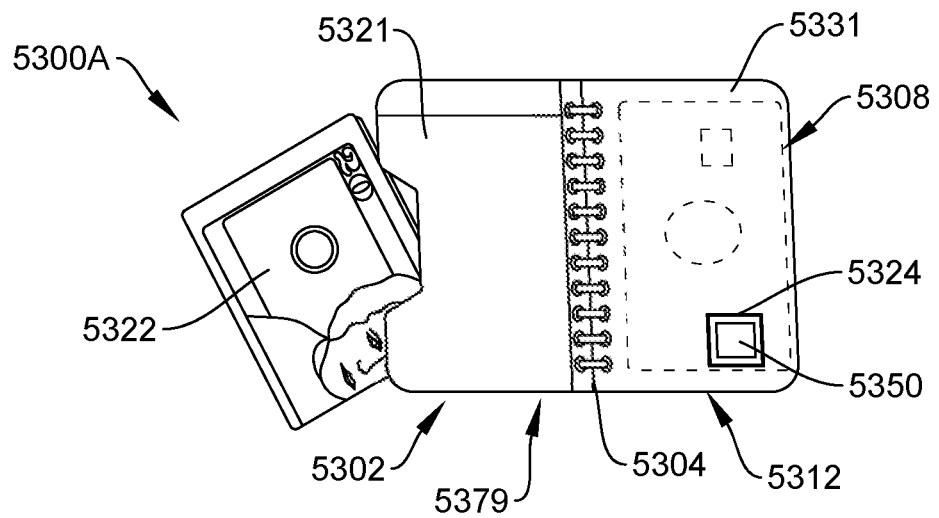
FIGS. 53A-N show a spiral wallet which may be used with an enrollment key.

FIG. 53A shows a multipage wallet 5300A. The multipage wallet 5379 includes a front/left cover 5302 and a back/right cover 5312. As seen, the front cover includes a flap such as an inside flap 5321 creating a space for items such as cash 5322 or cards.

Between the covers 5302, 5312 are pages including a first pocket page 5331 bendably attached to the covers, for example using a hinged attachment. In an exemplary structure, a spiral hinge 5304 joins the pages with the covers.

Figure 53B:
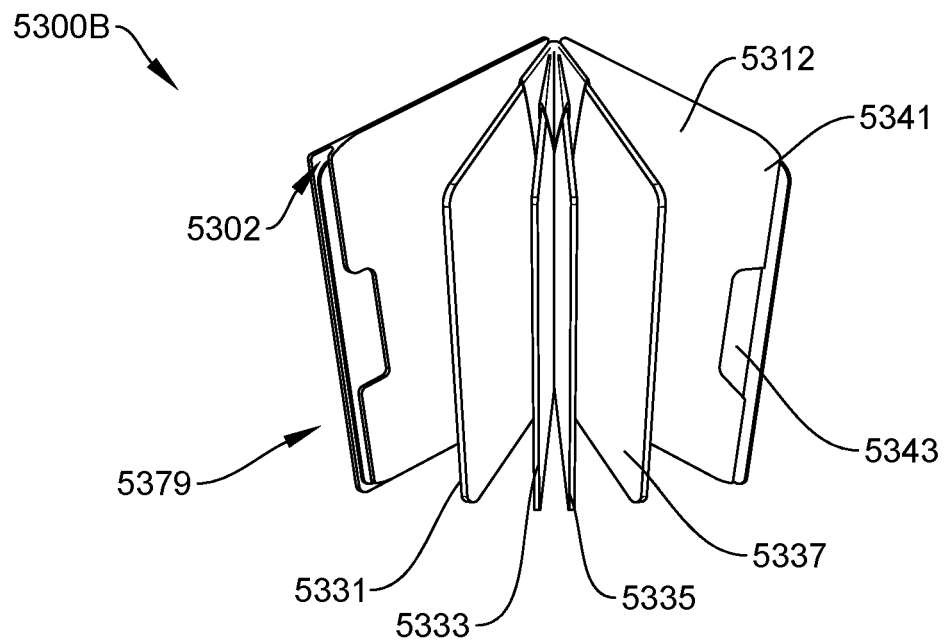

American Express Gold Card 5308 illustrates use of the first pocket page 5331. The card includes a biometric fingerprint sensor 5350 accessible via a cut-out in the page pocket 5324. q FIG. 53B shows a spread page view of the multipage wallet 5300B. As shown, the wallet 5379 has four pocket pages 5331, 5333, 5335, 5337. Notably the number of and the type of pages may vary. A flap such as inside flap 5341 on the back cover 5312 creates a space for items such as cash or cards 5343.

Figure 53C:
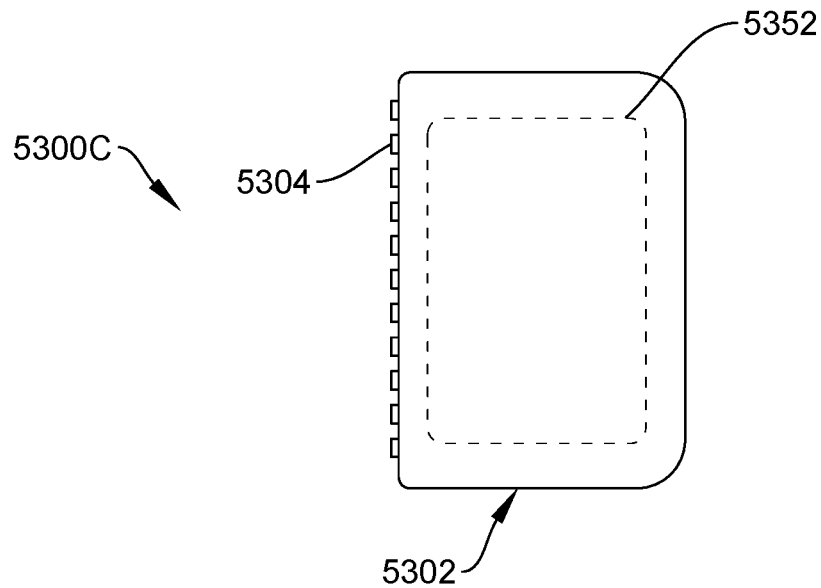
Figure 53D:
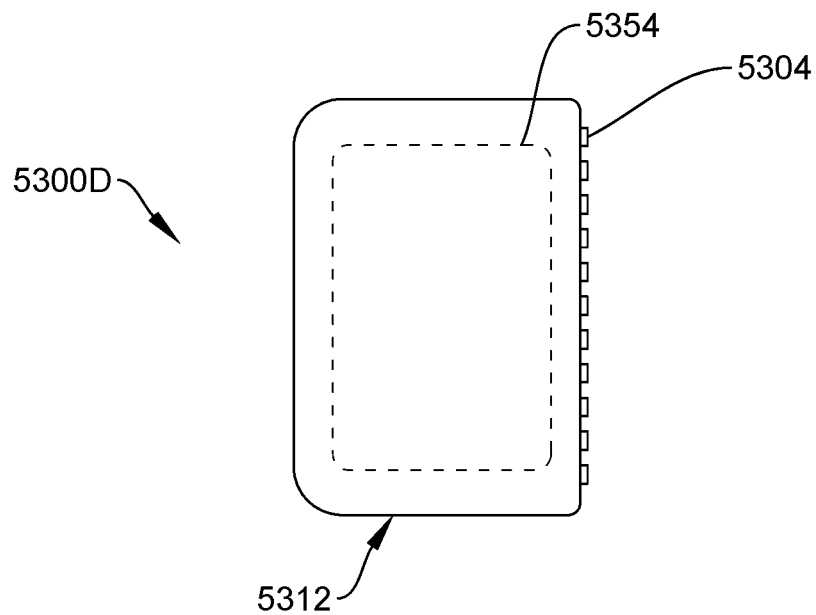

FIGS. 53C-D show wallet front and rear covers 5300C-5300D. As shown, the front cover 5302 may include an RFID blocking/absorbing material and/or RFID blocking/absorbing circuit 5352. Similarly, the rear cover 5312 may include an RFID blocking/absorbing material and/or RFID blocking/absorbing circuit 5354. In addition, RFID blocking and or absorbing material may be used to separate any one or more of pocket pages 5331, 5333, 5335, 5337.

Figure 53E:
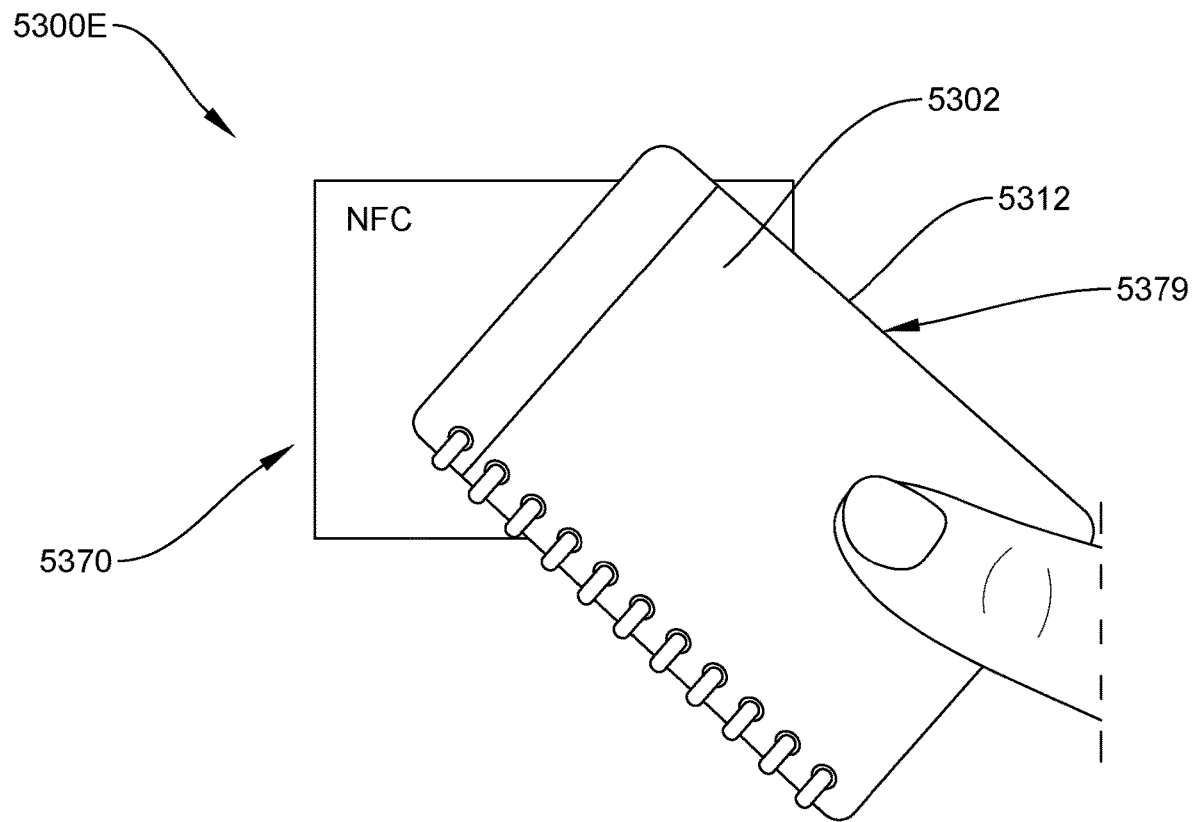

FIG. 53E shows a multipage wallet and NFC device 5300E. Here, the wallet front and back covers 5302, 5312 capture the pocket pages (see FIG. 52B) closely therebetween such that RFID attenuation features therein 5352, 5354 (see FIG. 53C-D) disrupt communications between contactless and biometric credit cards within the wallet and the NFC device.

Figure 53F:
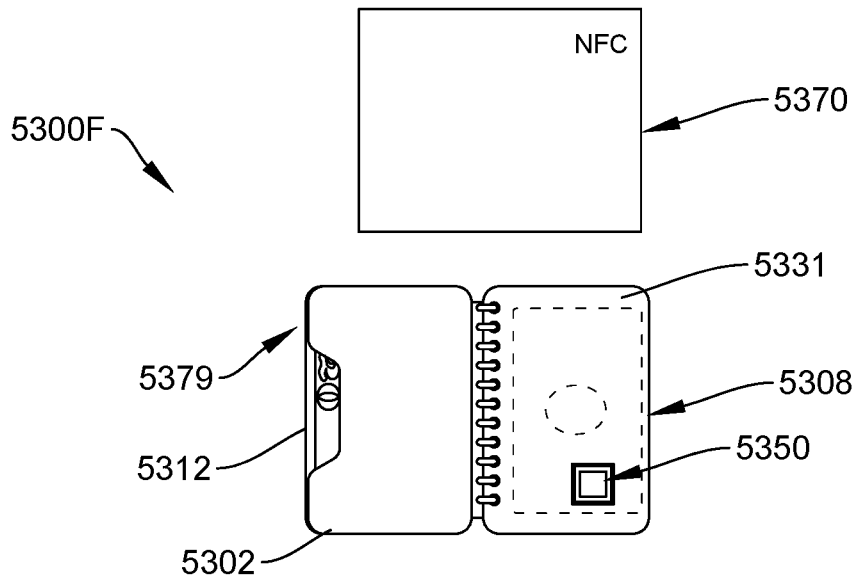
Figure 53G:
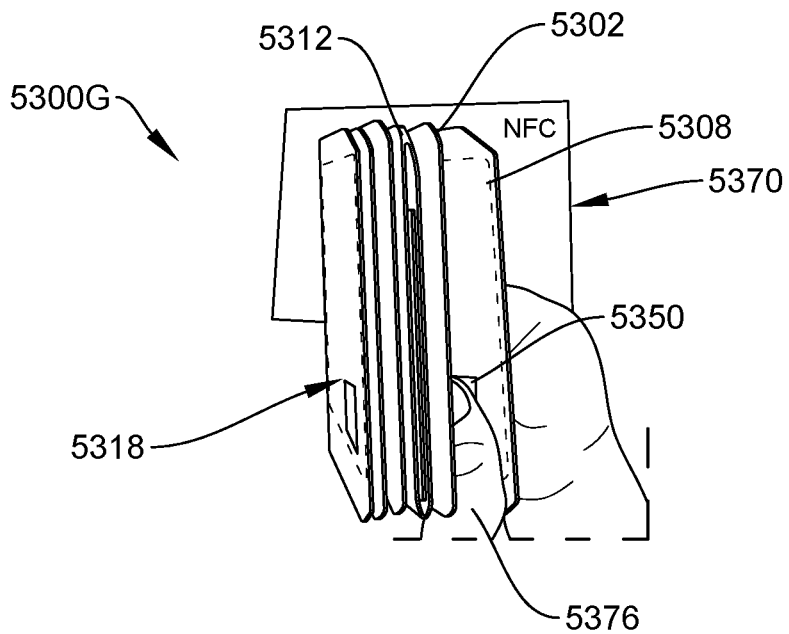

FIGS. 53F-G show a multipage wallet and an exposed first pocket page and biometric card 5300F-G. Here, an American Express Gold Card 5308 in the first pocket page 5331 is exposed to an NFC device 5370. In FIG. 53F, the gold card is on the right and the a) wallet covers 5302, 5312 and b) remaining pocket pages 5333, 5335, 5337 are on the left. With this arrangement, only the gold card communicates effectively with the NFC device while other cards in the wallet are prevented from NFC communications, for example by proximate RFID blocking material 5352, 5354. In FIG. 53G, the gold card is separated from the wallet covers and other pages by a user's thumb 5376 that also presses the fingerprint sensor 5350. As explained in connection with FIG. 50L, a successful fingerprint entry via the fingerprint sensor is required before a biometric credit card transaction takes place. In other embodiments a bifold wallet first side may be rotated 90 to 180 degrees from an adjoining second side wherein a successful fingerprint entry via the fingerprint sensor enables a biometric credit card transaction.

Figure 53H:
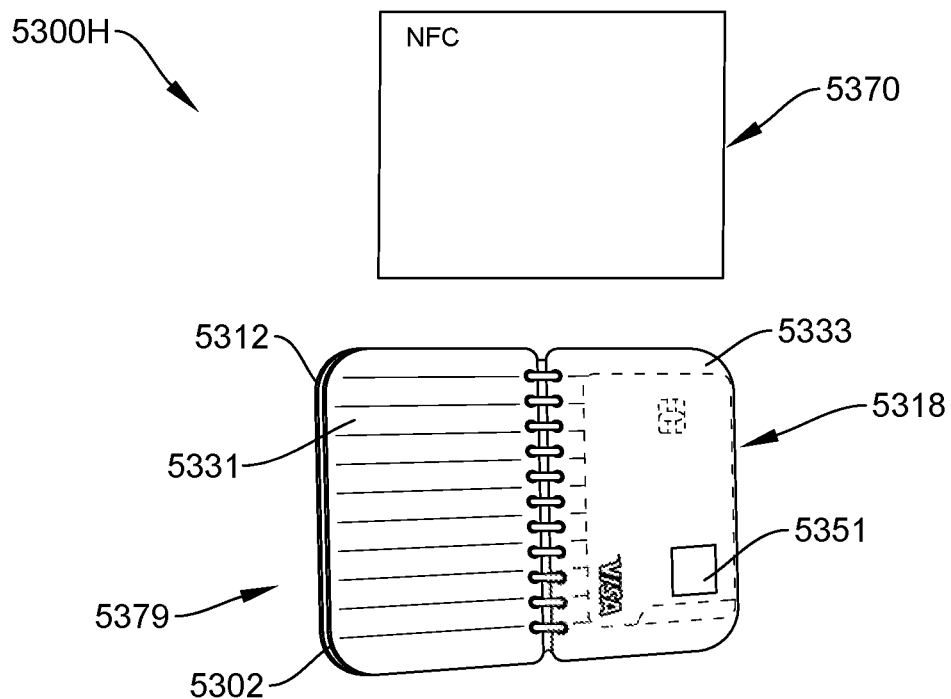
Figure 53I:
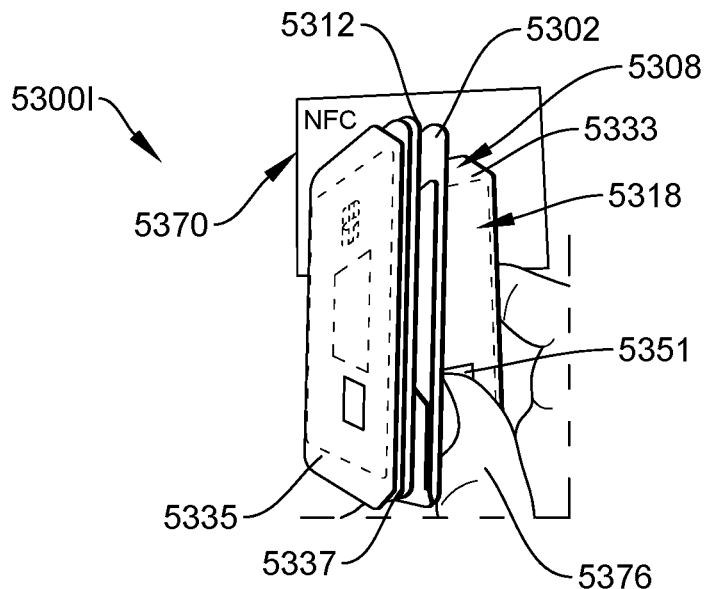

FIGS. 53H-I show the multipage wallet and an exposed second pocket page and biometric card 5300H-I. Here, a biometric VISA Card 5318 in the second pocket page 5333 is exposed to an NFC device 5370. In FIG. 53H, the VISA card is on the right and the a) wallet covers 5302, 5312 and b) remaining pocket pages 5331, 5335, 5337 are on the left. With this arrangement, only the VISA card communicates effectively with the NFC device as described above. In FIG. 53I, the VISA card is separated from the wallet covers and other pages by a user's thumb 5376 that also presses the fingerprint sensor 5351. As explained in connection with FIG. 50L, a successful fingerprint entry via the fingerprint sensor is required before a biometric card transaction takes place. However, a contactless card that is not used as a biometric card may also allow for a transaction or low value transaction.

Figure 53J:
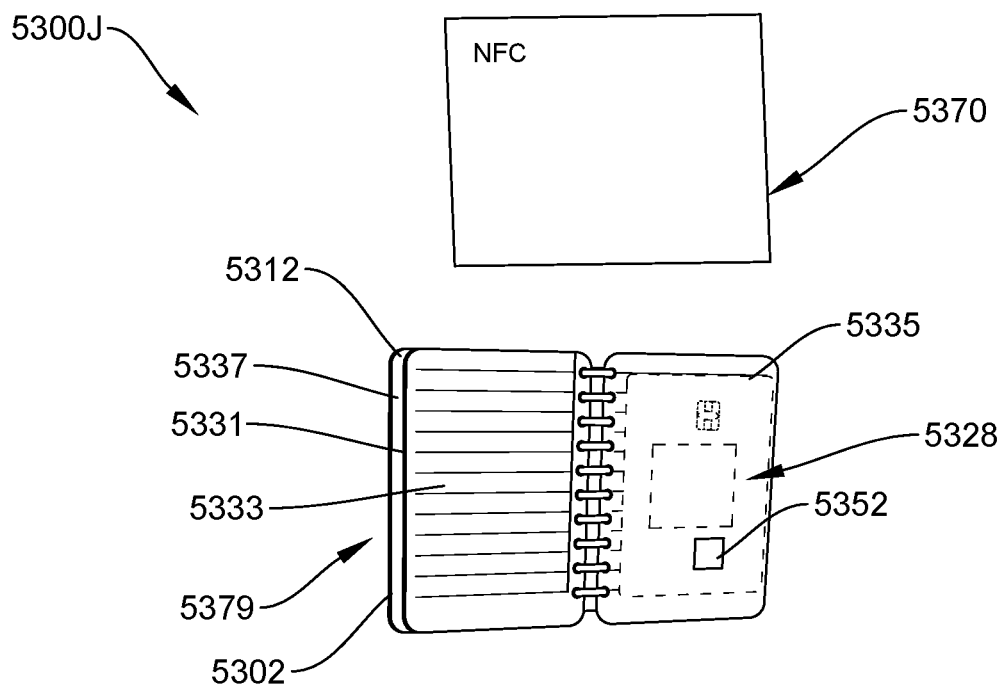
Figure 53K:
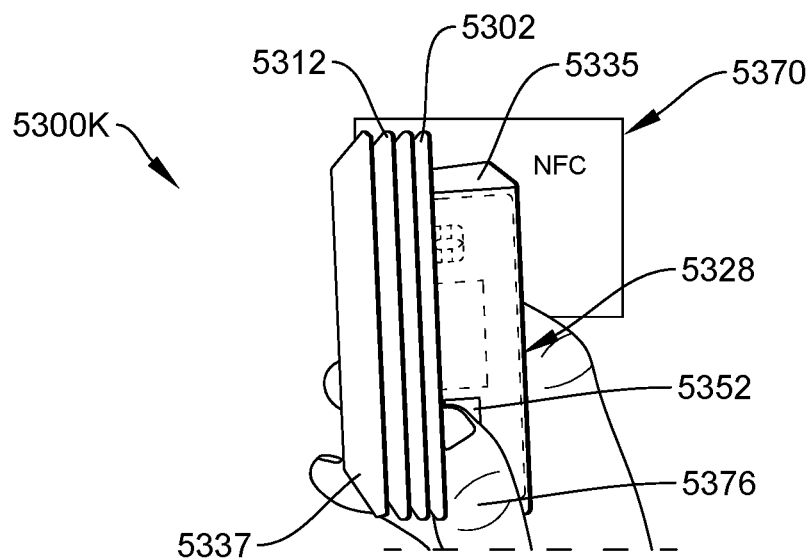

FIGS. 53J-K show a multipage wallet and an exposed third pocket page and biometric card 5300J-K. Here, a second biometric AMEX card 5328 in the third pocket page 5335 is exposed to an NFC device 5370. In FIG. 53J, the second AMEX card is on the right and the a) wallet covers 5302, 5312 and b) remaining pocket pages 5331, 5333, 5337 are on the left. With this arrangement, as described above, only the second AMEX card communicates effectively with the NFC device. In FIG. 53K, the card is separated from the wallet covers and other pages by a user's thumb 5376 that also presses the fingerprint sensor 5352. As explained in connection with FIG. 50L, a successful fingerprint entry via the fingerprint sensor is required before a biometric card transaction takes place.

Figure 53L:
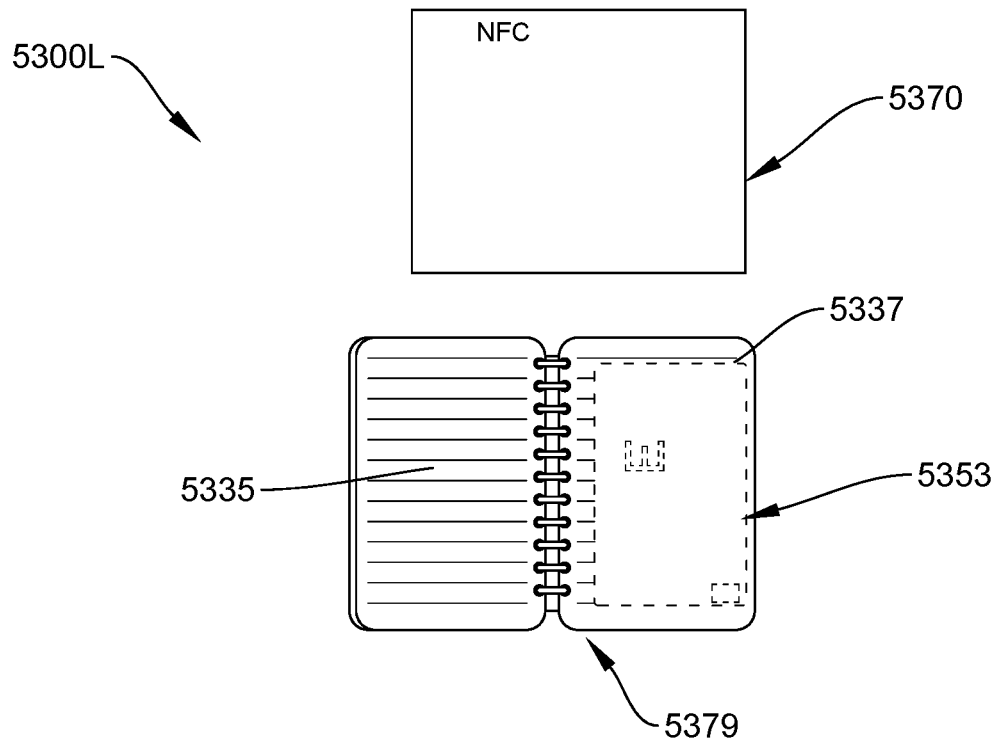
Figure 53M:
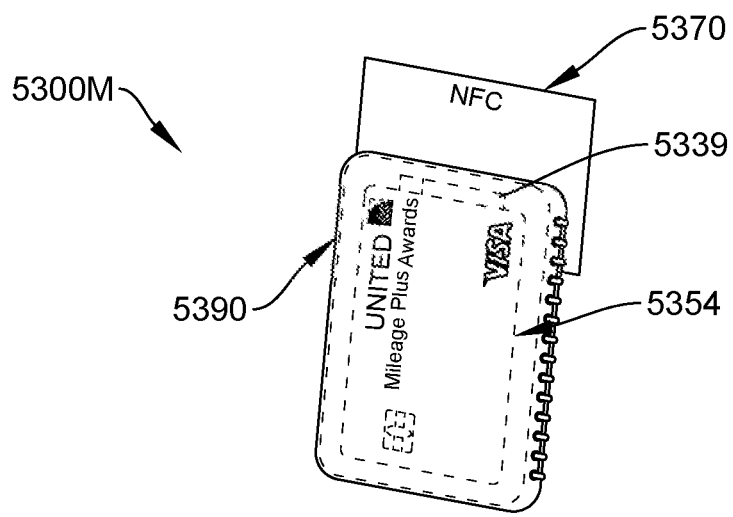
Figure 53N:
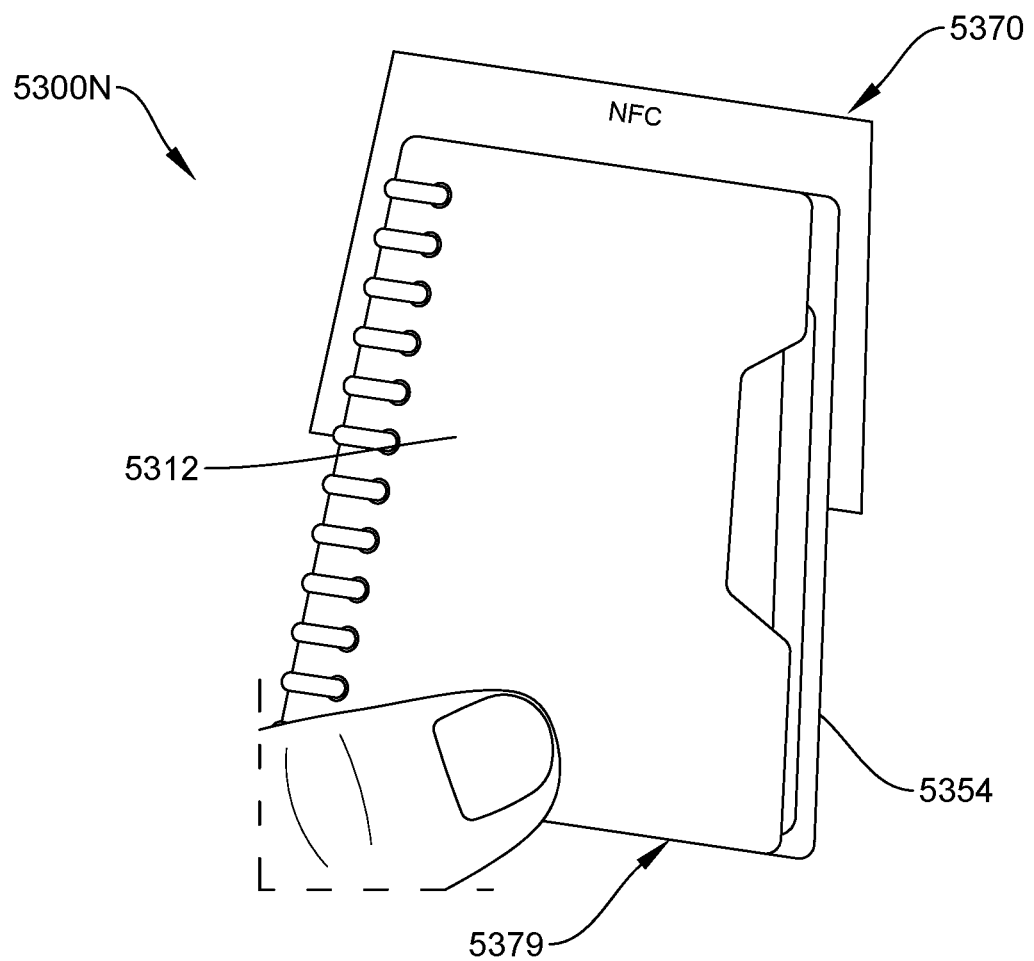

FIGS. 53L-N show a multipage wallet and an exposed fourth pocket page holding an ID opposite a second contactless VISA card 5300L-N. Here, the ID card 5353 is in the fourth pocket page 5337 opposite pocket page 5335. Notably, as seen in FIG. 53M, when the fourth pocket page is turned further it lies atop the remainder of the wallet 5390. The opposite side of the fourth pocket 5339 is now exposed along with a second VISA card 5354 therein. As seen in FIG. 53N, the wallet 5379 may now be turned such that the second VISA card faces an NFC device 5370. With this arrangement, the gold AMEX card 5308, VISA card 5318, and second AMEX card 5328 (other cards) may be unable to communicate with the NFC device because they do not face the NFC device and/or are blocked, for example by proximity to RFID blocking device(s) or material 5352, 5354. Alternatively, sole communications with the second VISA card may be enabled where RFID blocking material separates the other communication enabled cards or where the second VISA card is separated from the other communication enabled cards. Communications between the second VISA card and the NFC device may now allow a transaction to be completed and the transaction may be completed without card clash.

The multipage wallet 5379 therefore enables multiple contactless, contactless biometric, or contactless and biometric contactless cards (e.g., 5350, 5351, 5353, 5354) to coexist in the wallet along with other items. With these cards and items, the wallet is able to be arranged such that only a particular contactless or biometric contactless card communicates with the NFC device 5370.

Notably, the wallet 5379 may be used in a manner or in a similar manner to that described in FIGS. 51A-C for enrollment, activation, and use.

Biometric Lever Wallet

In another embodiment, a biometric lever wallet similar to the holder shown in FIG. 1 includes an enrollment key. Operations of and/or with this wallet may be similar to those described in connection with FIGS. 50A-J.

Figure 54A:
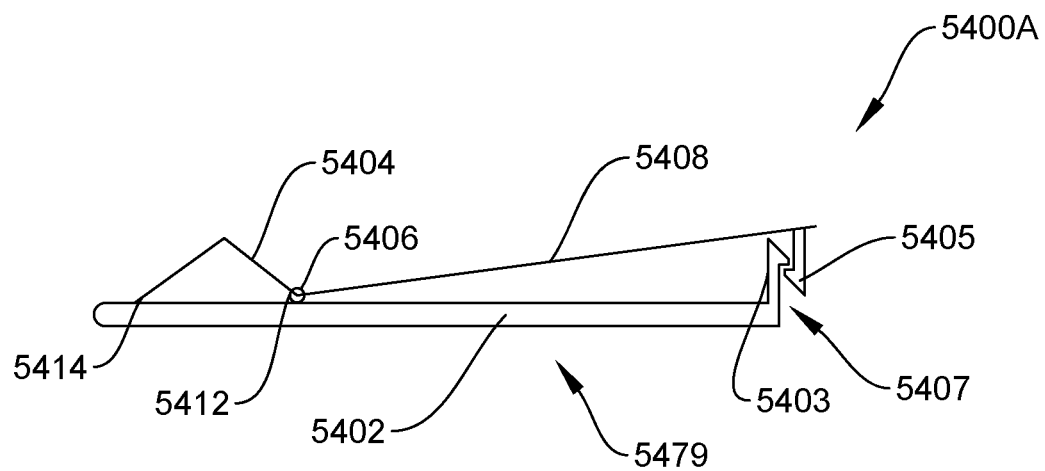
FIGS. 54A-M show a lever wallet which may be used with an enrollment key.

FIG. 54A shows a biometric lever wallet side view 5400A. A wallet 5479 bottom plate 5402 and a latch plate or hasp 5408 are interconnected by a spring member such as an angular spring clip 5404. A pivot 5406 interconnects the hasp and the spring clip such that the hasp may be raised away from the bottom plate 5402 without lifting a free end 5412 of the spring clip. A fixture 5414 such as an insert, weldment, glued connection, or the like interconnects the spring clip to the bottom plate. Notably, the spring clip free end may also be lifted away from the bottom plate by bending the spring (not shown). A catch or latch 5407 includes a latch part attached to the bottom plate 5402 and a latch part attached to the hasp 5408. The latch constrains motion of the hasp away from the bottom plate.

Figure 54B:
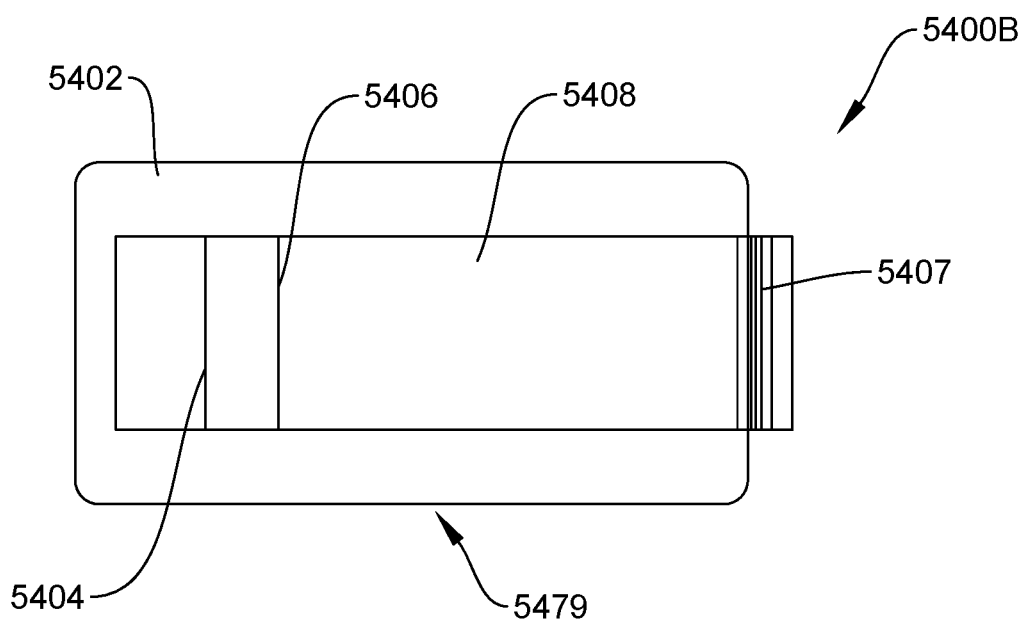

FIG. 54B shows a biometric lever wallet top view 5400B. As seen, the hasp 5408 covers at least a portion of the bottom plate 5402. The bottom plate and the hasp are interconnected by a spring clip 5404 by way of a pivot 5406 interconnecting the hasp to the spring clip and a fixture 5414 interconnecting the spring clip to the bottom plate.

Figure 54C:
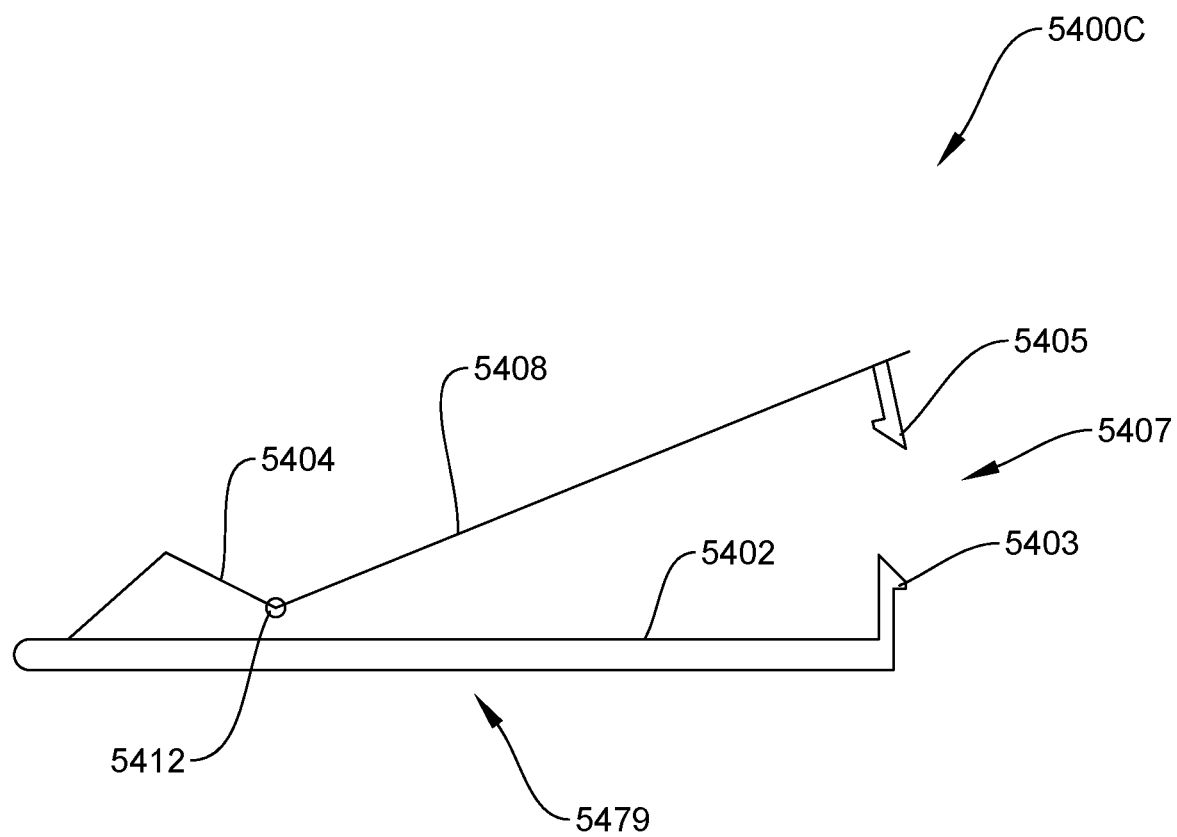

FIG. 54C shows another wallet side view 5400C. In this view, the latch parts 5403, 5405 are separated, the spring clip free end 5412 is lifted away from the bottom plate 5402, and the hasp 5408 is rotated relative to the spring clip 5404 and relative to the bottom plate. Notably, in this configuration the wallet is ready to receive a card between the spring clip 5404 and the bottom plate.

Figure 54D:
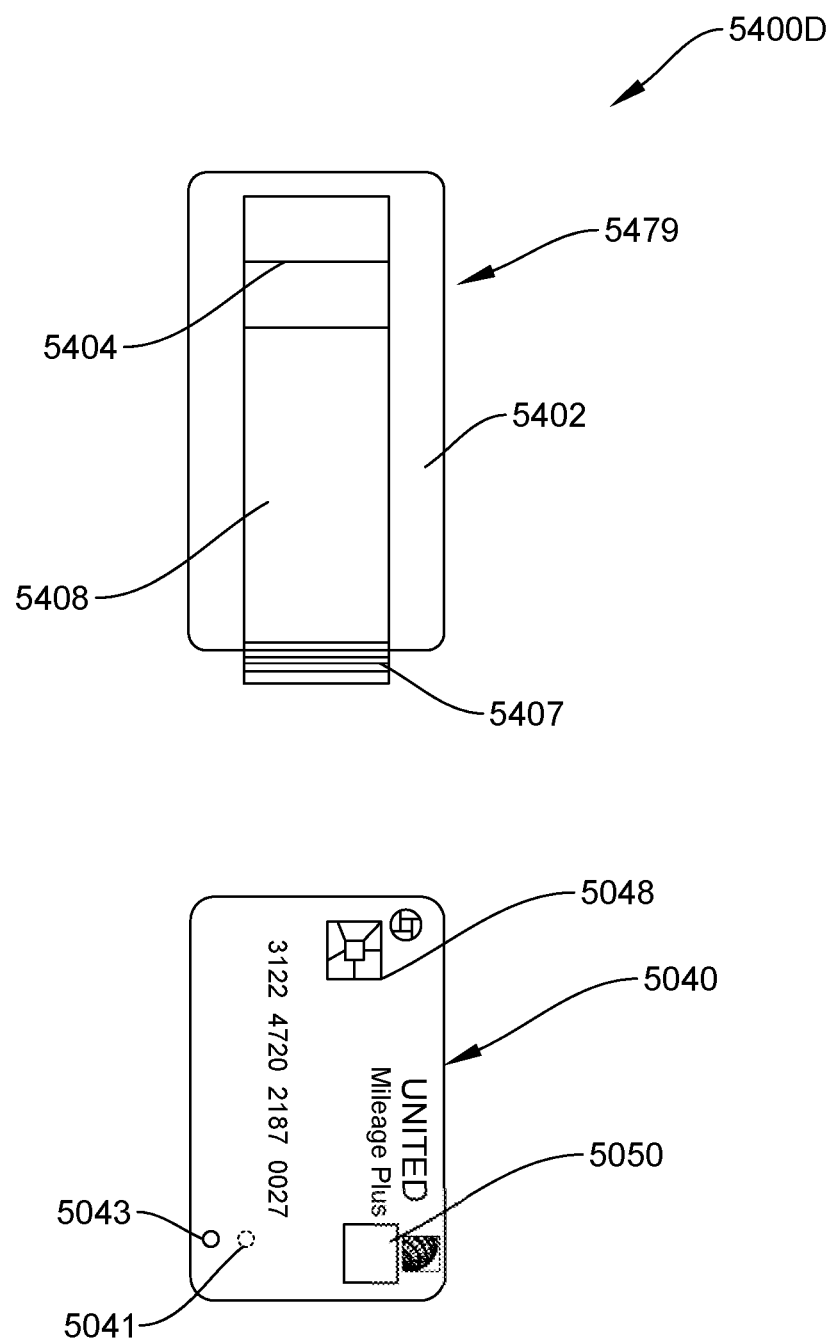

FIG. 54D shows a biometric card and wallet 5400D. Here, the credit card 5040 is aligned with the wallet 5479 and ready for insertion into the wallet. Notably, the credit card includes an electrical contact pad 5048, a fingerprint sensor 5050, and may include one or two fights or LEDS 5041, 5043 operable like or similar to those described in connection with FIG. 50C above.

FIG. 54D also shows a wallet 5479. The biometric card is for receipt between the hasp 5408 and the bottom plate 5402 and the card portion including the contact pad is for receipt between the spring clip 5404 and the bottom plate.

Figure 54E:
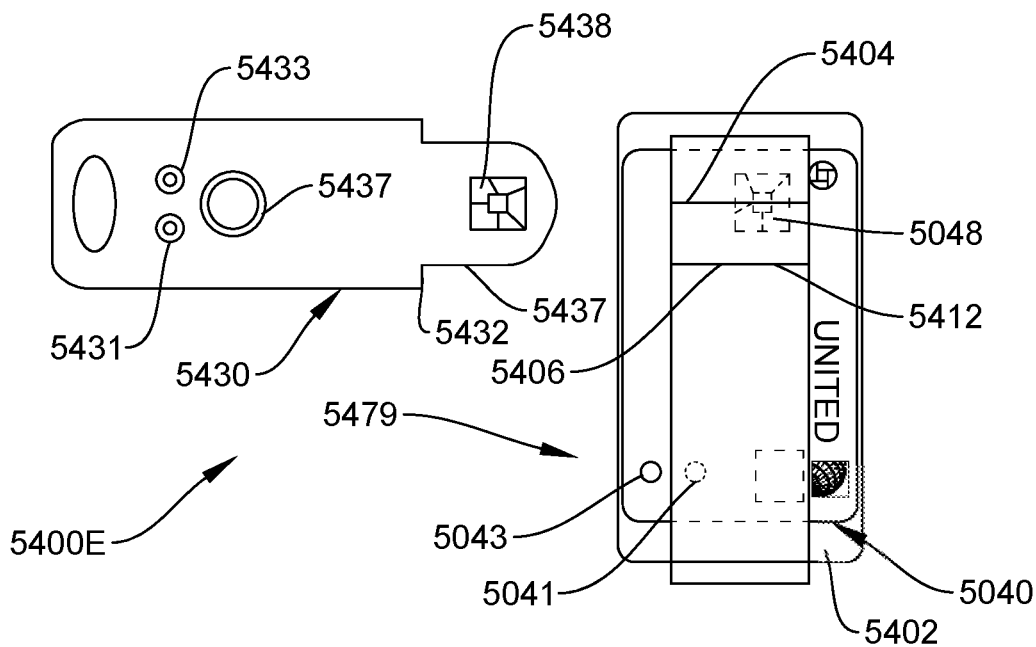

FIG. 54E shows a biometric card and wallet separated from an enrollment key 5400E. As seen, the enrollment key 5430 is aligned with the wallet 5479 and the key insert 5437 is ready for insertion in the wallet beneath the spring clip 5404. Notably, the hasp 5408 shown may be raised or pivoted above the bottom plate 5402 (see FIG. 54C). The hasp pivot 5406 may be a partial pivot such that moving the hasp away from the bottom plate pivots the hasp with respect to the spring clip 5404, ceases to pivot the hasp with respect to the spring clip, and then lifts the free end of the spring clip away from the bottom plate.

When the free end of the spring clip 5412 is lifted away from the bottom plate 5402, a card portion bearing the contact pad 5048 can be inserted under the spring clip 5404. Card guide rails along the sides of the wallet may serve to align the card side to side (not shown). With the hasp 5408 lifted, card lights 5041, 5043 are uncovered, and a card user can access the fingerprint sensor 5050.

Figure 54F:
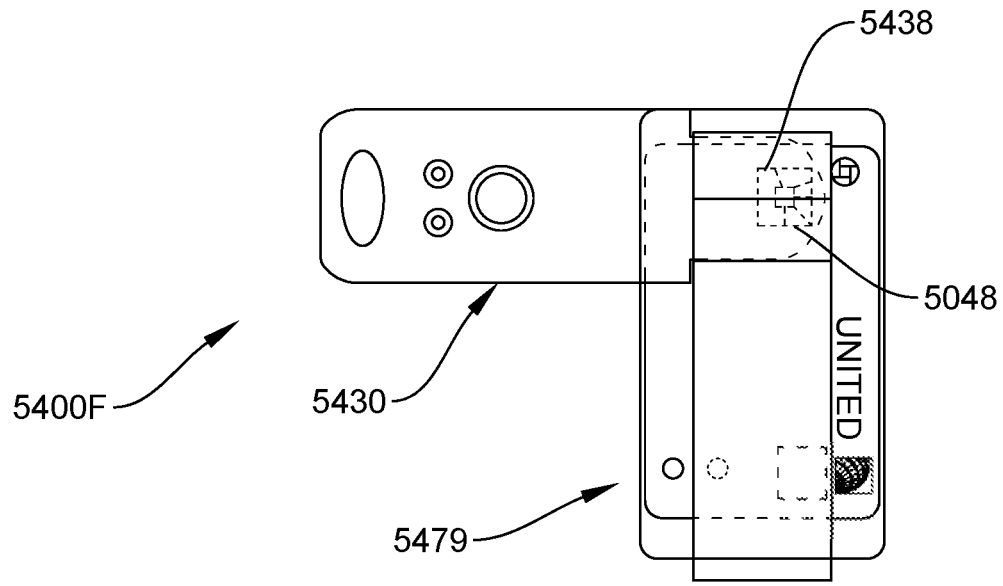

FIG. 54F shows a biometric card 5040 and wallet 5479 with the enrollment key 5430 inserted in the wallet 5400F. Enrollment key insertion may be stopped when the enrollment key shoulder(s) 5432 comes to rest against the spring 5404 clip or a bumper feature (not shown).

When the enrollment key 5430 is fully inserted in the wallet, the enrollment key electrical contact pad 5438 is opposite and in contact with the card electrical contact pad 5048. This contact may be necessary to allow electric power from a battery 5437 to flow to the credit card 5040 electrical circuit and/or electrical components 5095 (see also FIG. 50C. This contact may allow credit card and enrollment operations similar to those described above in connection with FIGS. 50A-J. Further, operation of the card lights 5041, 5043 and operation of the enrollment key lights 5431, 5433 may be similar to operations described in connection with FIGS. 50A-J.

Figure 54G:
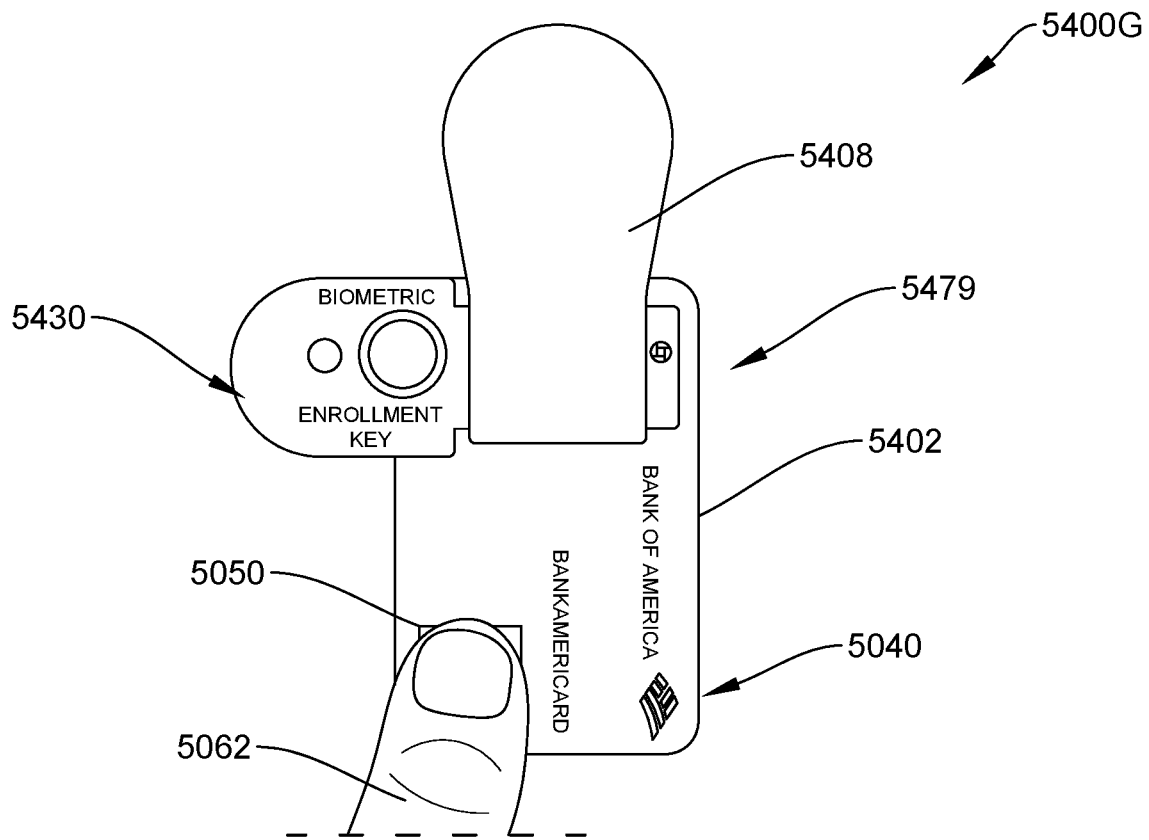

FIG. 54G shows a wallet ready for and during enrollment 5400G. In the figure, a wallet 5479 is assembled with the biometric card 5040 and the enrollment key 5430. The lifted hasp 5408 provides the card user with access to the fingerprint sensor 5050. A user places a finger 5062 on the fingerprint sensor. One or multiple placements of any finger or multiple fingers may be used to obtain fingerprint indicia. As mentioned above, the fingerprint reading may be stored in memory 5083 on the card 5040 or in memory 5082 in card electronics 5095. In another embodiment, a hole in the hasp (not shown) may provide for accessing the fingerprint sensor such that the hasp need not be lifted to enter a fingerprint on the fingerprint sensor.

Notably, the fingerprint reading may be used alone or in conjunction with a code to activate the card. For example, where a bank provides a biometric card with stored fingerprint data, this data may be compared with data obtained from the fingerprint sensor to activate the card. Notably, a government agency may utilize a fingerprint stored in a government system for fingerprint matching.

Figure 54H:
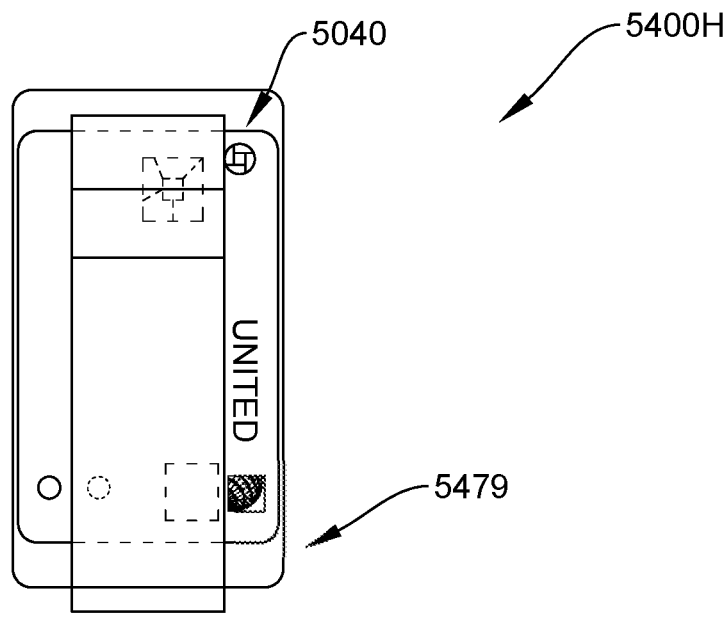

FIG. 54H shows the wallet 5479 with the biometric card 5040 inserted after fingerprint enrollment and after the enrollment 5030 key is removed 5400H. Here, the card may be activated after a further PIN/code enrollment via communication with a networked device such as an NFC device 5072 (see FIG. 54K). The networked device may communicate with the card in a wireless or contactless manner.

Figure 54I:
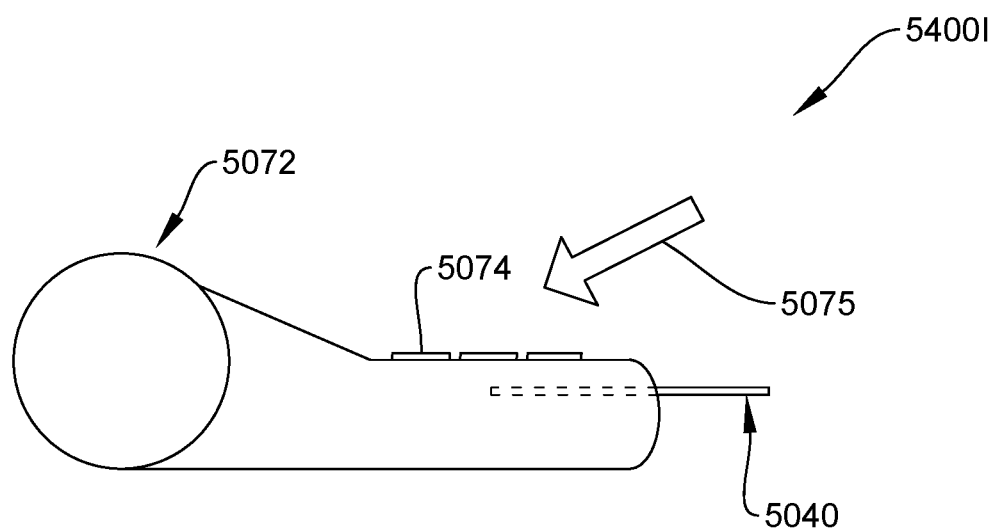

FIG. 54I shows a biometric card removed from the wallet and inserted in a networked device or NFC device 54001. Subsequent entry 5075 of the PIN/code via a keypad 5074 completes PIN/Code enrollment and may be required prior to card activation. Here, a card user fingerprint may not be needed 5476 on the fingerprint sensor 5050 (see FIG. 54J). However, in some embodiments, a card user fingerprint may be captured in this step.

Figure 54J:
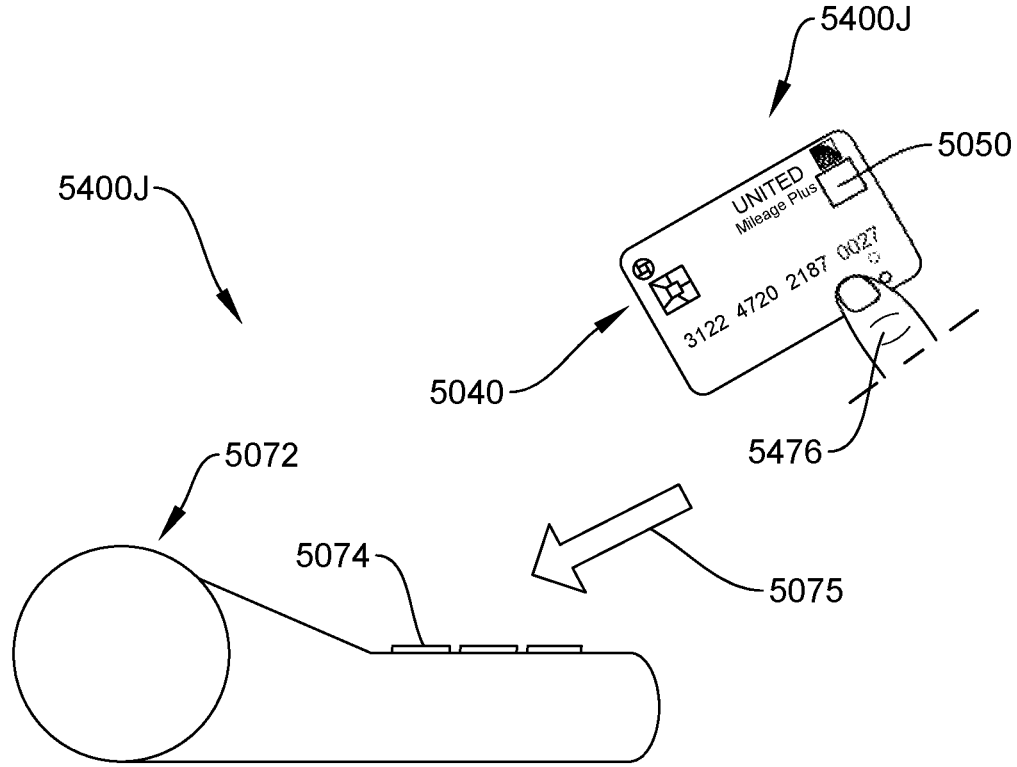

FIG. 54J shows a biometric card removed from the wallet and held proximate to a networked device 5400J. Subsequent entry 5075 of the PIN/code via a keypad 5074 completes PIN/Code enrollment and may be required prior to card activation. Here, a card user fingerprint may not be needed 5476 on the fingerprint sensor 5050 (see FIG. 54J). However, in some embodiments, a card user fingerprint may be captured in this step.

Figure 54K:
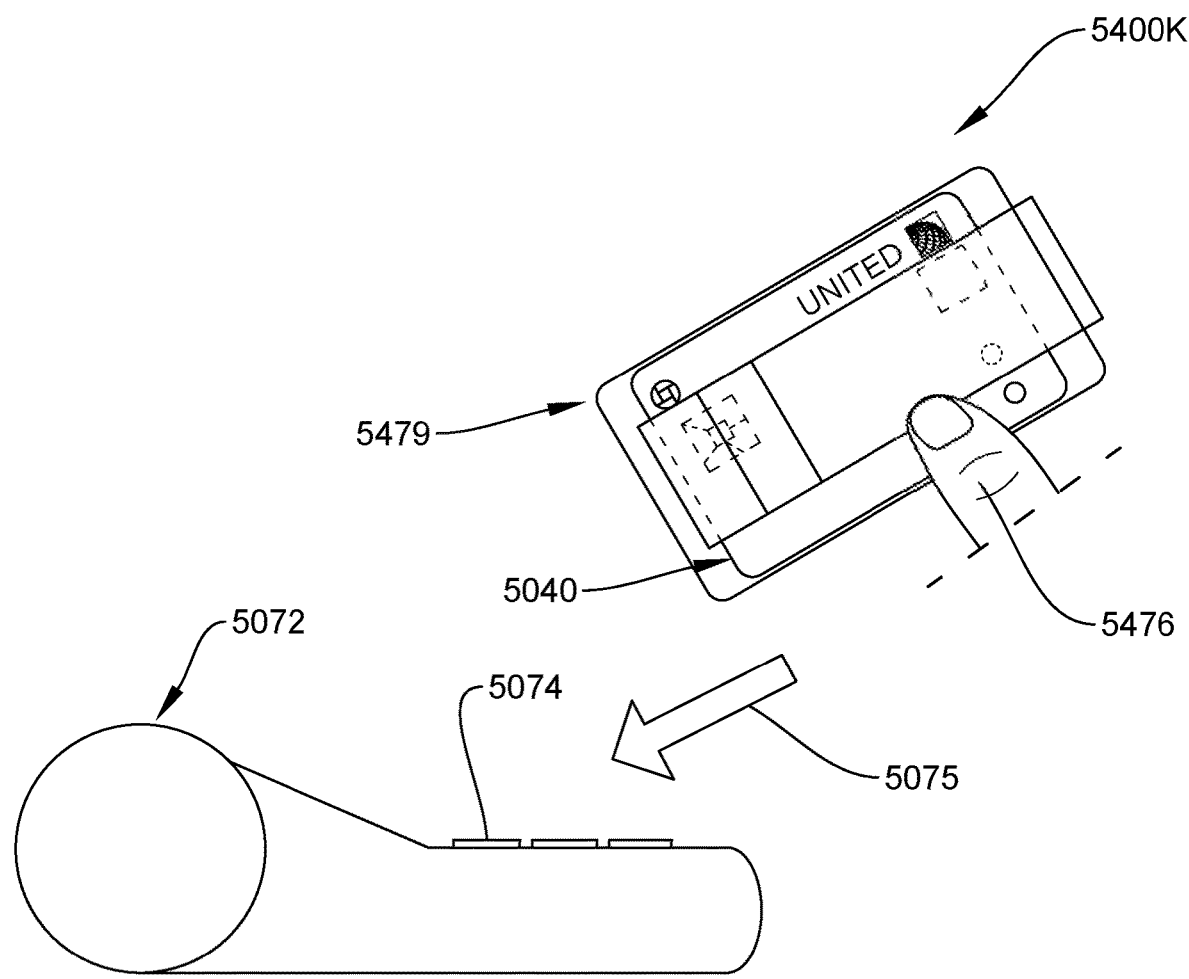

FIG. 54K shows a biometric card inserted in the wallet and held proximate to a networked device 5400K. Subsequent entry 5075 of the PIN/code via a keypad 5074 completes PIN/Code enrollment and may be required prior to card activation. Here, a card user fingerprint may not be needed 5476 on the fingerprint sensor 5050 (see FIG. 54J). However, in some embodiments, a card user fingerprint may be captured in this step.

Figure 54L:
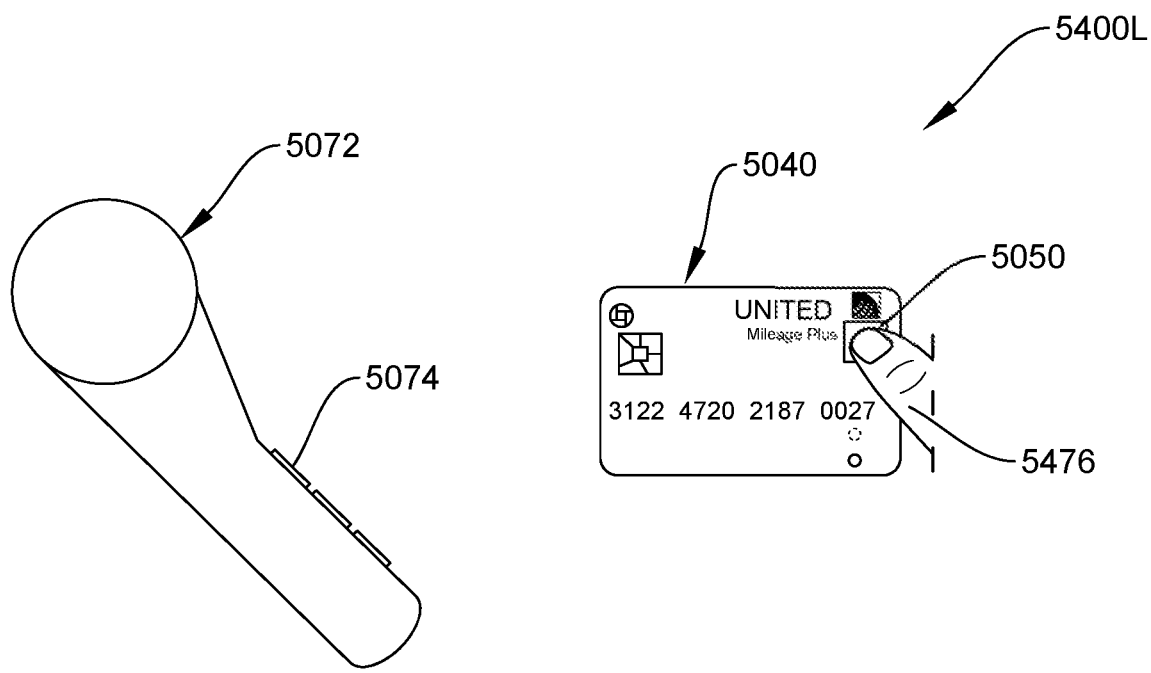

FIG. 54L shows a biometric card used in a financial transaction 5400L. Here, with a transaction pending, a card 5040 removed from the wallet 5479 is held near a networked device such as an NFC device 5072 and a card user finger 5476 is placed on the card fingerprint sensor 5050. Entry of correct fingerprint indicia is required before the transaction is consummated.

Figure 54M:
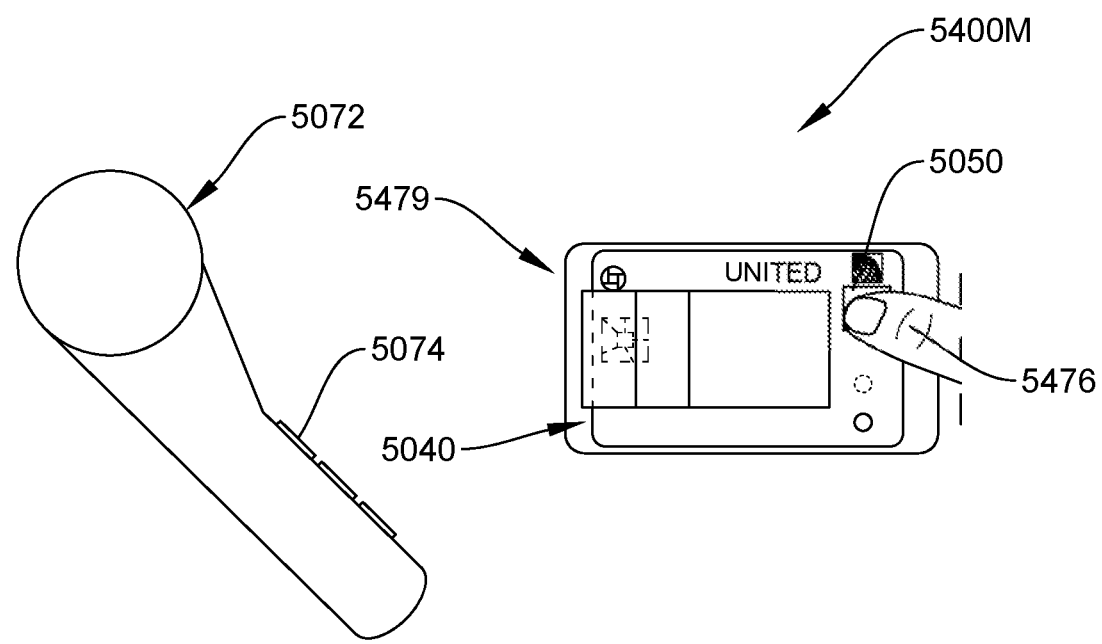

FIG. 54M shows a biometric card 5040 inserted in a wallet 5479 used in a financial transaction 5400M. Here, with a transaction pending, the card within the wallet is held near a networked device such as an NFC device 5072 and a card user finger 5476 is placed on the card fingerprint sensor 5050. Entry of correct fingerprint indicia is required before the transaction is consummated.

Notably, the wallet 5479 may be used in manner or similar manner to that described in FIGS. 51A-C for enrollment, activation, and use.

Biometric Express Wallet

A wallet embodiment may be primarily for use with an enrollment key. Secondary uses following enrollment may be provided. The biometric express wallet described below accomplishes this primary purpose and other purposes. The biometric express wallet may, where suitable, utilize features described above.

Figure 55A:
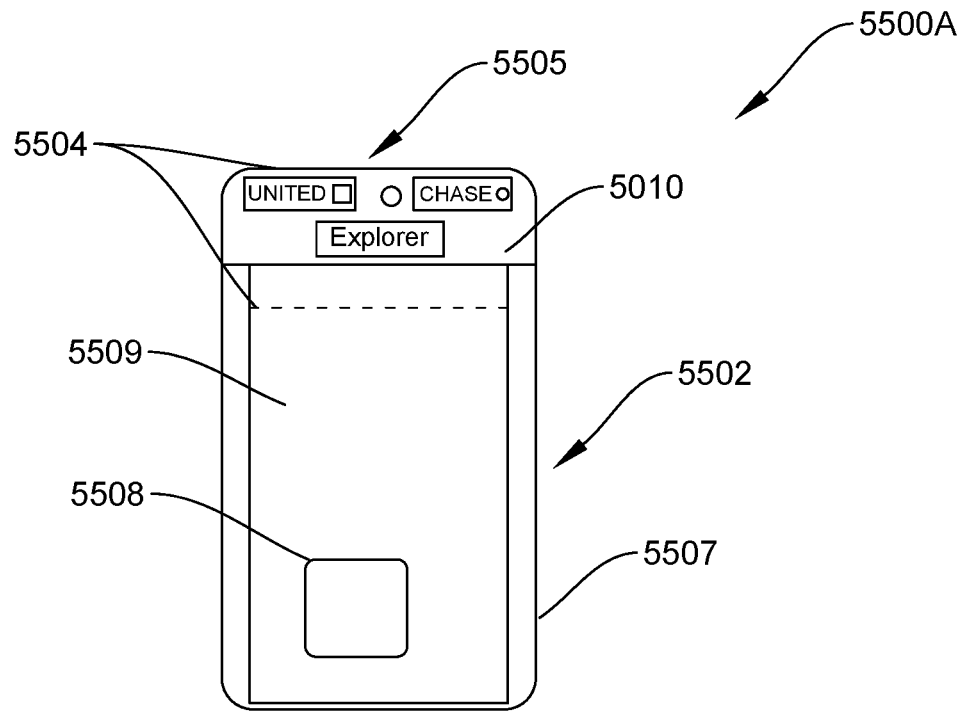
FIGS. 55A-N show a biometric express wallet/card holder and use of the card holder and FIGS. 55O-P show unfolded and folded card holders, respectively.
Figure 55B:
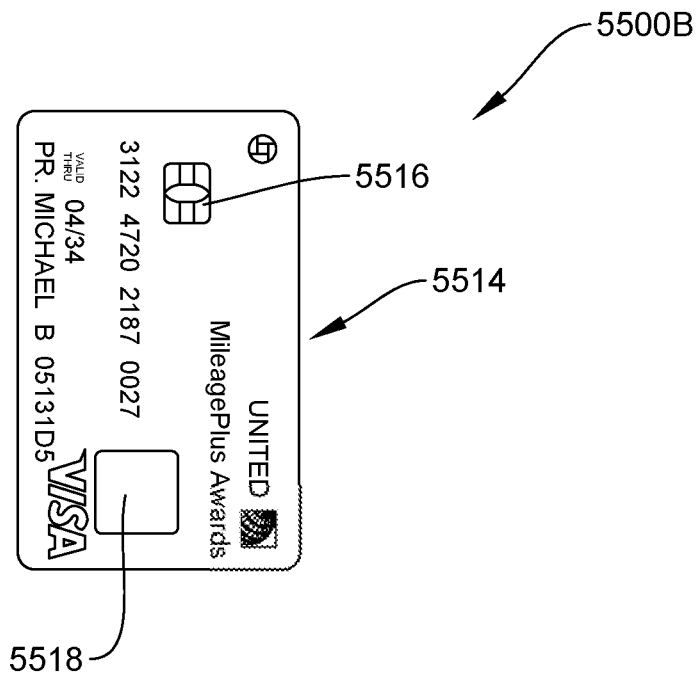

FIG. 55A shows a wallet in the form of a wallet or card holder 5500A and FIG. 55B shows a card 5500B for insertion in the card holder. The card may be any of the various cards mentioned above including a biometric card such as a biometric card for sensing a fingerprint. Other cards may include a payment card or ID card or card used for identification for a person or access to a service.

At one end or near one end, the card holder 5502 includes a mouth 5504 for receiving a card 5514 into a pocket 5505. Other edges of the card holder 5507 may be closed such that insertion of a card into the pocket is via the mouth only. One end of the card such as the mouth end 5510 may bear marketing indicia such as company names, logos, symbols and the like. A face of the card holder 5509 may provide a cut-out positioned to allow a card user fingerprint to contact the card fingerprint sensor 5518 of an inserted card. An electrical interface or EMV 5516 on the face of the card is for connection with mating contacts on the enrollment key

[0299] In various embodiments, a) all or part of an inserted card is visible or obscured and b) all or part of the card holder is clear, translucent, or opaque. In various embodiments, the card holder may be made from one or multiple pieces. In various embodiments, the card holder is made from a rigid, semi-rigid, or flexible material such as a natural or synthetic material, for example a plastic material such as a pliable plastic material.

Figure 55C:
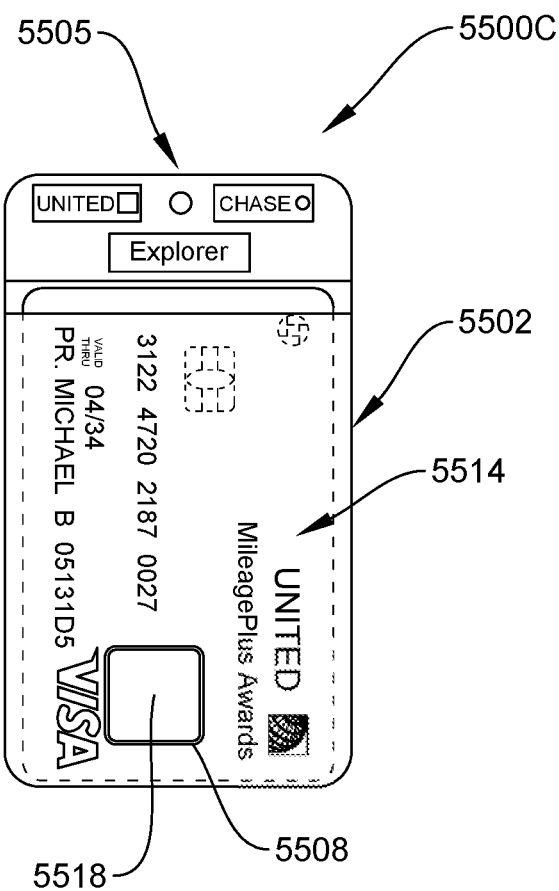
Figure 55D:
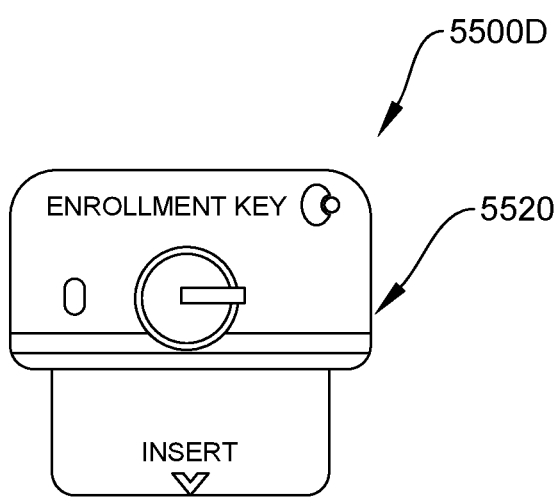

FIG. 55C shows a card inserted in the card holder 5500C and FIG. 55D shows an enrollment key 5500D. As seen, the card 5514 is within the pocket 5505 of the card holder 5502 and the cutout 5508 of the card holder is over the fingerprint sensor 5518 of the card. The enrollment key 5520 of FIG. 55D is shown alongside the card holder.

Figure 55E:
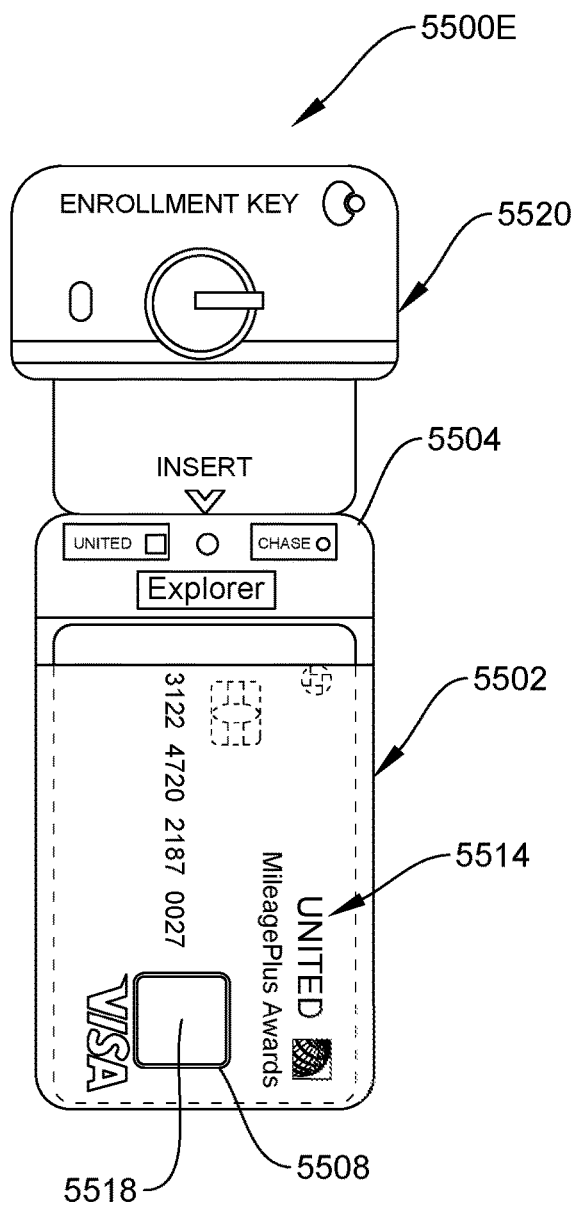

FIG. 55E shows the enrollment key and card holder with the inserted card 5500E. The enrollment key 5520 is ready for insertion into the mouth 5504 of the credit card holder 5502. Note that when the enrollment key is inserted in the card holder, electrical contacts or the like on the enrollment key (see e.g. 5048) communicate with electrical contacts or the like on the credit card 5518 to pass signals therebetween.

Figure 55F:
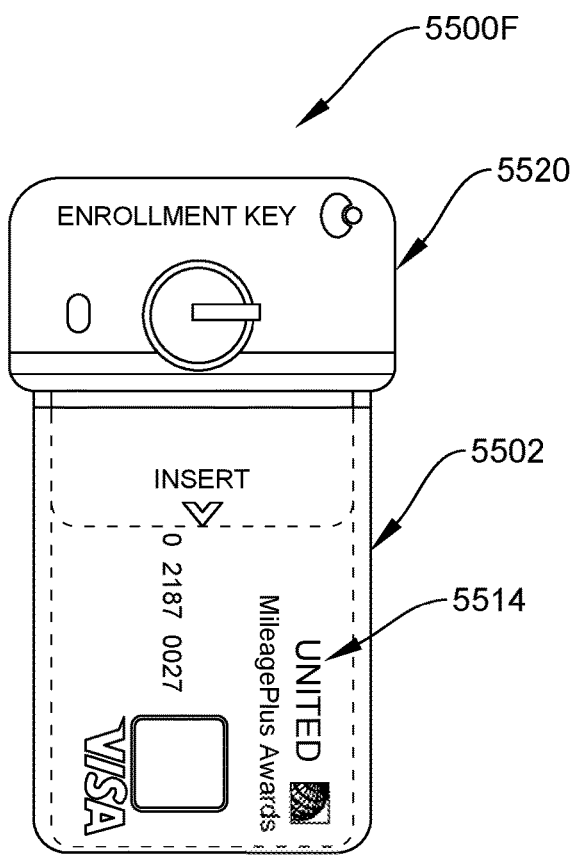

FIG. 55F shows the enrollment key inserted in the card holder 5500F. Here, the enrollment key 5520 is shown lying partially within the credit card holder 5502 and partially atop the credit card 5514 such that the electrical contacts mentioned above are in communication.

It should be noted that the enrollment key 5520 and card holder 5502 are shown in FIGS. 55E-F as two separate or separable components. In other embodiments, the enrollment key and/or one or more enrollment key functions may be combined with, integrated with or a part of the card holder. The enrollment may be removable or not from the card holder. The card holder with integral enrollment key may cover only a part of an inserted card such that a cutout 5508 for accessing the fingerprint sensor 5518 is available or such that a larger area of the card is exposed including the fingerprint sensor providing for entering a fingerprint while the card is inserted in the card holder. When the enrollment key is combined with the card holder, the shape of the card holder may be four sided (e.g., rectangular) or may have more sides, for example six sides reflecting a "T" shape. The integrated card holder may be recycled/reused/disposed in an eco-friendly manner as explained in connection with the enrollment key. Return of the integrated card holder for recycling/reuse/disposal may be similar to return of the enrollment kay and may be in connection with a special offer similar to the special offer associated with the enrollment key, for example as explained herein.

Figure 55G:
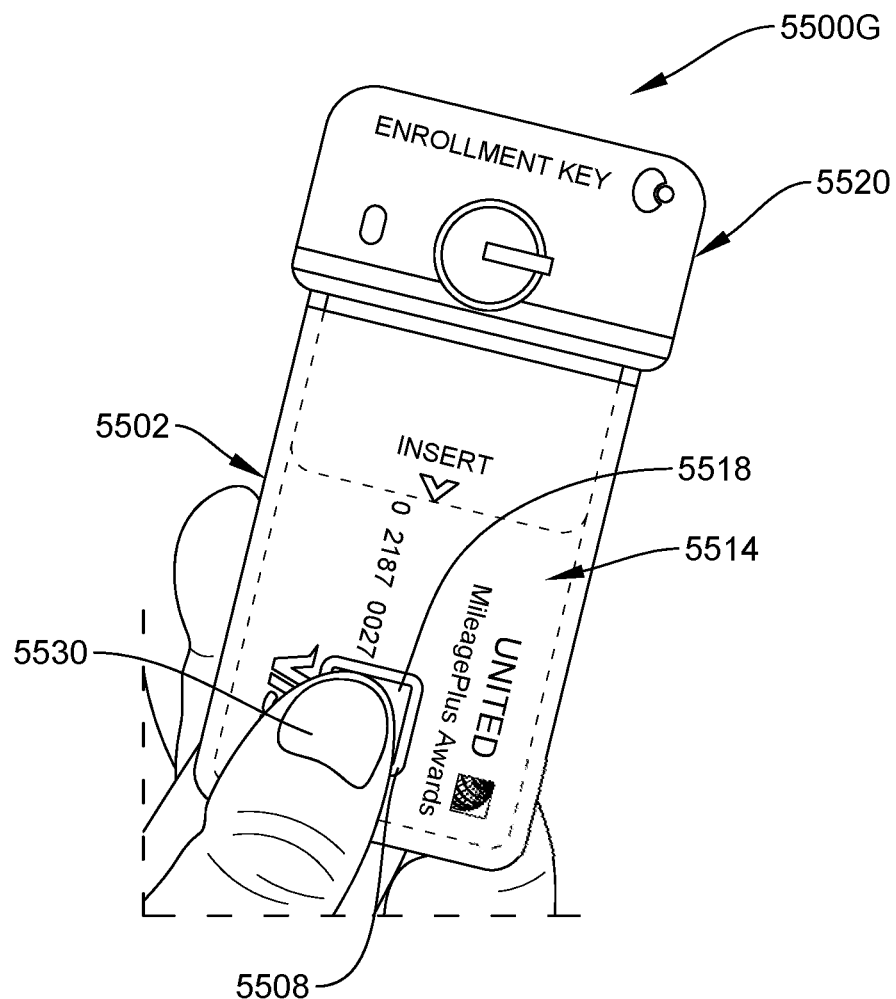

FIG. 55G shows a fingerprint registration or entry or saving step in a card enrollment process 5500G. Here, a card user's fingertip 5530 presses through the card holder cutout 5508 and against the card 5514 fingerprint sensor 5518 in order to save indicia of the user's fingerprint within card electronics (e.g., see FIG. 50C and 5095, 5082, 5083). For exemplary enrollment processes used in whole or in part, see for example FIG. 5100A.

Figure 55I:
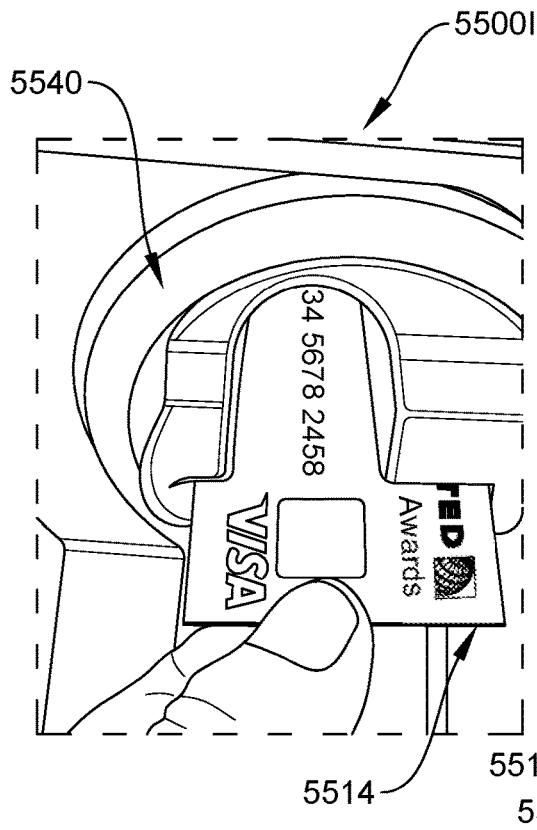
Figure 55J:
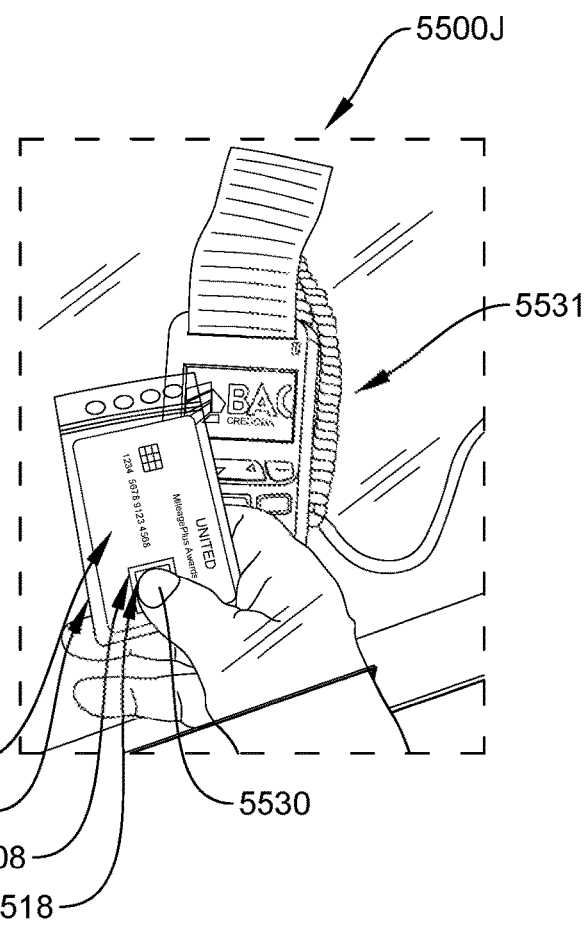

FIGS. 55H-J further illustrate the enrollment process with a code entry step 5500H-I. First, the card 5514 is removed from the card holder 5502 as shown in FIG. 55H. Then, the card is brought into communication with a system/device capable of recognizing a card user code as shown in FIG. 55I. When the card user enters the code into the system/device, the card may be activated for use. Exemplary systems/devices capable of recognizing a card user code include cash and related identification machines 5540 and those of FIGS. 50I-J.

Enrollment of the card precedes card activation. Once the card is activated, it may be used for selected financial transactions. For example, the card may be used to make purchases.

FIG. 55J may illustrate card use following activation 5500J. As shown, the card 5502 or card in the card holder 5514 is held proximate a point of sale device 5531 such as an NFC device. With the card user's finger 5530 contacting the card fingerprint sensor 5518 via the holder cutout 5508, the card exchanges information with the point of sale device which allows payment to be made.

Following enrollment of the card, the enrollment key may be returned to a return site or issuer return site or by return mail/courier or the like.

Figure 55K:
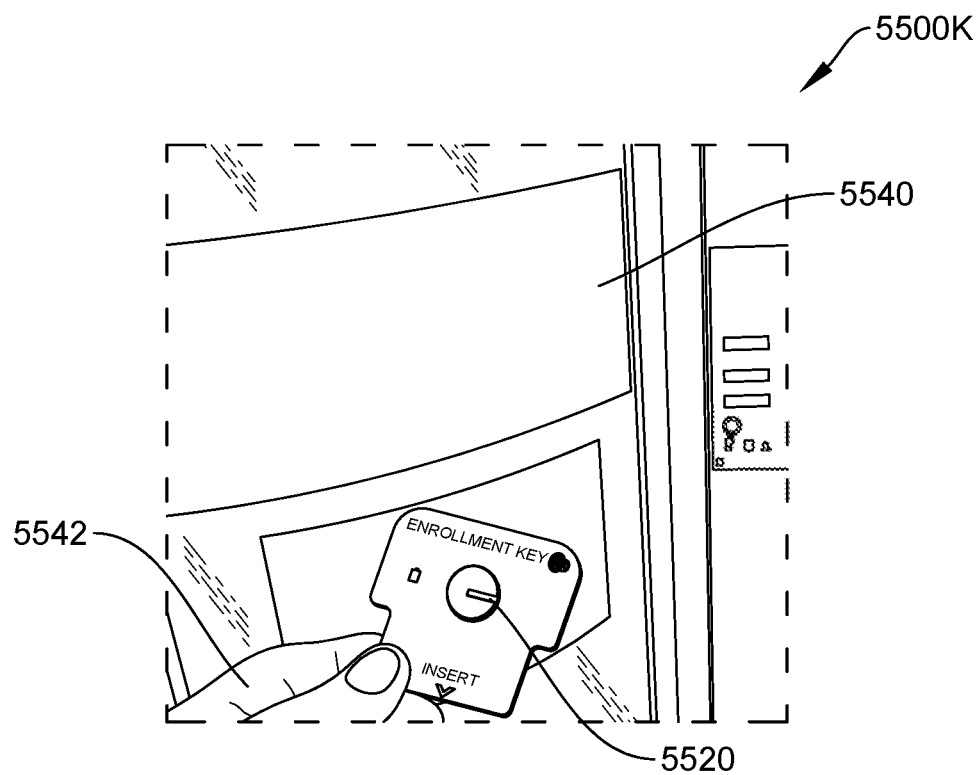

FIG. 55K shows return of an enrollment key 5500K via a portal or access or return door/chute. Here a card user 5542 may present an enrollment key 5520 at the time of the return. For example, as shown the card user prepares to return the enrollment key via a return door, window or other receptacle which may be part of or associated with an automated banking machine 5540. In other examples, the card may be returned to a person, institution, drop box, drop off point or the like such as any of these used by an enrollment key return service, bank, airline, financial institution, card issuer, government agency, or the like.

Figure 55L:
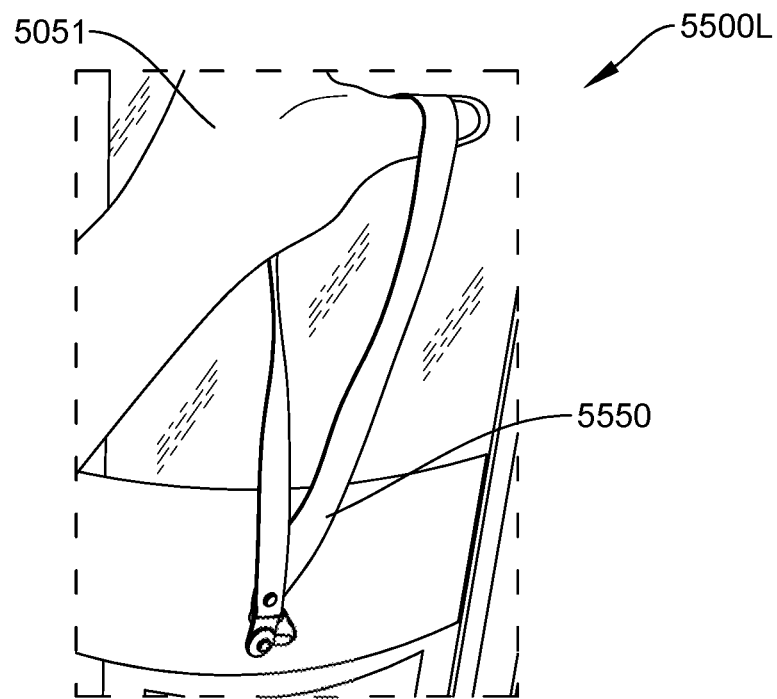

FIG. 55L shows an enrollment key exchange 5500L. Having tendered the enrollment key 5520, the card user may participate in an exchange of the key for another item. The item may be a gift provided when the key is returned or the item may require some financial consideration or both. For example, the item may be offered as a gift following return of the enrollment key. In the example shown, a lanyard is returned as a gift following return of the enrollment key. In other examples, financial consideration is provided by the card user and the item received in return may be some adjunct or complementary item to the card or another item such as another card holder or a wallet.

Figure 55M:
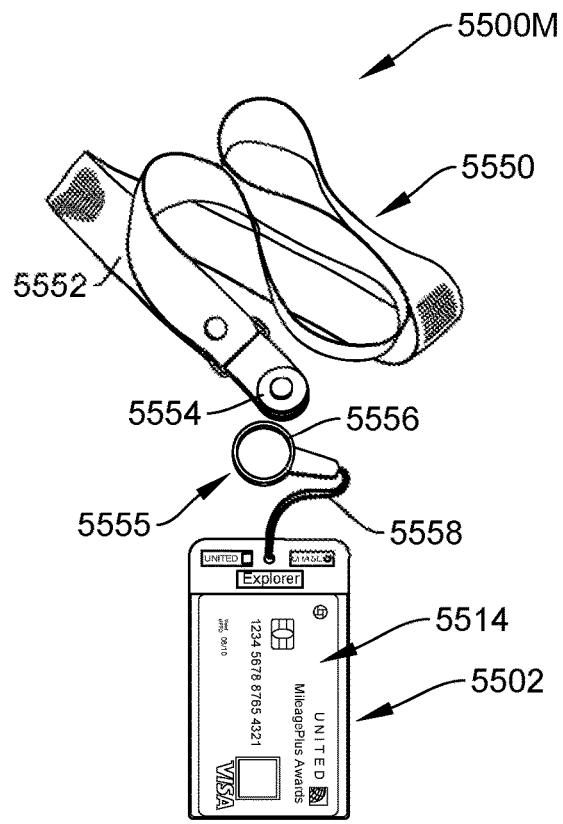

FIG. 55M shows a lanyard 5500M. The lanyard 5550 is provided to the card user 5051 (see FIG. 55L) after the card user's return the enrollment key 5520 (see FIG. 55K). The lanyard includes a strap 5552 and a buckle 5553 (see FIG. 55N). The buckle includes a buckle ring 5554 and a lead 5555 with a buckle loop 5556 attached to a card holder 5502 via a cord 5558. Here, the lanyard is disconnected from the card holder.

Figure 55N:
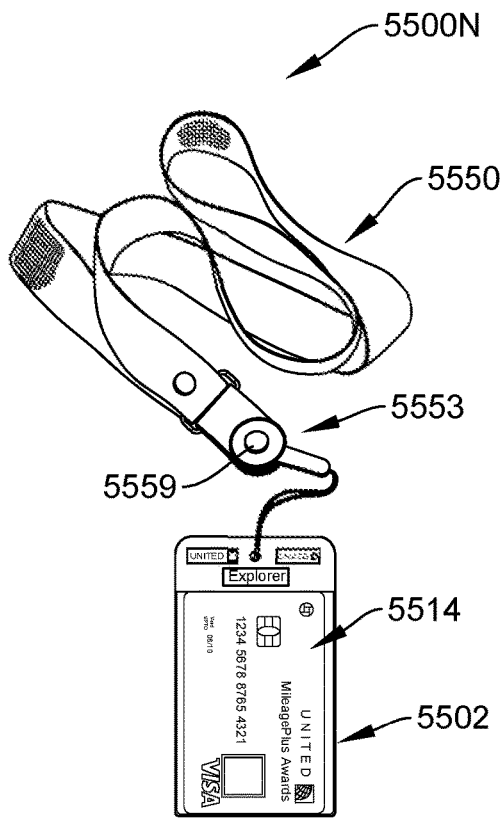

FIG. 55N shows a lanyard attached to a card holder 5500N. Here, the lanyard buckle ring 5554 may engage the lanyard buckle loop 5556. A buckle ring button 5559 or similar device may provide a means for release or quick release of the buckle ring from the buckle loop, for example by changing the configuration of the buckle ring to release the buckle loop. Alternatives include a retractable device with a cord from the retractable device connected to a cord holder. Alternatives include a lanyard strap 5550 that is separable allowing removal of the lanyard from a user's neck. Alternatives include a direct lanyard to card holder attachment or detachable attachment.

Figure 55O:
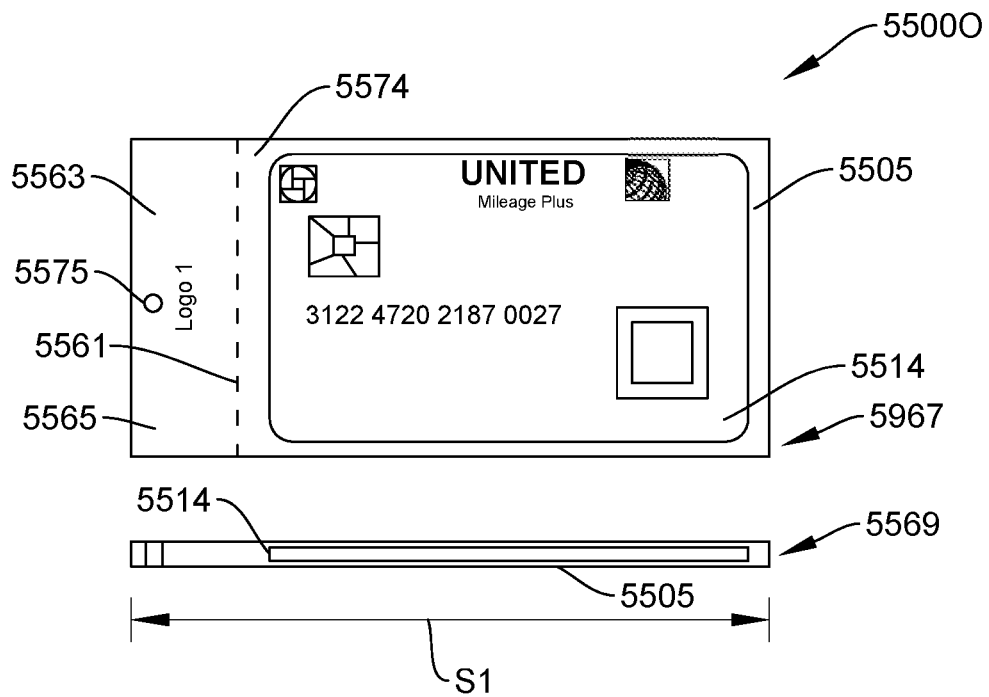

FIG. 55O shows an unfolded card holder with an inserted card 5500 O. In the FIG. 5567 is a top view of the card holder 5567 with inserted card 5514 and 5569 is a similar side view. At left is a flap 5565 having a front face 5563 for folding over a front face 5574 of the pocket 5505 which contains the card. As shown the flap has an optional hole 5575 for attachment to a cord or fastening device and it presents a logo "Logo 1" for marketing/advertising as mentioned herein. Notably, in this view the flap has not been folded over the front face of the pocket.

Figure 55P:
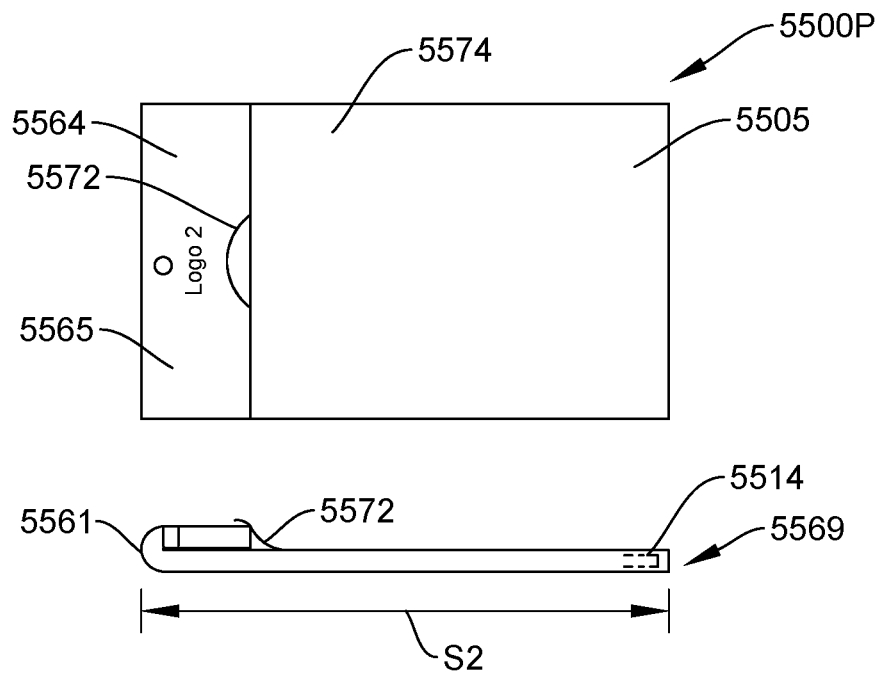

FIG. 55P shows a folded card holder 5500P. In the FIG. 5567 is a top view of the card holder 5567 and 5569 is a similar side view. The card is omitted from top view for clarity. Here the flap 5565 is folded over the front face of the pocket 5574 such that a back face of the flap 5564 is presented showing a logo "Logo 2" for marketing/advertising as mentioned herein. As seen in the figure, the fold 5561 allows the flap to lie alongside the front face of the pocket 5574.

In the top view 5567, a semicircular cut 5572 in the pocket front face 5574 provides a tab 5562 under which the folded flap 5556 may be secured. Other methods of securing the folded flap may be used including hook and loop fasteners, snaps, magnets, or other suitable fastening means and devices.

FIGS. 55O-P illustrate useful embodiments of the card holder wherein card holder length is reduced (s2<s1) such that the card holder can be conveniently placed in a person's pocket, wallet, purse, or the like. In addition, folding the flap 5565 over the over the pocket 5505 may protect the card from contaminants as the folded flap may cover a pocket mouth 5504 (see FIG. 55A) which is otherwise open.

FIGS. 56A-F show use of the above described card(s) and card related elements. In particular, the figures include various processes in which the above described card(s) and card related elements may be used. Note that mentioned steps herein may be optional. Note that mentioned steps herein may not be sequential insofar as steps may be left out.

Figure 56A:
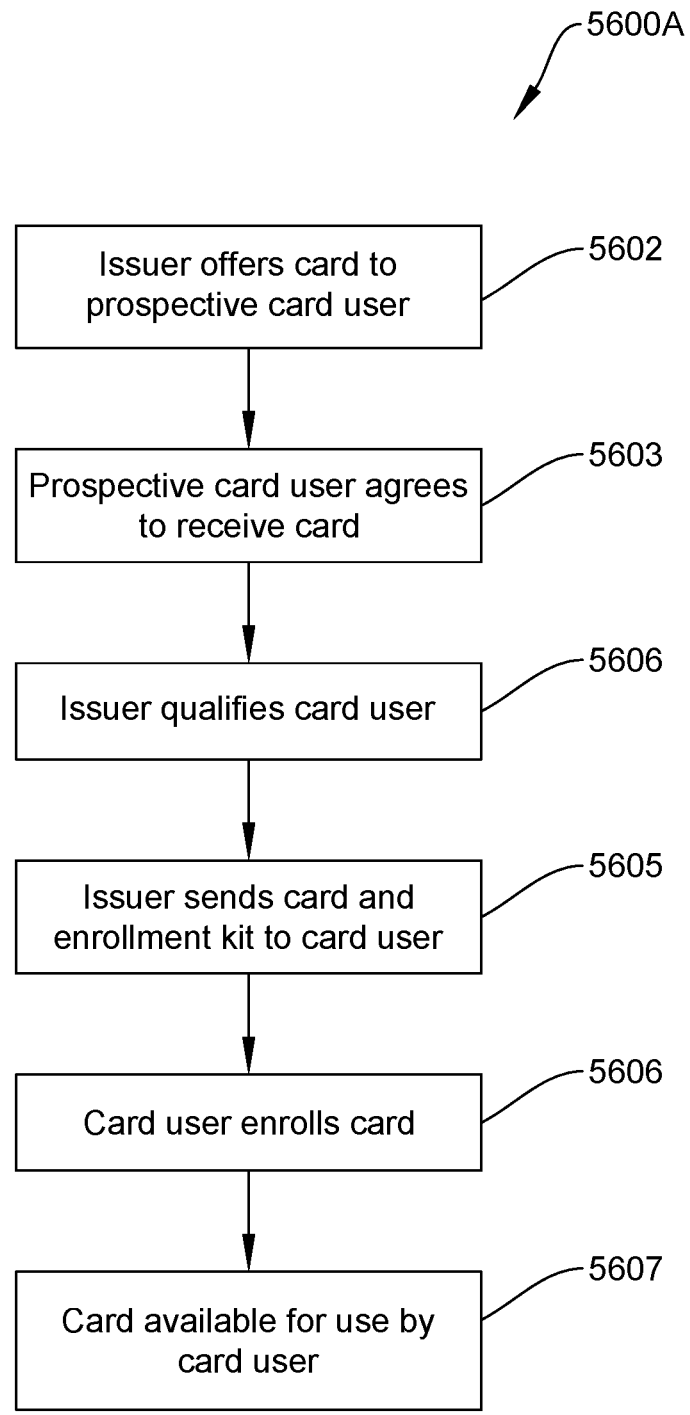
FIGS. 56A-G show flowcharts of biometric express wallet use.

FIG. 56A shows an example of card issuer marketing process 5600A. In a first step 5602 the card issuer offers the card to a prospective card user. In a second step 5603 the prospective card user agrees to receive the card. In a third step 5604 the issuer qualifies the card user which may include a credit report qualification or onboarding. In a fourth step 5605 the issuer sends a card and an enrollment kit to the card user. In a fifth step 5606, the card user enrolls the card which may precede card activation. In sixth step 5607, the card is available for use by the card user, for example available for use in financial transactions.

Figure 56B:
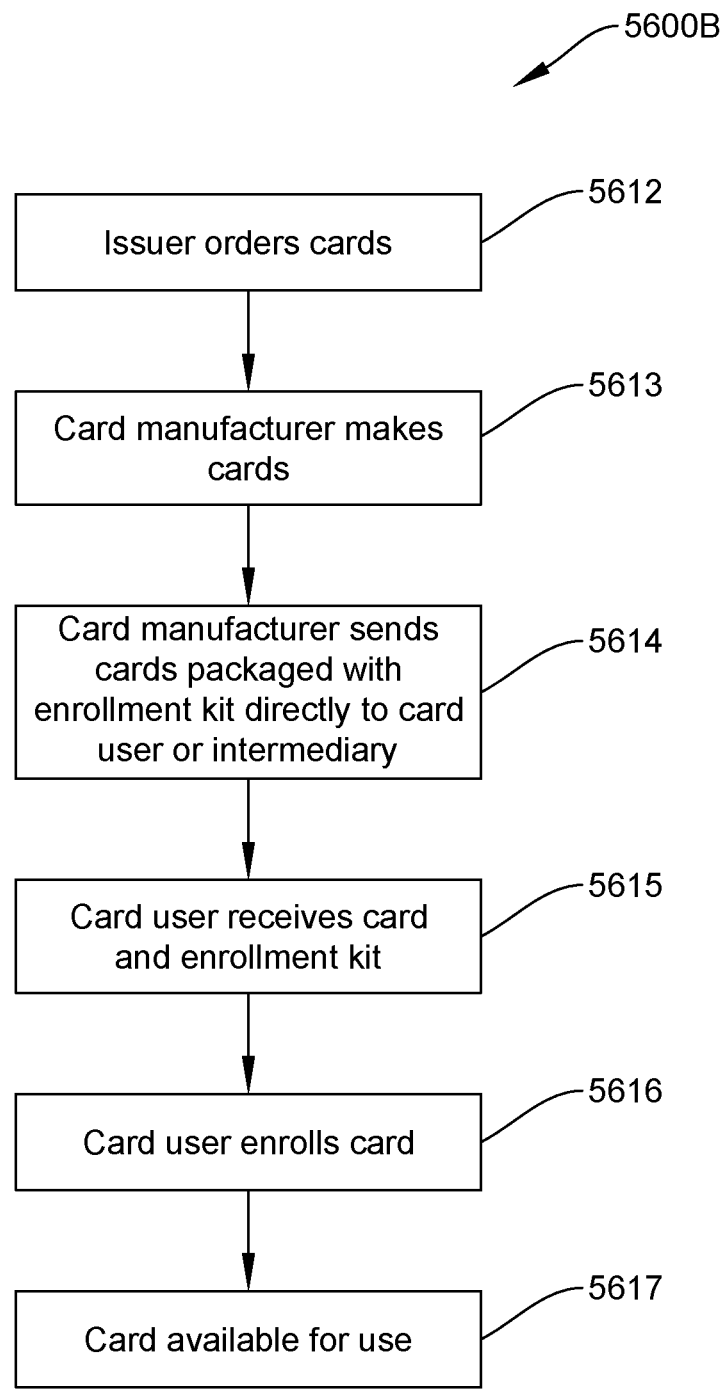

FIG. 56B shows an example of an issuer card order process 5600B. In a first step 5612 the card issuer orders cards. In a second step 5613 a card manufacturer makes the cards. In a third step 5614 the card manufacturer or an intermediary sends cards packaged with an enrollment kit directly to the card user or to an intermediary or to the card issuer. In a fourth step 5615 the card user receives the card and the enrollment kit. In a fifth step 5616 the card user enrolls the card which may precede activation. In a sixth step 5617 the card is available for use by the card user, for example available for use in financial transactions.

Figure 56C:
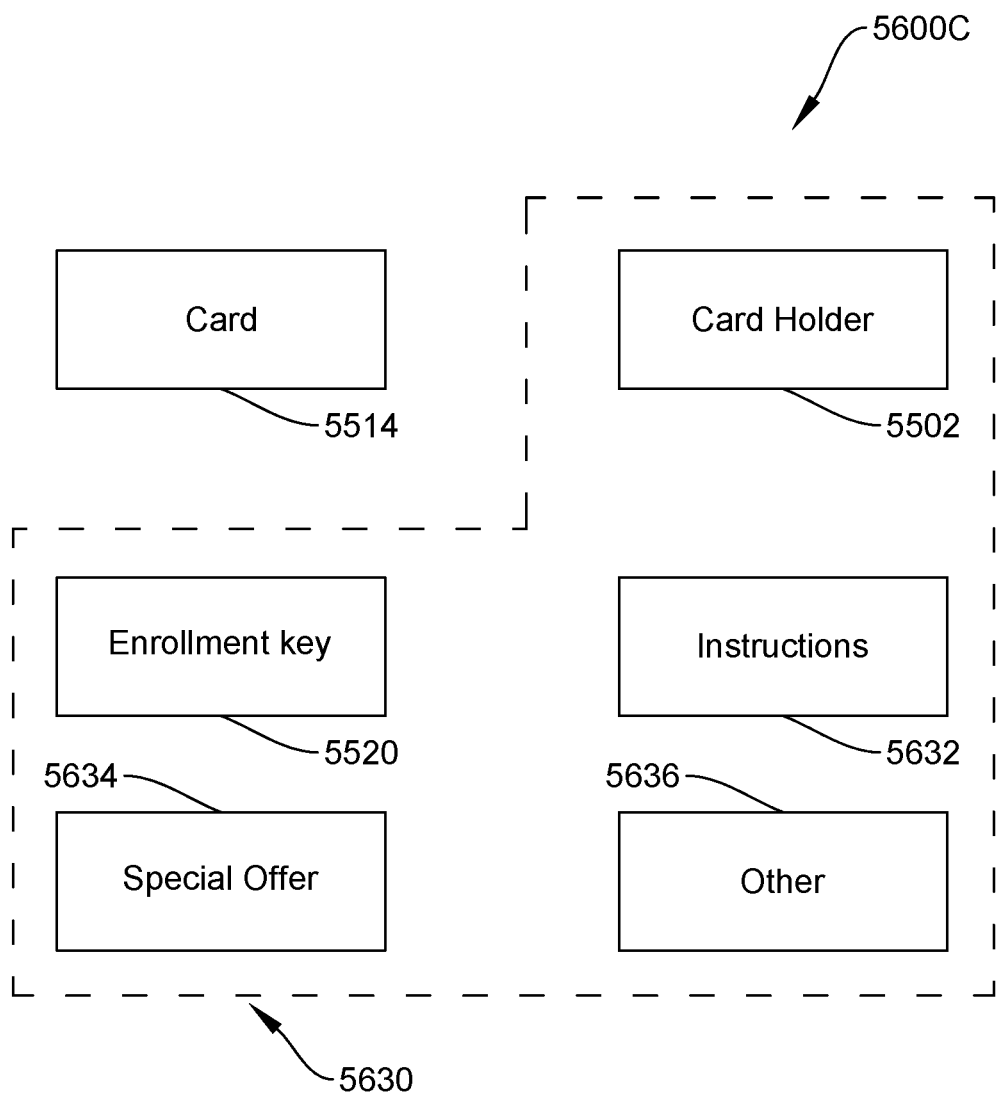

FIG. 56C shows a card and card enrollment kit 5600C. As shown, the enrollment kit 5630 includes one or more of a card holder 5502, an enrollment key 5520, an instruction and/or directions to an instruction such as directions to a website 5632, a solicitation or an offer or a special offer 5634, and other materials or devices 5636. In various embodiments the enrollment kit is sent with a card 5514 or apart from a separately mailed card. In various embodiments the instruction includes instructions for returning the enrollment key. In various embodiments, the card issuer must agree to inclusion of the special offer in the enrollment kit or as a complement to the enrollment kit whether by mail, website, or otherwise.

The other materials or devices 5636 may be documents or devices such as an adjunct to the card. Where other refers to devices, they may be included with the enrollment kit or merely provide a means for obtaining the device. These other item(s) may be offered without a cost for the item or with a cost for the item.

The solicitation, offer or special offer 5634 may be an offer for an item or service. For example, the item may be a no cost or discounted price or priced item. For example, the item may be a card adjunct or complementary item. For example the item may be a wallet for holding the card or for holding the card and other items such as other cards, cash, and identifying documents.

Figure 56D:
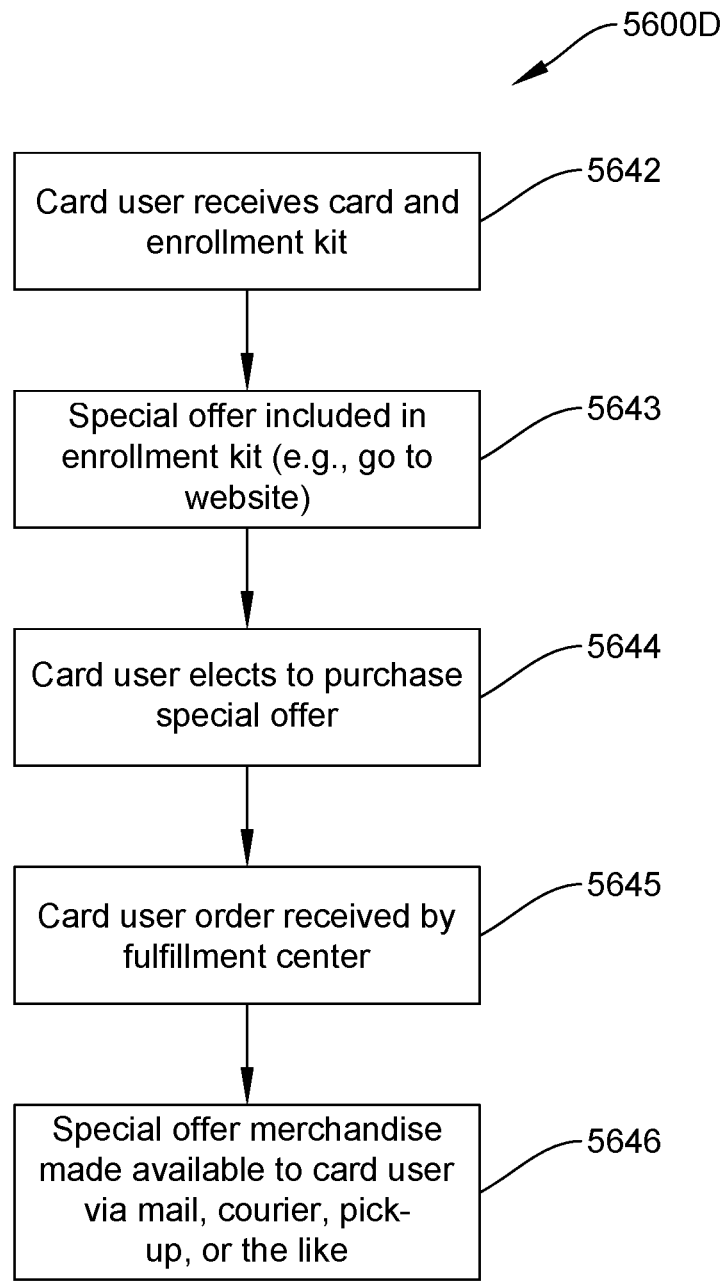

FIG. 56D shows an exemplary special offer process 5600D. A special offer related to the card may graphically coordinate with issuer indicia. In a first step, a card user receives a card and an enrollment kit 5642. In a second step 5643, a special offer is included in the enrollment kit such as a direction to a web site where details of the offer are provided. In a third step 5644, a card user may elect to purchase the special offer. In a fourth step 5645, the card user order is transmitted to and ultimately received by a fulfillment center. In a fifth step 5646, special order merchandise such as a card adjunct or complementary item or a wallet is made available to the card user via mail, courier, pick-up, or the like.

Notably, the enrollment key 5520 may be recovered and/or recycled and/or disposed using eco-friendly procedures. For example, the enrollment key may be returned to a depot for a refresh, refurbishment, recycling, or disposal. This may provide for an ecologically friendly refurbishment/reuse/recycling/disposal of the enrollment key components including the enrollment key battery. This service may be provided by any of the above mentioned providers/entities or by some intermediary or terminal entity. Where the enrollment key is for reuse, the enrollment key may be tested for proper function and may be refreshed or refurbished as needed or as prescribed. Proper function testing may include any one or more of battery testing, continuity testing, visible defects/defacement testing and the like. If the enrollment key fails to function properly and/or if the enrollment key cannot be refurbished, it may be recycled or disposed with an eco-friendly process or procedure.

Figure 56E:
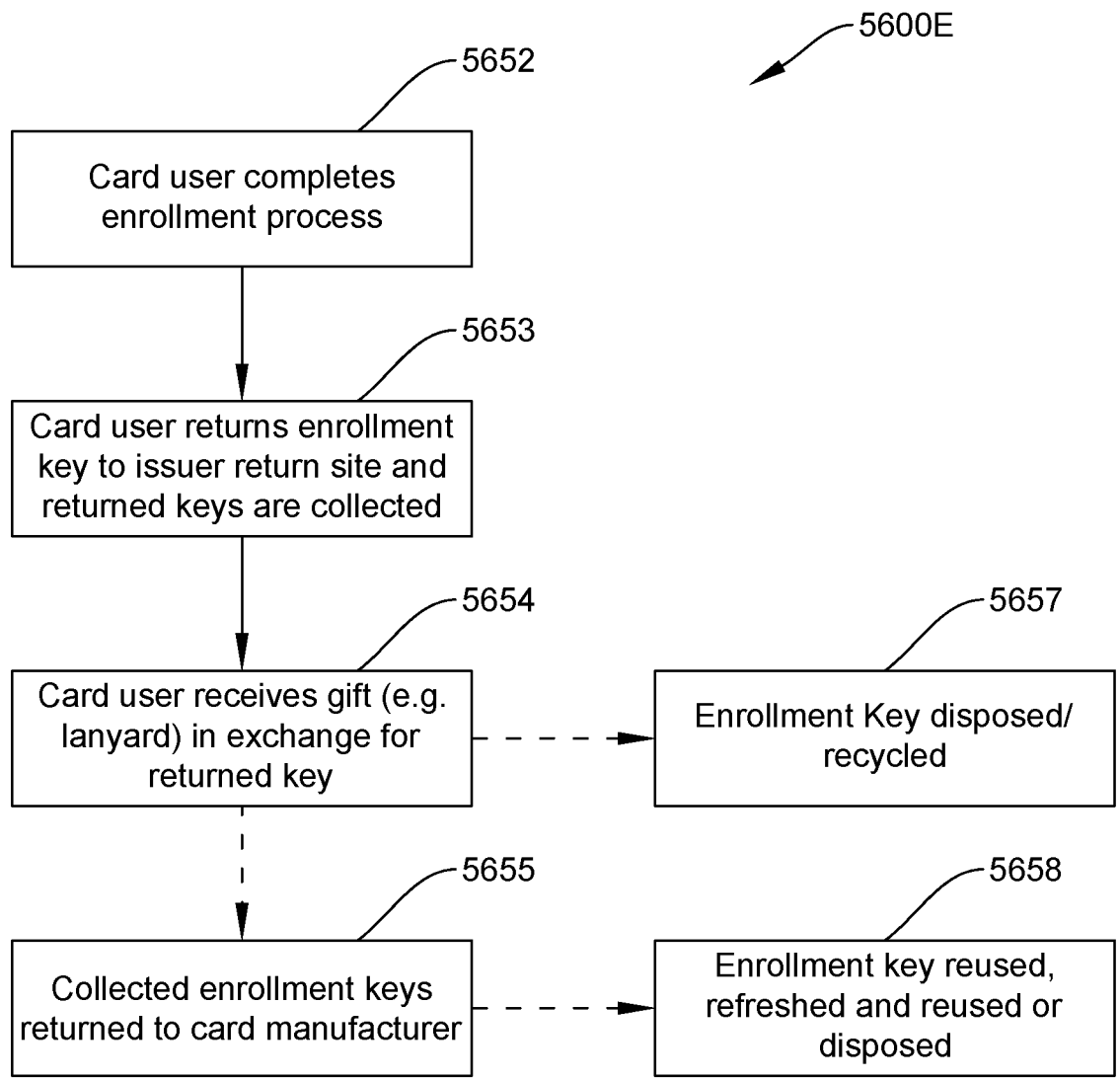

FIG. 56E shows an exemplary card recycling process 5600E. In a first step 5652 the card user completes the enrollment process. In a second step 5653, the card user returns the enrollment key to a return site such as the card issuer return site. In a third step 5654 the card user receives a gift such as a lanyard for attachment to a card holder after which the enrollment key may be subject to refurbishment/reuse/recycling/disposal by some entity other than the card user 5657. In a alternative third step 5655, the enrollment keys may be collected for example at an issuer return center and returned to the card manufacturer after which the enrollment key may be subject to refurbishment/reuse/recycling/disposal 5658.

Figure 56F:
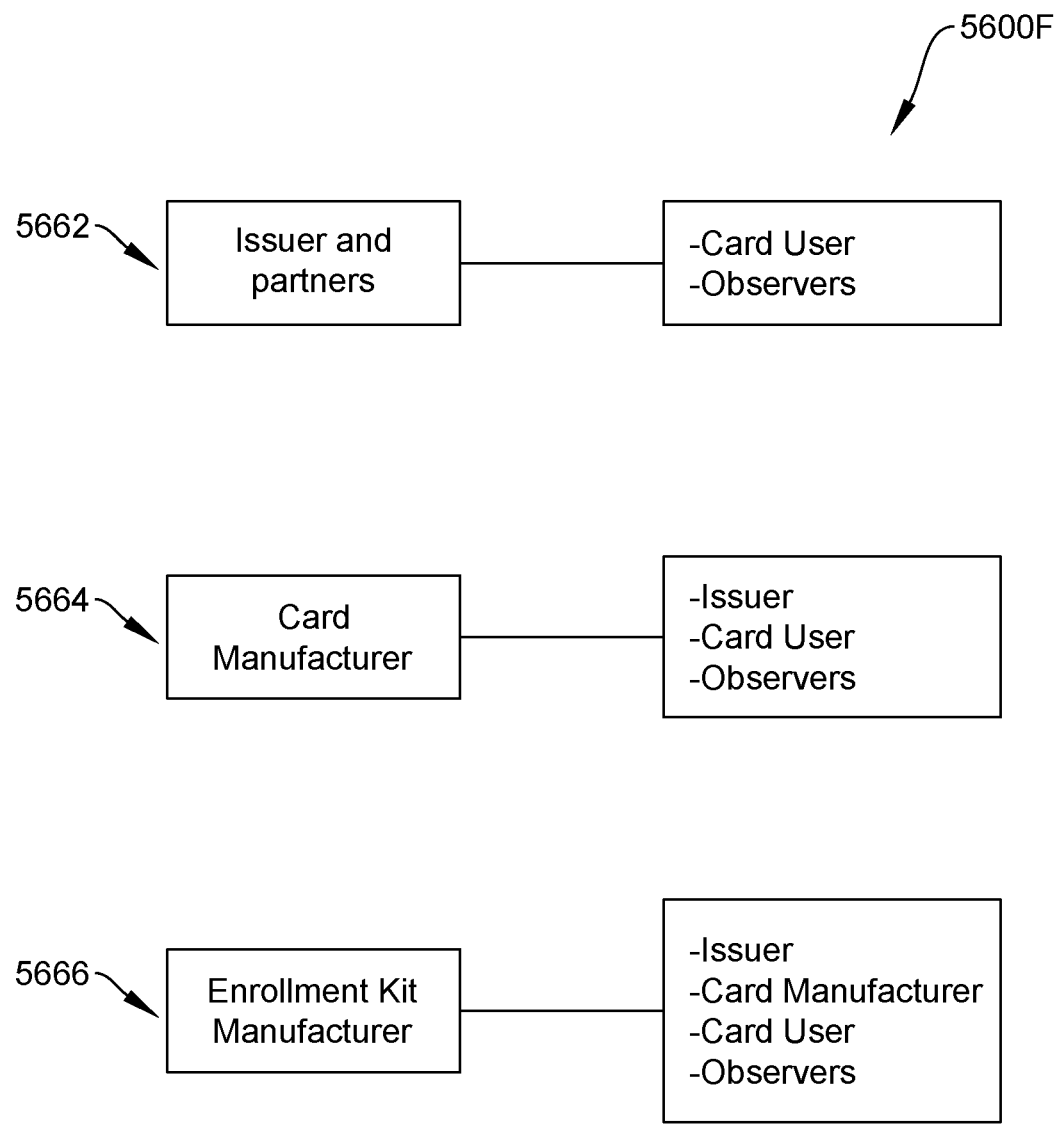

FIG. 56F shows a first group of marketing options 5600F. For example, the card issuer may market/advertise his name and logo and/or his partner's name and logo. For example the card user and observers of the card user may see this marketing/advertising displayed on any one or more of the card, the card holder, the lanyard, the enrollment kit, and other items included or thereafter received in connection with the card 5662.

For example, the card manufacturer may market/advertise his name and logo and/or his partner's name and logo. For example, the card user and observers of the card issuer and card users may see this marketing/advertising displayed on any one or more of the card, the card holder, the lanyard, the enrollment kit, and other items included or thereafter received in connection with the card 5664.

For example, the enrollment kit manufacturer may market/advertise his name and logo and/or his partner's name and logo. For example the card user and observers of the card user may see this marketing/advertising displayed on any one or more of the card, the card holder, the lanyard, the enrollment kit, and other items included or thereafter received in connection with the card 5666.

Figure 56G:
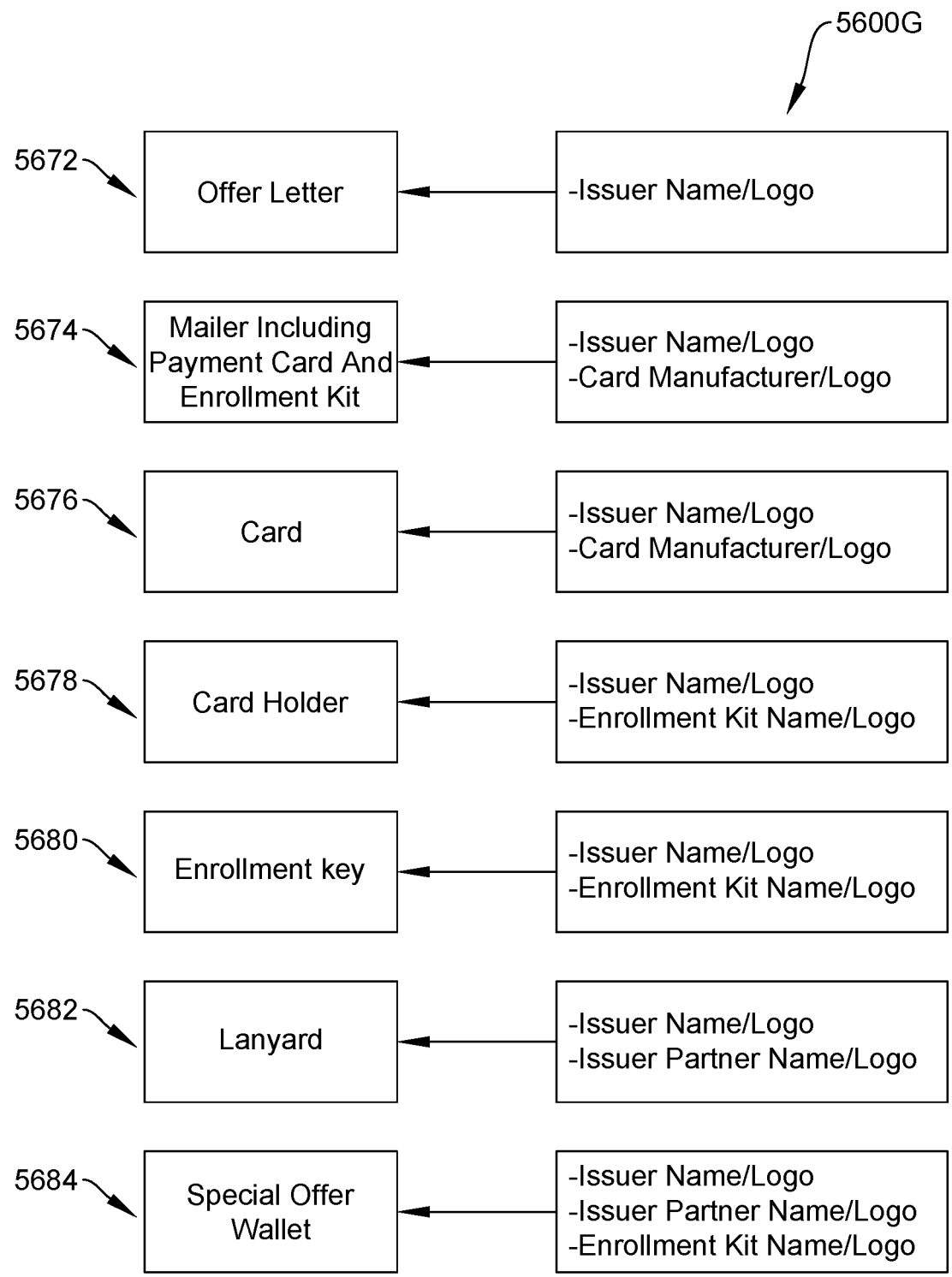

FIG. 56G shows a second group of marketing options 5600G. The issuer's letter offering the card may bear the issuer's name/logo 5672. The mailer including the payment card and/or enrollment kit may bear the issuer name/logo and/or the card manufacturer name/logo 5674. The card may bear the issuer name/logo and/or the card manufacturer name/logo 5676. The card holder may bear the issuer name/logo and/or the enrollment kit manufacturer name/logo 5678. The enrollment key may bear the issuer name/logo and/or the enrollment kit manufacturer name/logo 5680. The lanyard (or another item purchased or not) may bear the issuer name/logo and/or the issuer partner's name/logo 5682 and/or similar information of another related or complementary service provider. The special offer wallet (or other item purchased or not) may bear the issuer name/logo and/or the issuer partner's name/logo and/or the enrollment kit manufacturer name/logo 5684.

Some embodiments of the present invention may include use of or substitute use of an energy storage element of a portable electronic device. Portable electronic devices include phones, cell phones, smartphones, Personal Digital Assistants, or the like. In particular, the portable device energy storage element (e.g., a battery), may be used to provide electric power to electronics of the card. For example, power may be provided to the card by the portable device ("phone") energy storage element to enable the card processor to operate, to store information in card memory, or during enrollment of the card. Such use of a portable device energy storage element may be in lieu of use of the card with an enrollment key.

Figures including FIGS. 57A-E and 58A-P describe embodiments that harvest energy and/or communicate with a personal electronic device such as a cell phone. For example, a card such as a biometric or contactless card can harvest energy and/or communicate with a personal electronic device.

Figure 57A:
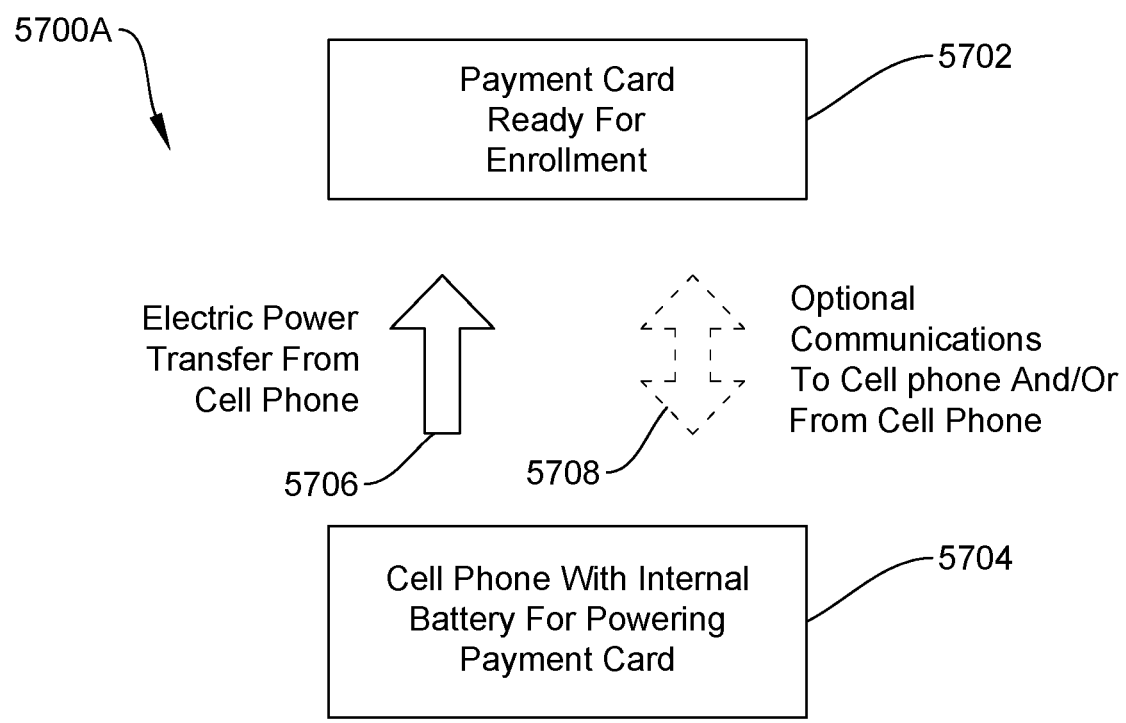
FIGS. 57A-E show a first method including a phone such as a cell phone.

FIG. 57A shows schematically 5700A use of a card or payment card 5702 with a phone or a cell phone 5704. As seen, the card may receive electric power from the phone 5706. And as seen, the card may send and/or receive phone communications 5708.

A difficulty of phone and card communications is manipulation and positioning of these two items such that proper coupling of the two devices enables satisfactory power transfer. While this difficulty is resolved when the card is placed in a wallet and when an enrollment key is inserted in the wallet, such assembly is not reasonable when the card power source is a portable device like a phone. What is needed is an assembly that frees the users from the task of holding the card in position with respect to the phone while, for example, simultaneously enrolling a fingerprint and orienting the card with respect to the phone to allow for communications and/or power transfer/harvesting.

Figure 57B:
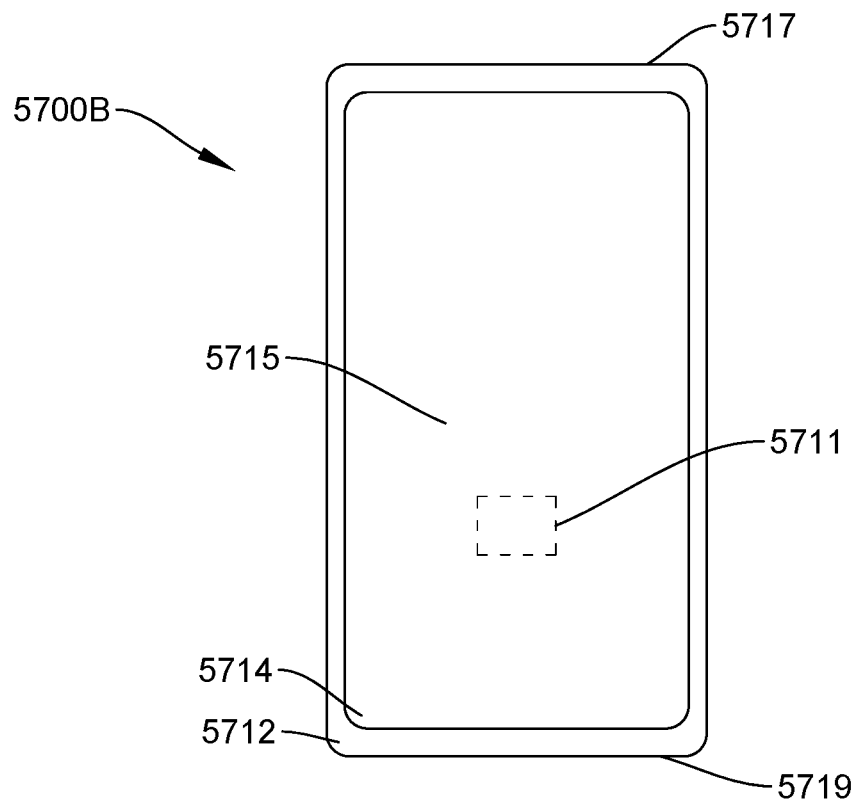

FIG. 57B shows a front face or screen view of a typical cell phone 5700B. Here, a cell phone 5712 presents a screen or display 5714 on its front face 5715. A phone top 5717 is opposite a phone bottom 5719. A phone power storage element and/or power transfer element (battery, antenna, coil, or similar power coupling device) referred to as a phone power source 5711 is included with the phone.

Figure 57C:
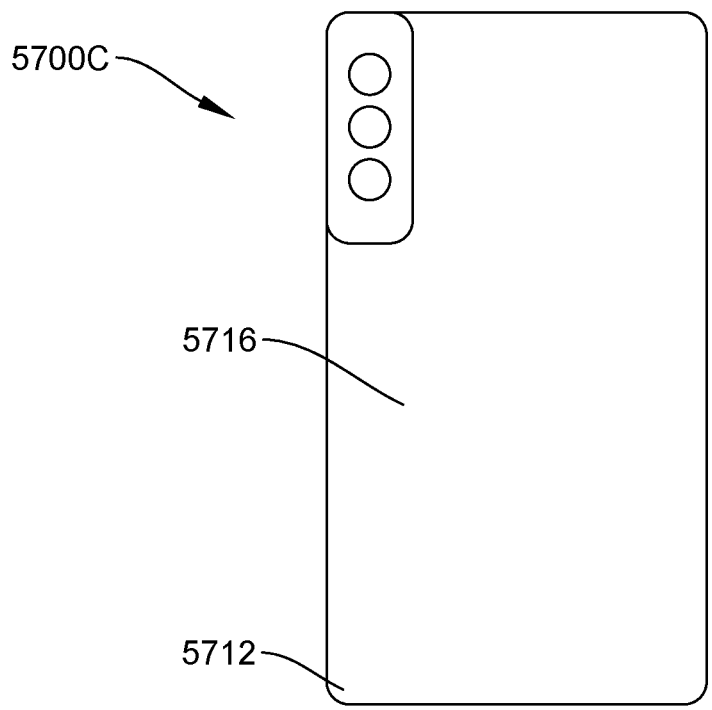

FIG. 57C shows a back face or back view 5700C of the cell phone of FIG. 57B. The back face 5716 is opposite the front face 5715. Notably, the phone includes an energy storage element.

Figure 57D:
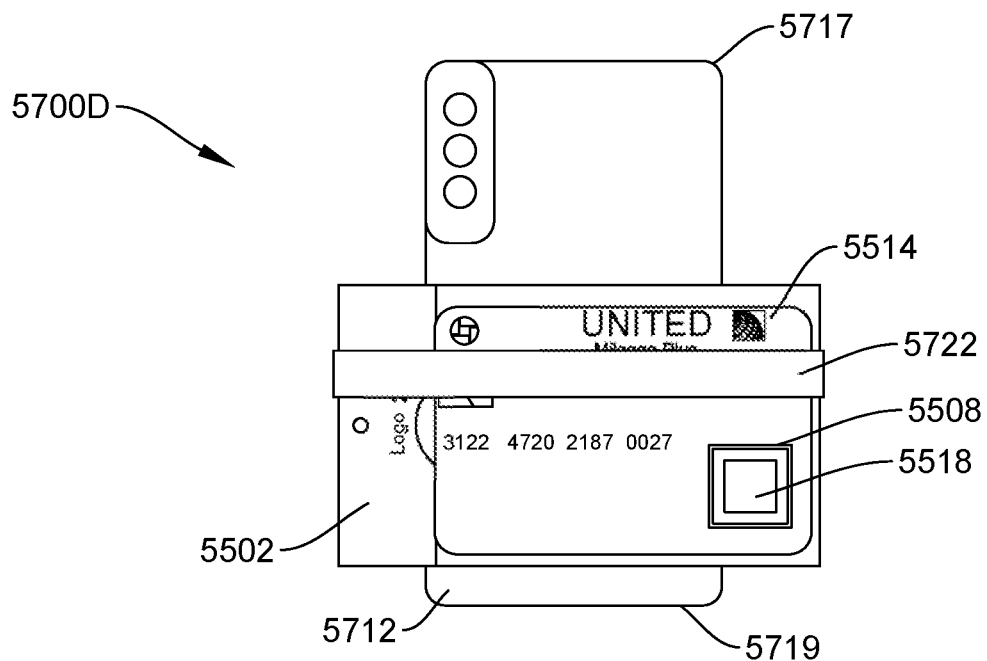

FIG. 57D shows a card held to a phone in a first position across the phone 5700D. In particular a card 5514 may be within a card holder or transparent jacket such as a bio express card holder or wallet 5502 that provides access to a card fingerprint sensor 5518 via a card holder cut-out or window 5508. A fixture 5722 as simple as an elastic band 5722 may be used to fix the card with respect to the phone. Notably, fixtures 5722 may be elastic bands, sleeves, clips, or the like that surround, partially surround, encase, provide card and/or phone receptacles, or the like. These or other fixtures may allow orientation of the card with respect to the phone.

As seen in this embodiment, the card 5514 is held in a position across the back face of the phone 5712. Whether the card is adjacent to the back face of the phone or the front face 5715 of the phone may depend on phone power source 5711 location. Whether the card is closer to the phone top 5717 or the phone bottom 5719 may depend on the phone power source location. Whether the card is adjacent to the phone front face or the phone back face, the phone display 5714 may be used to provide information to the user during card enrollment.

Figure 57E:
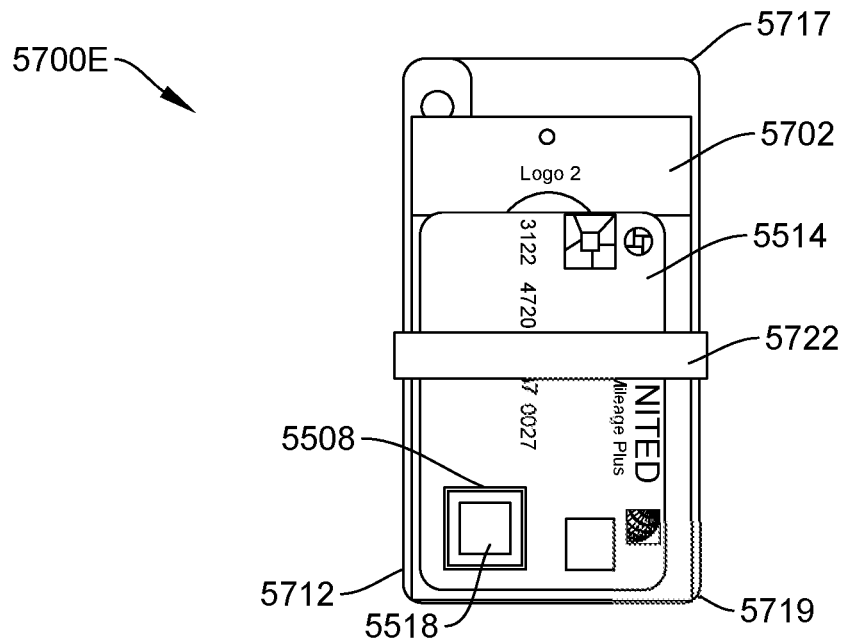

FIG. 57E shows a card held to a phone in a second position in line with the phone 5700E. In particular a card 5514 may be within a card holder or transparent jacket such as a bio express card holder 5502 that provides access to a card fingerprint sensor 5518 via a card holder cut-out or window 5508. A fixture 5722 as simple as an elastic band 5722 may be used to fix the card with respect to the phone. Notably, fixtures 5722 may be elastic bands, sleeves, clips, or the like that surround, partially surround, encase, provide card and/or phone receptacles, or the like.

As seen in this embodiment, the card 5514 is held in a position across the back face of the phone 5712. Whether the card is adjacent to the back face of the phone 5716 or the front face 5715 of the phone may depend on phone power source 5711 location. Whether the card is closer to the phone top 5717 or the phone bottom 5719 may depend on the phone power source location. Whether the card is adjacent to the phone front face or the phone back face, the phone display or screen 5714 may be used to provide information to the user during card enrollment.

When the card 5514 is held adjacent or next to the phone 5712 by the fixture 5722 and power from the phone power source 5711 is made available to the card, the card may be ready for enrollment. Enrollment may take place as described in connection with the bio express wallet 5502 above taking into account that the phone 5712 replaces the enrollment key 5220. One or both of the phone display 5714 and indicators (e.g. . . . lights such as LED lights, 5041, 5043) on the card may provide information to and/or prompt the user in the enrollment process as described above. For example an LED light may flash to indicate fingerprint entry or fingerprint portion entry and the LED light may stay on when a fingerprint has been completely entered.

Figure 58A:
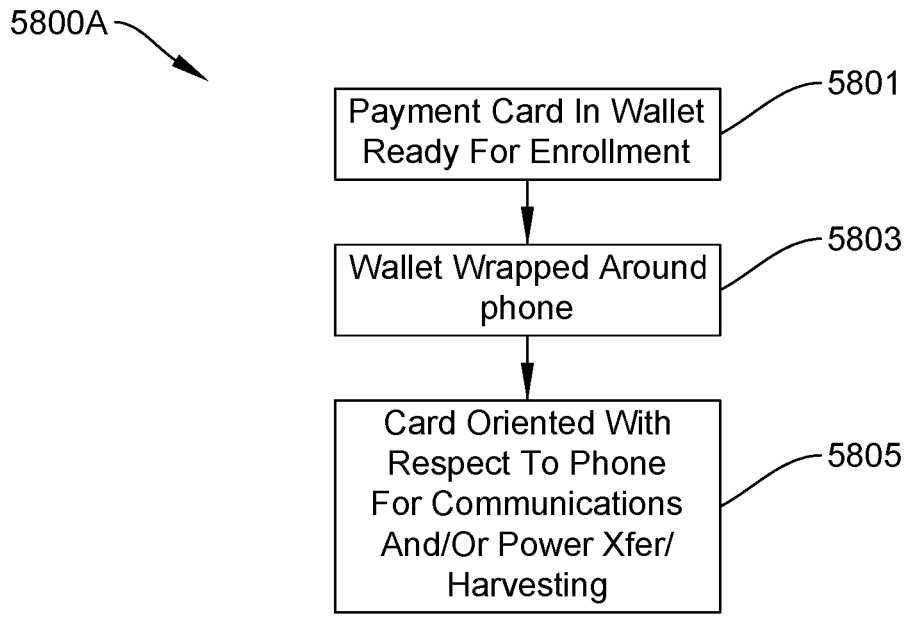
FIGS. 58A-P show a second method including a phone such as a cell phone.

FIG. 58A shows a flowchart 5800A describing card and wallet use with a cell phone. In a first step 5801, a card such as a payment card is placed or located in a wallet and the card is ready for enrollment. In a second step 5803, the wallet is wrapped around a cell phone. In a third step 5805, the card is oriented with respect to the phone for communications and/or power transfer or power harvesting.

Figure 58B:
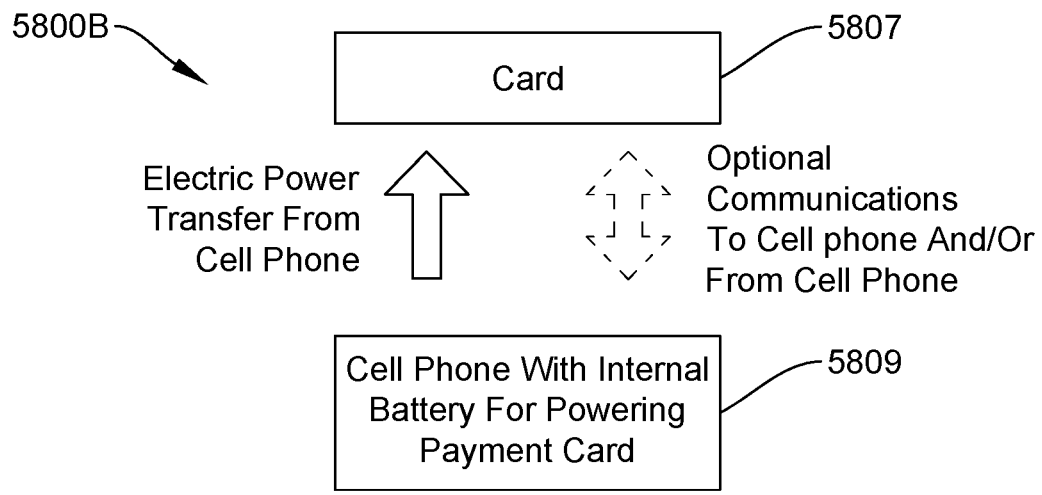

FIG. 58B shows signals and/or energy transferred between the cell phone and the card 5800B. In particular, a card 5807 is coupled, for example electromagnetically coupled, to a cell phone (e.g. a smartphone) 5809. The cell phone internal battery may provide energy to the card and communications may occur card-to-cell-phone or cell-phone-to-card.

Figure 58C:
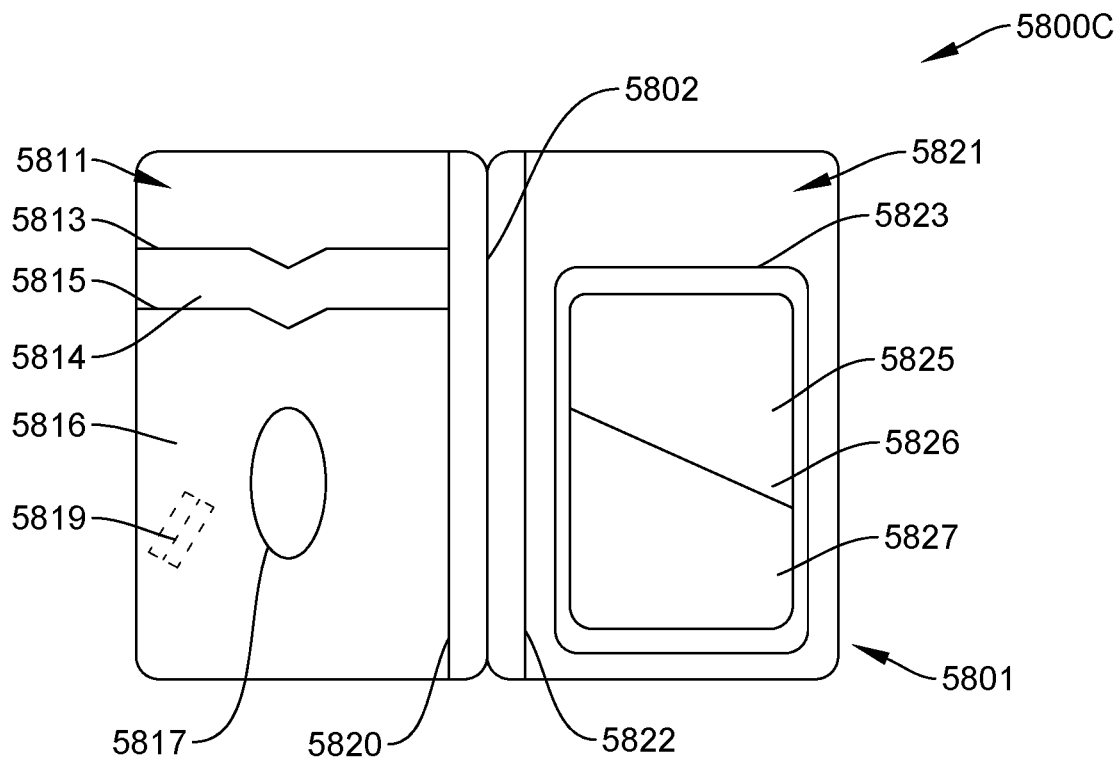

FIG. 58C shows a wallet inside exposure for holding, among other things, a card 5800C. Wallet materials are discussed above. As seen, the wallet 5801 has a fold line 5802 joining the left inside exposure 5811 and the right inside exposure 5821 of the unfolded wallet. In some embodiments, near or beneath the left inside exposure, RFID material 5819 is included to block electromagnetic communications with cards inserted in the left inside exposure. In some embodiments, the right inside exposure has no RFID material.

Various designs with pockets are possible for the left inside exposure 5811. For example, as shown, the left inside exposure 5811 includes a first horizontal pocket 5813 covered by a first flap 5814 and a second horizontal pocket 5815 covered by a second flap 5816. The second flap may have a hole 5817 for pushing a card inserted in the second pocket. Yet another vertical pocket near the fold line 5820 may be included.

Various designs with pockets are possible for the right inside exposure 5821. For example, a card used most of the time may be located in a primary pocket which may be a partial pocket 5823. Such a card may be a contactless or biometric card and the wallet 5801 may facilitate enrollment and use of the card. As shown, the primary pocket includes a flap or cover 5826 which may be transparent or not. The flap may be continuous, bifurcated or partial. For example, the pocket front may be partially covered by an upper flap 5825 which may be transparent or not. For example, the pocket front may be partially uncovered 5827 below an upper flap such as upper flap 5825 which may provide access to a card fingerprint sensor. Yet another vertical pocket near the fold line 5822 may be included.

Figure 58D:
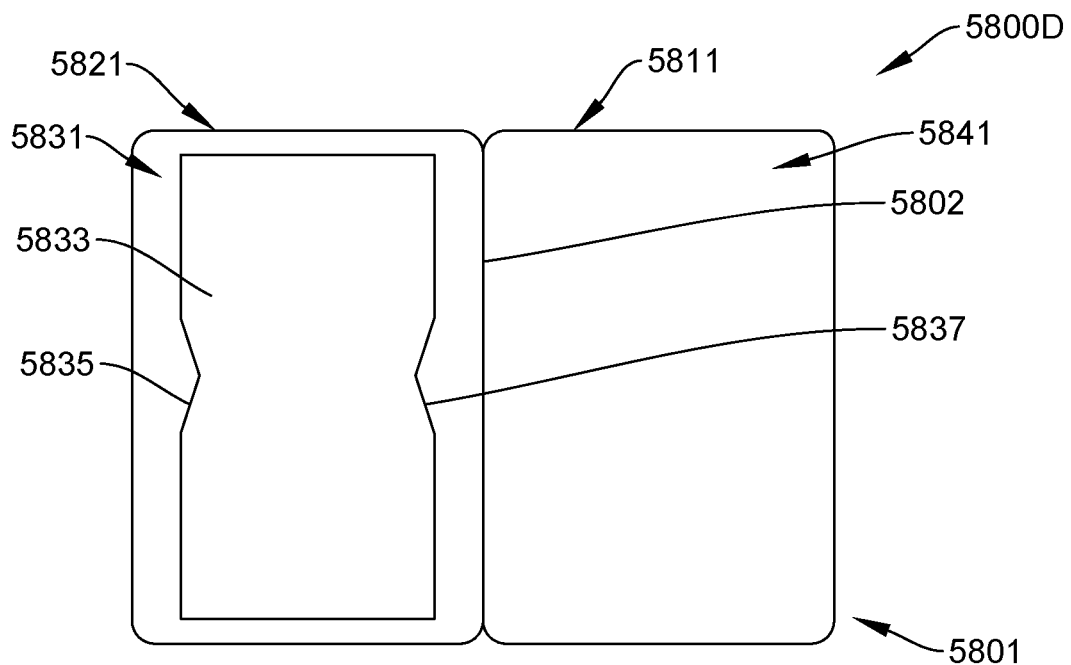
Figure 58E:
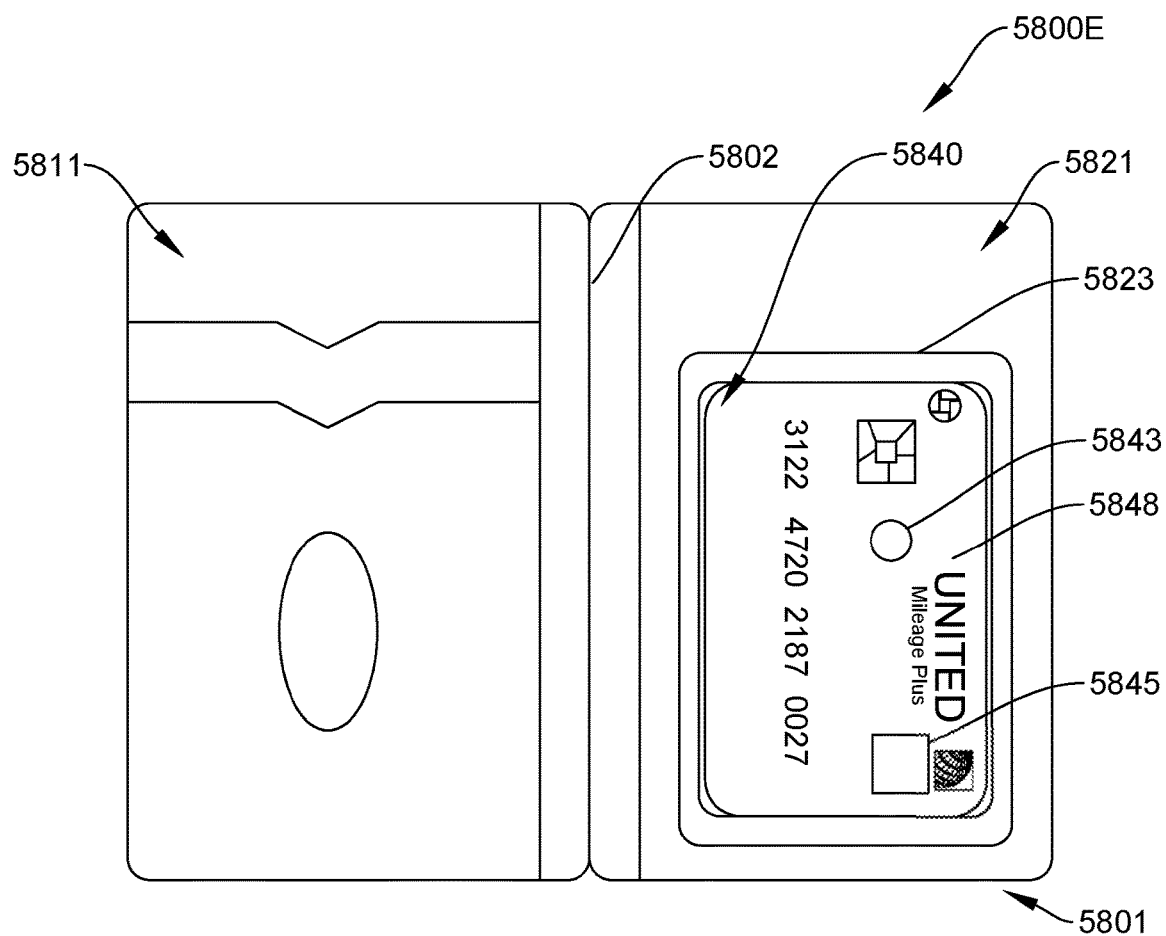

FIG. 58D shows a wallet outside exposure 5800D. A wallet left outside exposure 5831 and a wallet right outside exposure 5841 are joined by the fold line 5802. A flap 5833 is located on the wallet left outside exposure. This flap may be fixed such that left and right access is created to one or more pockets 5835, 5837. [0347] FIG. 58E shows the unfolded wallet with an inserted card in the primary pocket 5800E. The inside left exposure 5811 and the inside right exposure 5821 are shown to either side of the fold line 5802. In addition, a card such as a contactless or biometric card 5840 is within the primary pocket 5823. Various embodiments include a card LED(s) 5843. Various embodiments include a card fingerprint sensor 5845.

In various embodiments, wallet pockets other than the primary pocket 5823 and such as wallet pockets 5820 and 5822 may hold passports, ID cards, other payment cards, drivers license, currency, and the like.

Figures 58F, 58G:
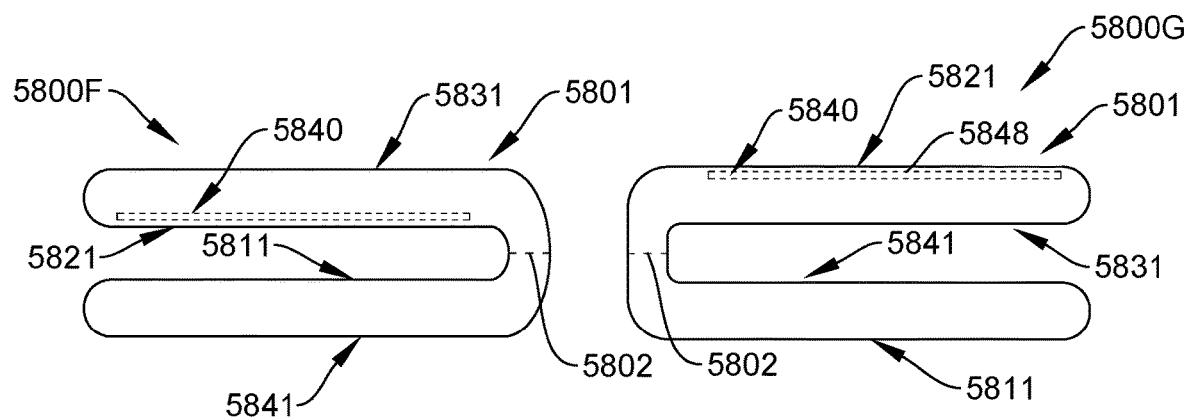

FIG. 58F shows a first folded wallet 5800F. Here, the wallet 5801 is folded such that the left inside exposure 5811 and primary card 5840 faces the right inside exposure 5821. This is a normal manner of folding the wallet and is referred to as a normal fold.

FIG. 58G shows a second folded wallet 5800G. Here the wallet 5801 is folded such that the left outside exposure 5831 faces the right outside exposure 5841. This is referred to as a reverse fold where the primary card 5840 face 5848 is not obstructed by the inside left exposure 5811 as was the case for a normal fold. In various embodiments, in a reverse fold all or part of the primary card face is visible to a wallet user.

Figures 58H, 58I:
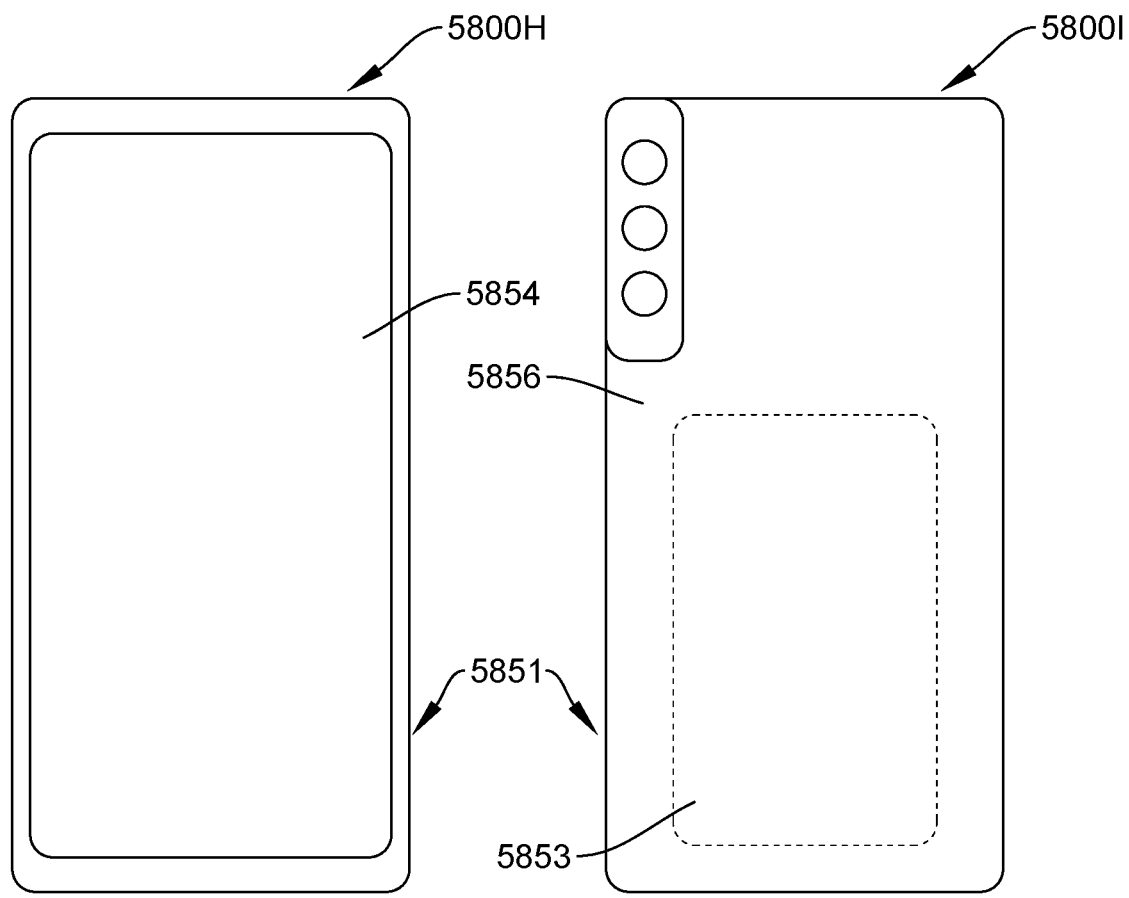
Figure 58J:
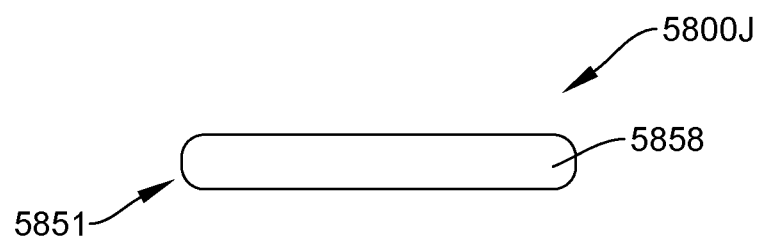

FIGS. 58H-I show a cell phone for use with the wallet 5800H-I. The cell phone 5851 has a front screen or display 5854 and on the opposite side a cell phone back 5856. In various embodiments, the cell phone includes a battery or internal battery 5853. A cell phone battery 5853 may be located in the cell phone. FIG. 58J shows a view 5800 J of the cell-phone 5851 with cross-section 5858.

Figure 58K:
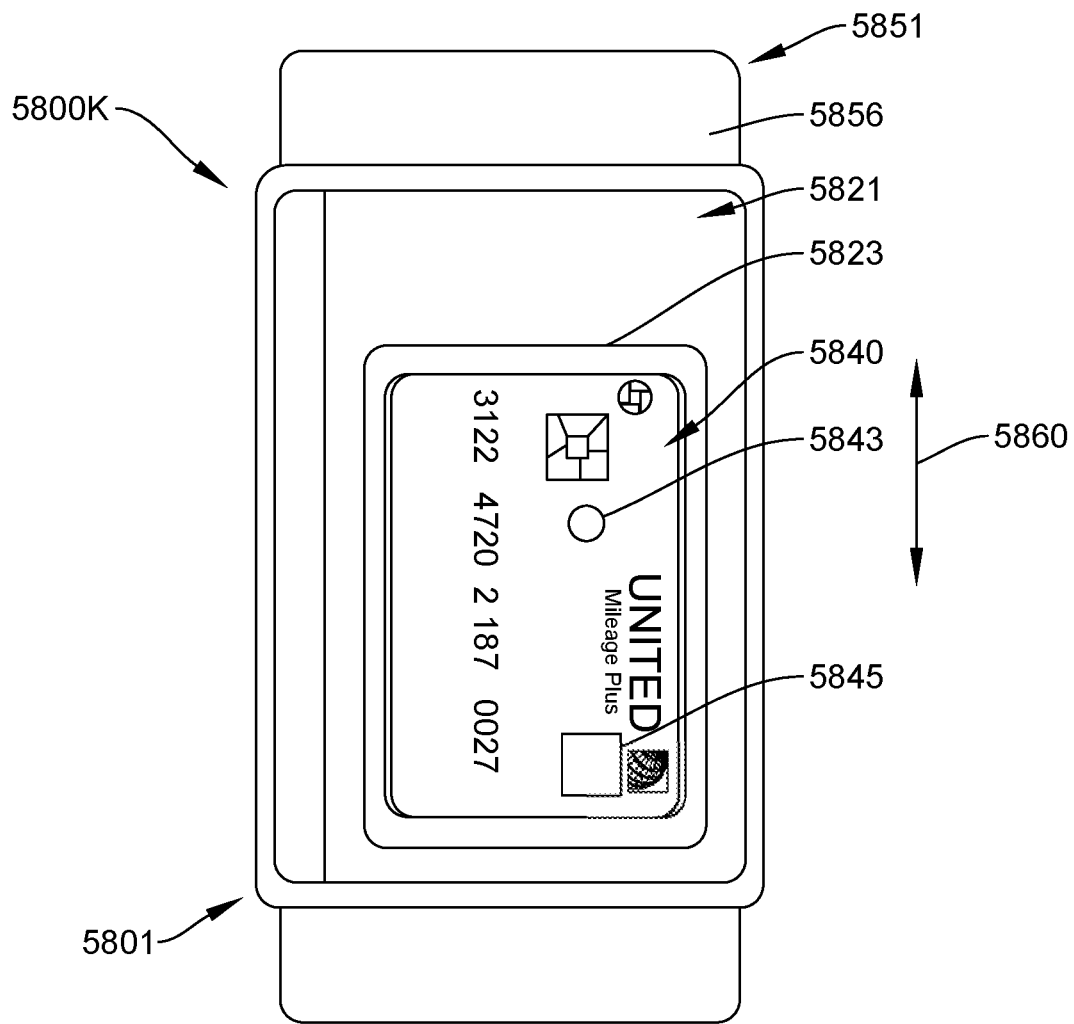
Figure 58L:
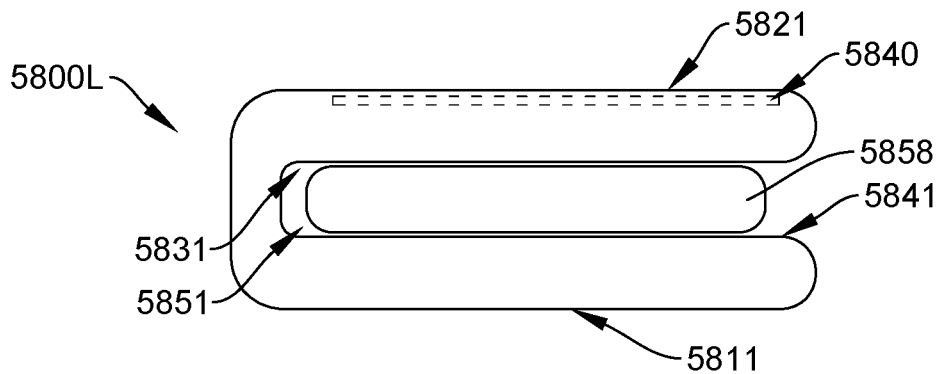

FIG. 58K-L show a first view/side of the wallet and phone assembly 5800K-L. As seen, the wallet 5801 is wrapped around the phone 5851 using a reverse fold as seen in the cross section of the assembly in FIG. 58L. In particular, the wallet 5801 right inside exposure 5821 lies face up such that wallet right side outside exposure 5831 is against or adjacent to the cell phone back 5856. The primary pocket 5823 with an inserted card 5840 is visible to a user. A card fingerprint sensor 5845 may be present and accessible and a card LED or multiple LED's 5843 may be present and visible, for example to aid during enrollment as mentioned herein. The double arrowed line 5860 indicates that the card may be moved relative to the phone by sliding the wallet up and down with respect to the phone, for example to achieve coupling such as electromagnetic coupling of the card and phone, phone antenna, and/or phone battery. In some embodiments, the phone may provide indications or accept inputs, such as tactile, visual, audible, or vibration meant to assist with phone and card manipulation, enrollment of the card, and/or verification of the enrollment. These indications may be provided through the use of software or a Software Development Kit implemented in a banking or financial institution system and/or on a phone application.

Figure 58M:
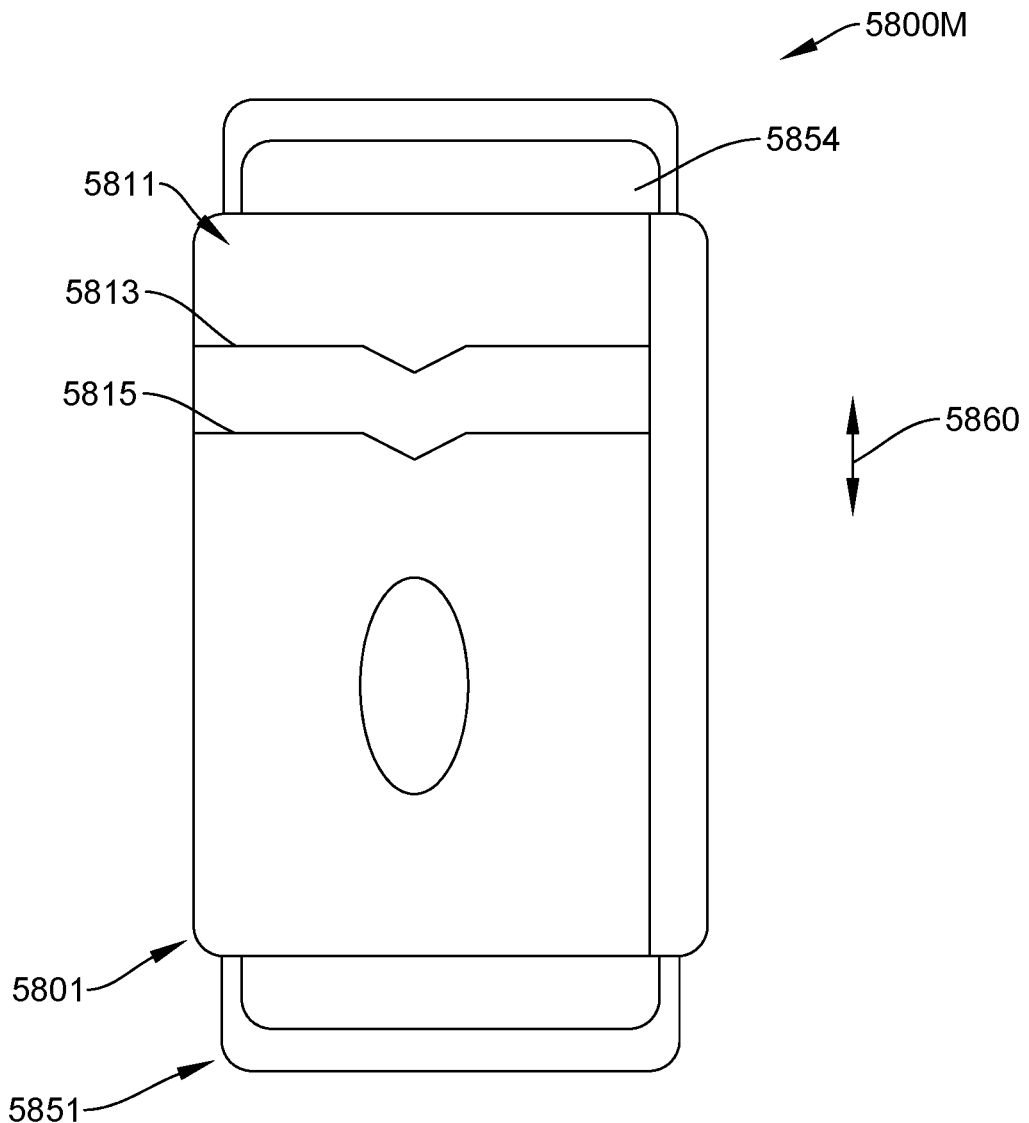
Figure 58N:
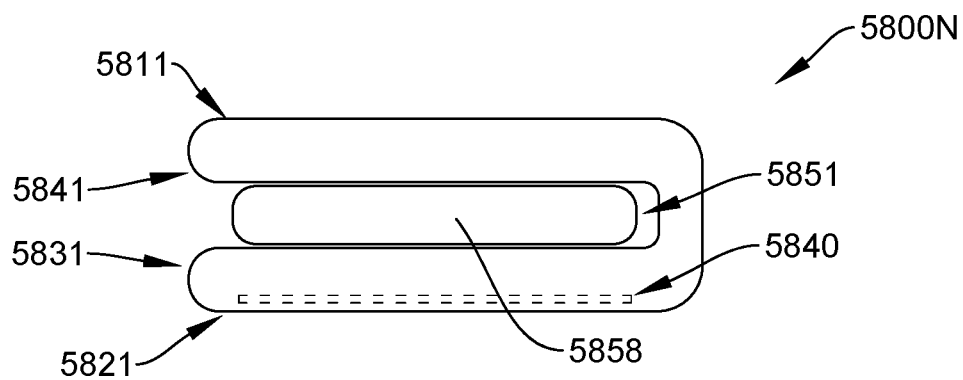
Figure 58O:
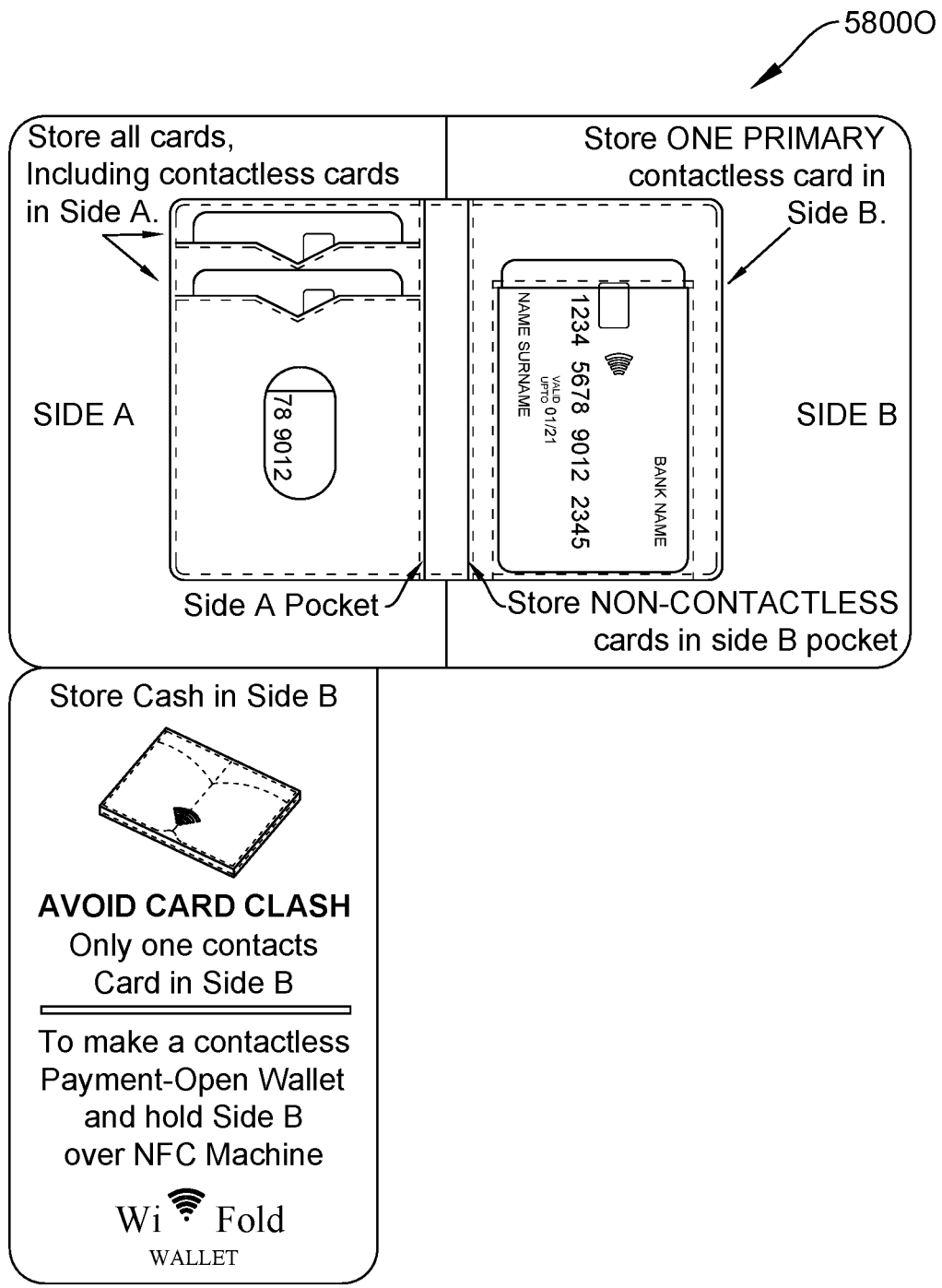
Figure 58P:
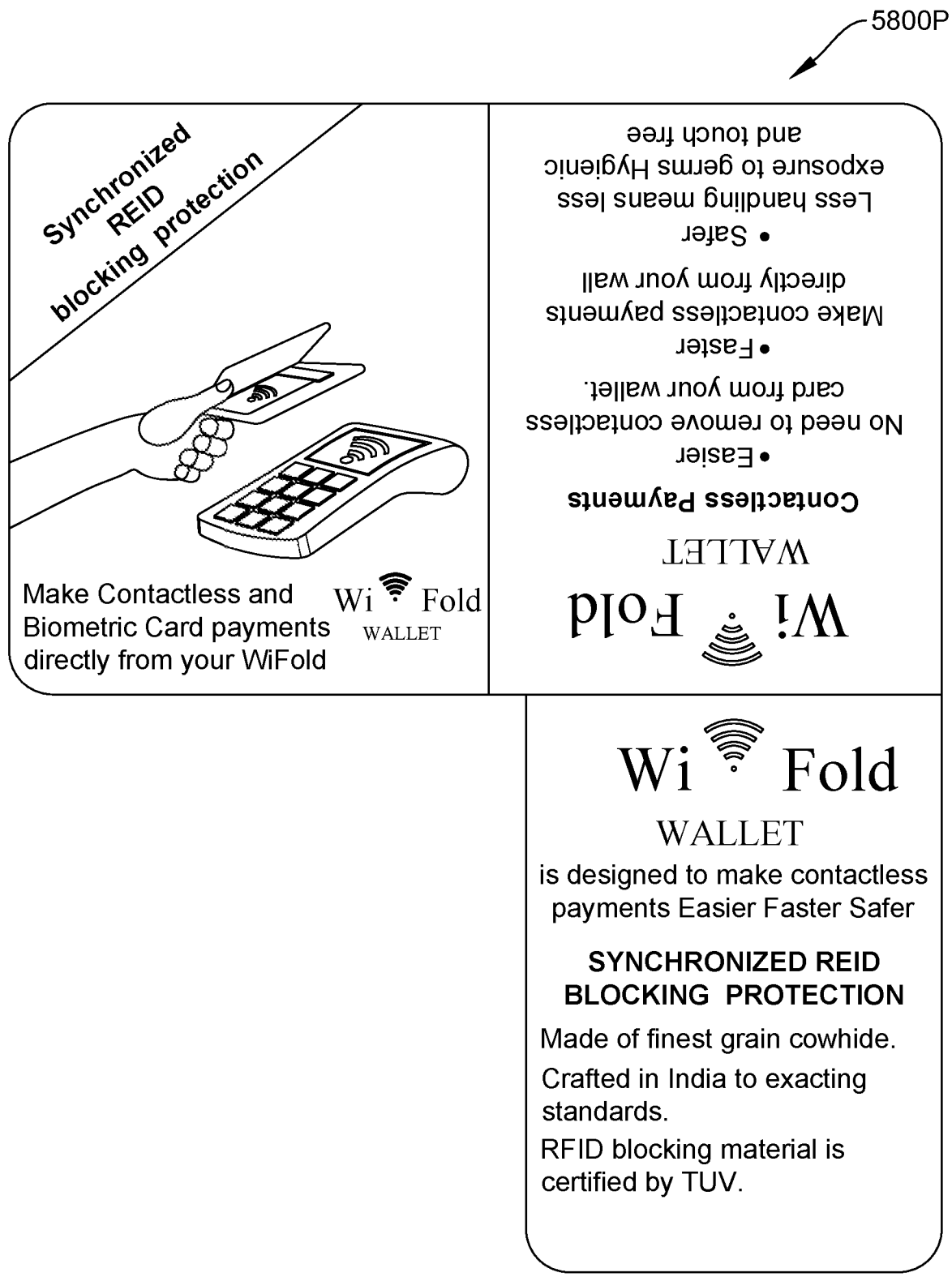

FIG. 58M-N show a second view/opposite side of the wallet and phone assembly 5800M-N. In particular, the wallet 5801 left inside exposure 5811 lies face up such that wallet left side outside exposure 5841 is against or adjacent to the cell phone screen 5854. In this view, pockets 5813, 5815 are visible to the user.

With the wallet 5801 reverse wrapped around the phone 5851 and energy and/or information transfer established, card enrollment may proceed as described above.

FIGS. 58 O-P illustrate a wallet insert 5800 O-P. The insert is a foldable paper, fabric, or plastic sheet that shows text and pictures. When the sheet is folded, it fits within the wallet or a wallet pocket and may partially protrude from the wallet.

Disclosed on the sheet are examples of wallet use and features including placement of cards within the wallet, use of the wallet with RFID protection and inserted card(s) with NFC machines, contactless payment, and biometric card payment.

While various embodiments of the present invention have been described above, it should be understood that they have been presented by way of example only, and not limitation. It will be apparent to those skilled in the art that various changes in the form and details can be made without departing from the spirit and scope of the invention. As such, the breadth and scope of the present invention should not be limited by the above-described exemplary embodiments, but should be defined only in accordance with the following claims and equivalents thereof.

The invention claimed is:

1. A wallet assembly that receives a contactless payment card, comprising:

a wallet arranged as at least a bifold wallet with a first wallet side and a second wallet side, the second wallet side being configured to receive the payment card and the first wallet side configured to receive one or more additional payment cards;

the first wallet side including a first flap attached to the first wallet side defining a first wallet pocket to receive the additional payment cards, wherein the first wallet side and first flap includes radio-frequency identification (RFID) shielding to reduce or eliminate electromagnetic signals from the additional payment cards external to the first wallet pocket; and the second wallet side including a second flap attached to the second wallet side defining a second wallet pocket to receive the payment card, the second flap having a hole or window that physically exposes a portion of the payment card.

2. The wallet assembly of claim 1, further comprising the payment card, wherein the payment card is enabled to communicate with a contactless reader while the payment card is in the second wallet pocket.

3. The wallet assembly of claim 2, wherein the payment card includes a biometric sensor to authenticate use of the payment card.

4. The wallet assembly of claim 3, wherein the biometric sensor stores a digital template of a user's finger or thumb print and the biometric sensor authenticates use of the payment card by matching the user's finger or thumb print with the stored digital template.

5. The wallet assembly of claim 4 wherein the window in the second wallet pocket includes a cut-out allowing a user to directly access the biometric sensor with a finger or thumb.

6. The wallet assembly of claim 3, wherein placement of a user finger or thumb on the biometric sensor enables a financial transaction involving the payment card to occur.

7. The wallet assembly of claim 3, wherein the window in the second flap provides access to the biometric sensor.

8. The wallet assembly of claim 3 wherein the second wallet side is opened, folded or rotated between 30 to 180 degrees relative to the first wallet side to enable a financial transaction with the payment card.

9. The wallet assembly of claim 3, wherein the payment card includes an integrated circuit chip that stores and secures user and card data.

10. The wallet assembly of claim 9, wherein the integrated circuit chip on the payment card comprises an EMV chip.

11. The wallet assembly of claim 9, further comprising an enrollment key to couple with the integrated circuit chip of the payment card, wherein the enrollment key includes an electric power circuit to provide power to the payment card enabling the biometric sensor to store a user fingerprint as a digital template on the payment card.

12. The wallet assembly of claim 11 wherein the enrollment key includes enrollment key contacts that mate with card contacts on the integrated circuit chip to provide the power to the payment card.

13. The wallet assembly of claim 11, wherein the second wallet pocket is configured such that the enrollment key is positionable against the payment card while the payment card is in the second wallet pocket.

14. The wallet assembly of claim 11, wherein the enrollment key includes a narrower insert portion having a length extending from a wider portion, wherein an intersection of the insert portion and the wider portion defines a shoulder that extends in a perpendicular direction from a length of the insert portion.

15. The wallet assembly of claim 14, wherein the shoulder limits a depth of insertion of the enrollment key in the second wallet pocket.

16. The wallet assembly of claim 14, wherein the enrollment key includes enrollment key contacts on the insert portion to mate with contacts on the integrated circuit chip of the payment card.

17. The wallet assembly of claim 11, where the enrollment key includes light emitting elements to indicate an enrollment status.

18. The wallet assembly of claim 1,
wherein the payment card includes a biometric sensor to authenticate use of the payment card, and
further comprising an enrollment key with a wider top portion and a narrower bottom portion, with the narrower bottom portion being insertable withing the second wallet pocket.

19. The wallet assembly of claim 18, wherein an intersection between the wider top portion and the narrower bottom portion defines a shoulder that prevents insertion of the wider top portion in the second wallet pocket.

20. The wallet assembly of claim 18, wherein the enrollment key includes a T-shaped configuration.

21. The wallet of claim 1, further comprising:
a sleeve rotatably attached to the wallet;
wherein the sleeve receives the contactless card which can be pivoted away from the wallet such that communications between the contactless card and a proximate payment device to prevent the RFID shielding in the first wallet side from interfering with a payment transaction.

22. A wallet assembly that receives a payment card and an enrollment key to activate the payment card, comprising:
a wallet arranged as at least a bifold wallet with a first wallet side and a second wallet side, the second wallet side being configured to receive the payment card in a second wallet pocket defined by a second flap attached to the second wallet side and the first wallet side configured to receive one or more of additional payment cards, money and/or identification cards in a first wallet pocket defined by a first flap attached to the first wallet side, wherein the first wallet side includes radio-frequency identification (RFID) shielding to reduce or eliminate electromagnetic signals from the additional payment cards external to the first wallet side;
an enrollment key to couple with the payment card, wherein the enrollment key includes an electric power circuit to provide electric power to the payment card enabling a biometric sensor to store a user fingerprint as a digital template on the payment card.

23. The wallet assembly of claim 22, further comprising the payment card, wherein the payment card is enabled to communicate with a contactless reader while the payment card is in the second wallet pocket.

24. The wallet assembly of claim 23, wherein
the payment card further comprises the biometric sensor to authenticate use of the payment card, wherein the biometric sensor stores a digital template of a user's finger or thumb print and the biometric sensor authenticates use of the payment card by matching the user's finger or thumb print with the stored digital template; and
the second flap includes a hole or cut-out for a user to directly access the biometric sensor with a finger or thumb when the wallet is at least partially open.

* * * * *